United States Patent [19]

Ataka

[11] Patent Number: 5,689,755
[45] Date of Patent: Nov. 18, 1997

[54] DISTRIBUTED INTERCONNECTED IMAGE FORMING SYSTEM

[75] Inventor: Hiroyuki Ataka, Nara, Japan

[73] Assignee: Sharp Kabushiki Kaisha, Osaka, Japan

[21] Appl. No.: 423,980

[22] Filed: Apr. 18, 1995

[30] Foreign Application Priority Data

| Apr. 21, 1994 | [JP] | Japan | 6-083103 |
| Dec. 28, 1994 | [JP] | Japan | 6-328441 |

[51] Int. Cl.$^6$ .................................................. G03G 15/00
[52] U.S. Cl. .................................................. 399/8; 399/1
[58] Field of Search .................................. 355/200, 202, 355/204, 205, 206, 207, 208, 209, 210; 358/296, 300; 399/1, 8, 82, 130

[56] References Cited

U.S. PATENT DOCUMENTS

| 4,167,322 | 9/1979 | Yano et al. . |
| 4,583,834 | 4/1986 | Seko et al. . |
| 5,051,779 | 9/1991 | Hikawa . |
| 5,287,194 | 2/1994 | Lobiondo . |
| 5,339,168 | 8/1994 | Evanitsky et al. . |

FOREIGN PATENT DOCUMENTS

| 62-176262 | 8/1987 | Japan . |
| 2-20959 | 1/1990 | Japan . |
| 2-254849 | 10/1990 | Japan . |

*Primary Examiner*—Sandra L. Brase
*Attorney, Agent, or Firm*—David G. Conlin; Brian L. Michaelis

[57] ABSTRACT

In the distribution copy mode, when plural sets of copies are selected, a copying machine C1 of a transmitting end checks the status of copying machines C2 and C3 being connected through a communication line based on status information data. As a result of this check, if both of the copying machines C2 and C3 are set in the idle state, the number of copies specifying data and the image data are transmitted to be distributed to each copying machine. In the described arrangement, since one copy job can be divided to be distributed to plural copying machines, an improved productivity of copy operation and more effective use of the copying machines can be achieved.

15 Claims, 61 Drawing Sheets

FIG.6(a)

| TRANSMITTING END ADDRESS |
|---|
| 1 |
| ADDRESS INDICATES ALL TRANSMITTING ENDS |
| JOB ID |
| STATUS REQUEST ID |
| 0 |

FIG.6(b)

| TRANSMITTING END ADDRESS |
|---|
| 1 |
| RECEIVING END ADDRESS |
| JOB ID |
| STATUS INFORMATION ID |
| DATA BYTE COUNT (m) |
| STATE OF COPYING MACHINE (IDLE/ BUSY/ ERROR) |
| COPY PERFORMANCE |
| OPTIONAL FUNCTION a |
| : |
| OPTIONAL FUNCTION i |

FIG.6(c)

| TRANSMITTING END ADDRESS |
|---|
| NUMBER OF RECEIVING END ADDRESSES (n) |
| RECEIVING END ADDRESS a |
| RECEIVING END ADDRESS b |
| : |
| RECEIVING END ADDRESS x |
| JOB ID |
| NUMBER OF COPIES SPECIFYING ID |
| DATA BYTE COUNT (n+1) |
| JOB BATCH TRANSMISSION FLAG |
| NUMBER OF COPIES FOR ADDRESS a |
| : |
| NUMBER OF COPIES FOR ADDRESS x |

FIG.6(d)

| TRANSMITTING END ADDRESS |
|---|
| NUMBER OF RECEIVING END ADDRESSES (n) |
| RECEIVING END ADDRESS a |
| RECEIVING END ADDRESS b |
| : |
| RECEIVING END ADDRESS x |
| JOB ID |
| IMAGE DATA ID |
| DATA BYTE COUNT (m) |
| PAGE NUMBER |
| IMAGE DATA |

FIG.6(e)

| TRANSMITTING END ADDRESS |
|---|
| NUMBER OF RECEIVING END ADDRESSEES (n) |
| RECEIVING END ADDRESS a |
| RECEIVING END ADDRESS b |
| : |
| RECEIVING END ADDRESS x |
| JOB ID |
| JOB END ID |
| 0 |

FIG.6(f)

| TRANSMITTING END ADDRESS |
|---|
| 1 |
| RECEIVING END ADDRESS |
| JOB ID |
| RECEIVING CONFIRMATION ID |
| 0 |

FIG.24(a)

| TRANSMITTING END ADDRESS |
|---|
| 1 |
| ADDRESS INDICATES ALL RECEIVING ENDS |
| JOB ID |
| STATUS REQUEST ID |
| 0 |

FIG.24(b)

| TRANSMITTING END ADDRESS | |
|---|---|
| 1 | |
| RECEIVING END ADDRESS | |
| JOB ID | |
| STATUS INFORMATION ID | |
| DATA BYTE COUNT (m) | |
| COPYING MACHINE STATUS ID | ↑ |
| COPYING PERFORMANCE | |
| REMAINING NUMBER OF COPIES | m |
| OPTIONAL FUNCTION a | ↑ |
| : | i |
| OPTIONAL FUNCTION i | ↓ |

FIG.24(c)

| TRANSMITTING END ADDRESS | |
|---|---|
| NUMBER OF RECEIVING END ADDRESSES (n) | |
| RECEIVING END ADDRESS a | ↑ |
| RECEIVING END ADDRESS b | n |
| : | |
| RECEIVING END ADDRESS x | ↓ |
| JOB ID | |
| NUMBER OF COPIES SPECIFYING ID | |
| DATA BYTE COUNT (n) | |
| NUMBER OF COPIES FOR ADDRESS a | ↑ |
| NUMBER OF COPIES FOR ADDRESS b | n |
| : | |
| NUMBER OF COPIES FOR ADDRESS x | ↓ |

FIG.24(d)

| TRANSMITTING END ADDRESS | |
|---|---|
| NUMBER OF RECEIVING END ADDRESSES (n) | |
| RECEIVING END ADDRESS a | ↑ |
| RECEIVING END ADDRESS b | n |
| : | |
| RECEIVING END ADDRESS x | ↓ |
| JOB ID | |
| IMAGE DATA ID | |
| DATA BYTE COUNT (m) | |
| PAGE NUMBER | ↑ |
| IMAGE DATA | m |

FIG.24(e)

| TRANSMITTING END ADDRESS |
|---|
| 1 |
| RECEIVING END ADDRESS |
| JOB ID |
| PRINT END ID |
| 0 |

FIG. 25(a)
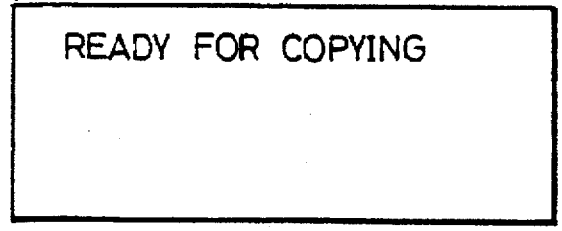
FIG. 25(b)
| IN PROCESS OF 12 SETS DISTRIBUTIVE COPY ||
| NAME OF COPYING MACHINE | DISTRIBUTED NUMBER OF COPIES |
|---|---|
| OWN COPYING MACHINE | 3 |
| COPYING MACHINE 2 | 5 |
| COPYING MACHINE 3 | 4 |
FIG. 25(c)
| 12 SETS DISTRIBUTIVE COPY COMPLETED ||
| NAME OF COPYING MACHIN | DISTRIBUTED NUMBER OF COPIES |
|---|---|
| OWN COPYING MACHINE | 3 |
| COPYING MACHINE 2 | 5 |
| COPYING MACHINE 3 | 4 |
FIG. 25(d)
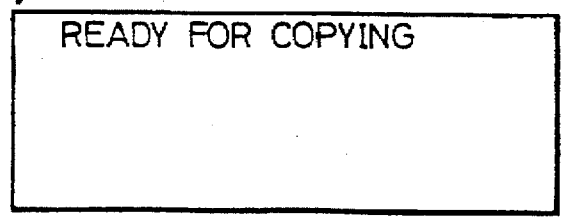

FIG. 27(a)

```
READY FOR COPYING
```

FIG. 27(b)

| IN PROCESS OF 12 SETS DISTRIBUTIVE COPY | |
|---|---|
| NAME OF COPYING MACHINE | REMAINING NUMBER OF COPIES |
| COPYING MACHINE 2 | 3 |
| COPYING MACHINE 3 | 2 |

FIG. 27(e)

| IN PROCESS OF 12 SETS DISTRIBUTIVE COPY | |
|---|---|
| NAME OF COPYING MACHINE | REMAINING NUMBER OF COPIES |
| COPYING MACHINE 2 | NO SHEET |
| COPYING MACHINE 3 | 2 |

FIG. 27(c)

| 12 SETS DISTRIBUTIVE COPY COMPLETED | |
|---|---|
| NAME OF COPYING MACHIN | REMAINING NUMBER COPIES |
| OWN COPYING MACHINE | 3 |
| COPYING MACHINE 2 | 5 |
| COPYING MACHINE 3 | 4 |

FIG. 27(d)

```
READY FOR COPYING
```

FIG.28(a)

12 SETS DISTRIBUTIVE COPY

| NAME OF COPYING MACHINE | DISTRIBUTIVE NUMBER OF COPIES |
| --- | --- |
| OWN COPYING MACHINE | 3 |
| COPYING MACHINE 2 | 5 |
| COPYING MACHINE 3 | 4 |

FIG.28(b)

DISTRIBUTIVE COPY FOR COPYING MACHINE 1
5 SETS OF COPIES

FIG.44(a)

| |
|---|
| TRANSMITTING END ADDRESS |
| RECEIVING END ADDRESS |
| JOB ID |
| DATA ID |
| DATA BYTE COUNT (m) |
| DATA ↕ m |

FIG.44(b)

| DATA ID | CORRESPONDING DATA |
|---|---|
| INFORMATION REQUEST DATA | INFORMATION RESPONCE DATA |
| INFORMATION RESPONSE DATA | — |
| SET REQUEST DATA | SET RESPONSE DATA |
| SET RESPONSE DATA | — |
| IMAGE REQUEST DATA | IMAGE RESPONSE DATA |
| IMAGE RESPONSE DATA | — |

FIG.44(c)

| FUNCTION ID | SET |
|---|---|
| 2 in 1 | ON/OFF |
| 4 in 1 | ON/OFF |
| BOTH-SIDED PRINTING | ON/OFF |
| STAPLE | ON/OFF |

FIG.45(a)
| TRANSMITTING END ADDRESS |
| RECEIVING END ADDRESS |
| JOB ID |
| INFORMATION REQUEST DATA |
| DATA BYTE COUNT(0) |
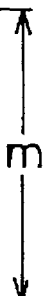
FIG.45(b)
FIG.45(c)

FIG.45(d)

| TRANSMITTING END ADDRESS |
|---|
| RECEIVING END ADDRESS |
| JOB ID |
| SET RESPONSE DATA |
| DATA BYTE COUNT (n) |
| NUMBER OF COPIES |
| SET VALUE |
| FUNCTION ID |
| SET VALUE |
| FUNCTION ID |
| SET VALUE |
| ⋮ |
| ⋮ |

The lower portion (from NUMBER OF COPIES downward) is labeled with bracket size $n$.

FIG.45(e)

| TRANSMITTING END ADDRESS |
|---|
| RECEIVING END ADDRESS |
| JOB ID |
| IMAGE REQUEST DATA |
| DATA BYTE COUNT (1) |
| IMAGE DATA |

The IMAGE DATA block is labeled with bracket size $i$.

FIG.45(f)

| TRANSMITTING END ADDRESS |
|---|
| RECEIVING END ADDRESS |
| JOB ID |
| IMAGE RESPONSE DATA |
| DATA BYTE COUNT (0) |

FIG.46(a)

(a-1)
| NAME OF COPYING MACHINES: | NUMBER OF COPIES: 02 |
|---|---|
| 2in1 | ON |
| BOTH-SIDED | OFF |

(a-2)
| NAME OF COPYING MACHINES: | NUMBER OF COPIES: 03 |
|---|---|
| COPYING MACHINE 2 | |
| STAPLE | OFF |

(a-3)
| NAME OF COPYING MACHINES: | NUMBER OF COPIES: 02 |
|---|---|
| COPYING MACHINE 3 | |
| 4in1 | OFF |
| BOTH-SIDED | OFF |
| STAPLE | ON |

FIG.46(b)

(b-1)
| NAME OF COPYING MACHINES: | NUMBER OF COPIES: 02 |
|---|---|
| ○ 2in1 | ON |
| BOTH-SIDED | OFF |

(b-2)
| NAME OF COPYING MACHINES: | NUMBER OF COPIES: 03 |
|---|---|
| COPYING MACHINE 2 | |
| ☆ STAPLE | OFF |

(b-3)
| NAME OF COPYING MACHINES: | NUMBER OF COPIES: 02 |
|---|---|
| COPYING MACHINE 3 | |
| ○ 4in1 | OFF |
| BOTH-SIDED | OFF |
| ☆ STAPLE | ON |

FIG.46(c)

(c-1)
NAME OF COPYING MACHINES: NUMBER OF COPIES: 02
2in1  OFF
BOTH-SIDED  OFF

(c-2)
NAME OF COPYING MACHINES: NUMBER OF COPIES: 03
COPYING MACHINE 2
STAPLE  OFF
| 2in1 | OFF |

(c-3)
NAME OF COPYING MACHINES: NUMBER OF COPIES: 02
COPYING MACHINE 3
4in1  OFF
BOTH-SIDED  OFF
STAPLE  OFF
| 2in1 | OFF |

FIG.46(d)

(d-1)
NAME OF COPYING MACHINES: NUMBER OF COPIES: 02
2in1  OFF
BOTH-SIDED  OFF

(d-2)
COPY SYSTEM  NUMBER OF COPIES: 05
2in1  OFF
4in1  OFF
BOTH-SIDED  OFF
STAPLE  OFF

(d-3)
COPY SYSTEM  NUMBER OF COPIES: 05
2in1  OFF
| 4in1 | ON |
| BOTH-SIDED | OFF |
| STAPLE | OFF |

FIG.58

SET SHEET OUTPUT
☐ FAX COVER SHEET OUTPUT  ☐ ADDRESS BOOK OUTPUT  ☐ MASKING/CLIPPING
☐ FILING SHEET OUTPUT  ☐ INDEX PRINT OUTPUT  ☐ KEY WORD SEARCH OUTPUT

SET COPY JOG
 NUMBER OF COPIES [:::]
 SHEET SETTING  ☐ AUTOMATIC SHEET SELECTION  ☐ MANUAL TRAY
  ☐ A4  ☐ A3  ☐ B5
 MAGNIFICATION/REDUCTION  ☐ TRANSMISSION  ☐ AUTOMATIC CONVERSION  ☐ MANUAL CONVERSION
  ☐ INDEPENDENT CONVERSION  ☐ LENGTH [:::].[:]%  ☐ WIDTH [:::].[:]%
  ☐ PRESET CONVERSION
   ☐ 4TIMES  ☐ 3TIMES  ☐ 2TIMES  ☐ A4-A3  ☐ A4-B4  ☐ B5-A4
                                    B5-B4   A5-B5   B4-A3
   ☐ A4-B5  ☐ B4-A4  ☐ A3-A4  ☐ 1/2  ☐ 1/3  ☐ 1/4
    A3-B4   B5-A5   B4-B5   TIMES  TIMES  TIMES
 DENSITY  ☐ AUTOMATIC DENSITY SETTING
  ☐ MANUAL SETTING
   DARK ☐☐☐☐☐☐☐ LIGHT

┌─────────────────────────────────────────────────────────┐
│ ☐ 2in1                                                   │
│ ☐ 4in1                                                   │
│ SET ENLARGEMENT                                          │
│  Duplex                          Sorter                  │
│   DOCUMENT    COPY                ☐ OFF                  │
│    ☐ SINGLE SIDED → SINGLE SIDED                         │
│    ☐ SINGLE SIDED → BOTH SIDED    ☐ Sort                 │
│    ☐ BOTH SIDED → SINGLE SIDED    ☐ Group                │
│    ☐ BOTH SIDED → BOTH SIDED                             │
│                                   ☐ Steple ON            │
│                                   ☐ 2in1 BookON(Erectric RDH) │
└─────────────────────────────────────────────────────────┘

SPECIAL SETTING
 ☐ IMAGE MODE  ☐ AUTOMATIC(MIXED)  ☐ PHOTO MODE  ☐ CHARACTER MODE
 ☐ DELETE RIM  ☐ DELETE DOCUMENT MODE  ☐ DELETE COPY RIM  ☐ DELETE BOOK RIM
 ☐ BINDING MARGIN  ☐ LEFT  ☐ RIGHT  ☐ UPPER  ☐ BOOK
 ☐ PAGE NUMBER PRINTING
   POSITION  ☐ MIDDLE LOWER  ☐ RIGHT UPPER  ☐ BOOK MIDDLE LOWER
            ☐ BOOK RIGHT UPPER
 ☐ STAMP  KIND  ☐ Confidencial  ☐ [SUPER CONFIDENCIAL]

POSITION ☐ ALL PAGES  ☐ [::] PAGE ONLY
            ☐ MIDDLE LOWER  ☐ RIGHT UPPER  ☐ BOOK MIDDLE LOWER
            ☐ BOOK RIGHT UPPER
              COPYING MACHINE No.(C1)

DISTRIBUTED INTERCONNECTED IMAGE FORMING SYSTEM

FIELD OF THE INVENTION

The present invention relates to an image forming system composed of, for example, plural digital copying machines being connected, which read an analog image on a document to be converted into a digital image to perform a copy operation based on the digital image.

BACKGROUND OF THE INVENTION

Conventionally, a system wherein plural digital copying machines are connected so that communication of image data, etc., is permitted among the plural digital copying machines has been proposed. The system of this type can be used like the local area facsimile, and the image data read in one copying machine can be transmitted to other copying machines so as to produce copies.

For example, in a copying machine disclosed in Japanese Laid-Open Patent Publication No. 176262/1987 (Tokukaisho 62-176262), when transmitting image data together with a number of copies to be produced, a copying machine which receives the data performs a copy operation based on the received image data first. Then, using the resulting first copied sheet as a document, the remaining copy operation is executed. In this arrangement, even when producing plural copies, it is not required to store the image data in a memory, thereby providing a system of high communication efficiency at low cost.

Japanese Laid-Open Patent Publication No. 254849/1990 (Tokukaihei 2-254849) discloses a system wherein if one copying machine selected by the user is not available as being in the process of another copy operation or due to an error such as sheet being jammed, running out of sheet, etc., the image data is transmitted to another available copying machine so that the copy operation can be executed therein. In this arrangement, as the user can save the time for searching an available copying machine, an improved efficiency of use of each copying machine can be achieved.

In such conventional copying machines, the image data can be transmitted to another copying machine like the local area facsimile, and the copy operation of one copying machine selected by the user can be switched to another available copying machine being connected. However, the problem is presented in that the productivity of such copying machine is limited to one copying machine.

Additionally, when plural available copying machines exist, the copying machines are not fully utilized.

Moreover, as each copying machine is provided with unique functions, in many cases, various functions are provided in plural copying machines. However, the plural functions cannot be used effectively, the copying machines are used in low efficiency, and copies cannot be produced as desired if the copying machine is not provided with the function. Especially, although the copying machines are connected by the communication line, the function provided with a particular copying machine cannot used efficiently, and the provided function may not be used.

SUMMARY OF THE INVENTION

An object of the present invention is to provide an image forming system which permits an improved productivity of an image forming operation and an improved efficiency of an image forming apparatus.

Another object of the present invention is to provide an image forming system which permits a still improved efficiency by using functions provided in each of image forming apparatuses.

In order to achieve the above object, the first image forming system in accordance with the present invention is characterized by including plural image forming apparatuses provided with image reading means for reading an image from a document to be converted into image data and image forming means for forming an image based on the image data; and a communication line for connecting the plural image forming apparatuses, wherein each of the plural image forming apparatuses comprises data transmission means for transmitting image data to other image forming apparatuses using the communication line; data receiving means for receiving the image data transmitted by the data transmission means; distribution number set means for setting a distribution number of sets to be produced in each image forming apparatus when performing image forming operation of plural sets; distribution number transmission means for transmitting the distribution number of sets to each image forming apparatus set by the distribution number set means to other image forming apparatuses using the communication line; and distribution number receiving means for receiving the distribution number of sets transmitted by the distribution number transmission means.

In the described arrangement, as plural image forming apparatuses are connected to permit communication among them, based on the image data of the document read by the image reading means, the distribution number setting means sets the number to be distributed to each image forming apparatus upon selecting plural image forming operation. Then, the data transmission means and the distribution number transmission means of the image forming apparatus which reads the image respectively transmit the read image data and the distribution number of sets set by the distribution number setting means to each image forming apparatus. In the image forming apparatus, the image forming operation is performed based on the image data and the distribution number of sets.

According to the above arrangement, since one image forming operation can be divided by plural image forming apparatuses, an improved productivity and an improved utilization efficiency can be achieved.

The second image forming system in accordance with the present invention having the arrangement of the first image forming system is characterized in that each of the plural image forming apparatuses further comprises processing capacity detecting means for detecting a processing capacity for an image forming operation of each image forming apparatus, and that the distribution number set means sets the distribution number of sets to be produced in each image forming apparatus according to the processing capacity of each image forming apparatus detected by the processing capacity detecting means.

According to the above arrangement, the distribution number set means sets the distribution number of sets to be produced in each image forming apparatus based on the processing capacity. Therefore, for example, by setting the distribution number of sets according to the number of image forming operations that can be performed in one minute, all of the image forming apparatuses can complete the respective image forming operations substantially at the same time, and an improved productivity can be achieved. For example, in the case of considering the optional functions provided in each image forming apparatus, the image forming apparatuses to which the image forming operation is distributed may be selected so as to have the same form of the document (both-sided printing, etc.).

The third image forming system in accordance with the present invention having the arrangement of the first image forming system is characterized in that each image forming apparatus further comprises error detection means for detecting an occurrence of error during a distributive image forming operation, and upon detecting an occurrence of an error by the error detection means, the distribution number set means re-allocates number of sets unprocessed due to the occurrence of the error to other image forming apparatuses, and the distribution number transmission means transmits a re-allocated number of sets to each image forming apparatus.

In the described arrangement, an occurrence of error in the image forming apparatus is detected by the error detection means, and the number of sets unprocessed due to an error is re-distributed to other image forming apparatuses by the distribution means. Therefore, even when a copy operation is stopped in one copying machine due to an occurrence of an error, sets of image can be produced as desired without cancelling the error as long as all of the copying machines being connected do not stop operating.

Here, it is required only to transmit the distribution number of sets and not required to re-transmit the image data, thereby achieving an improved communication efficiency.

The fourth image forming system in accordance with the present invention having the arrangement of the first image forming system is characterized in that each image forming apparatus further comprises informing means for informing a user of information related to the distributive image forming operation as distribution information when setting an image forming operation of plural sets based on image data read by the image reading means.

In the described arrangement, the same function as the first image forming system can be achieved, and information related to the distributive image forming operation, for example, the number of sets distributed to each copying machine, the user can be informed of the state of the image forming operation in each copying machine etc., by the informing means which performs displaying, printing, etc., thereby achieving an improved utilization efficiency and operability.

The fifth image forming apparatus in accordance with the present invention is characterized by including: plural image forming apparatuses provided with image reading means for reading an image from a document to be converted into image data and image forming means for forming an image based on the image data; and a communication line for connecting said plural image forming apparatuses, each of said plural image forming apparatuses comprising: data transmission means for transmitting image data to other image forming apparatuses using said communication line; data receiving means for receiving the image data transmitted by said data transmission means; image processing function transmission instructing means for instructing to transmit image processing functions provided in other image forming apparatus in a concurrent copy mode wherein a concurrent copy operation is performed by dividing a copy operation to be distributed to other image forming apparatuses including a specific image forming apparatus based on image data read by the specific image forming apparatus among plural image forming apparatuses, the image processing functions provided in each image forming apparatus being transmitted to the specific image forming apparatus, image processing function transmission means for transmitting its image processing functions to an image forming apparatus which transmits an instruction to transmit the image processing functions by said image processing function transmission instructing means upon receiving the instruction; image processing function detecting means for detecting the image processing functions of each image forming apparatus by receiving the image processing functions of each of other image forming apparatuses transmitted by said image processing function transmission means; and image processing function setting means for transmitting an image processing function to be performed in each image forming apparatus through said communication line and setting the image processing function to be performed in each image forming apparatus.

According to the described arrangement, a concurrent copy mode can be set wherein a concurrent copy process is performed in plural image forming apparatuses being connected based on the image data read in a specific image forming apparatus among plural image forming apparatuses being connected through the communication line. Here, unique image forming functions provided in the plural image forming apparatuses can be recognized by the specific image forming apparatus, and the desired function selected among them can be set therein. Upon setting the function, based on the image data transmitted from the specific image forming apparatus, the image can be processed according to the set function in each image forming apparatus, thereby executing the concurrent copy process.

In the described arrangement, only by setting the desired function in the specific image forming apparatus by the user, the image forming process according to the unique function of the apparatus can be formed in other plural image forming apparatuses. As a result, since image can be processed in different forms if necessary, an improved productivity and effective use of the function of each image forming apparatus can be achieved, thereby achieving an improved efficiency of each image forming apparatus.

The sixth image forming system in accordance with the present invention having the arrangement of the fifth image forming system is characterized in that each of the image forming apparatus further comprises image processing function display means for displaying image processing functions provided in each image forming apparatus transmitted by the image processing function transmission means upon receiving an instruction to transmit the image processing functions of each image forming apparatus by the image processing capacity transmission instructing means.

According to the above arrangement, when setting a function, as functions provided in each image forming apparatus are displayed in the image forming apparatus for setting of the function, the user can easily see the unique functions provided in the image forming apparatuses for processing the concurrent copy process. Therefore, the desired function can be easily selected based on the display in the image forming apparatus of the transmitting end, and the problem of setting a function which is not provided in the image forming apparatuses by mistake can be prevented.

The seventh image forming system having the arrangement of the fifth image forming system is characterized in that upon receiving an image processing function from other image forming apparatuses, each image forming apparatus executes the image processing function if the image processing function is provided therein and not provided in the other image forming apparatuses, and sends processed image data to the other image forming apparatuses.

According to the above arrangement, if a unique function of a specific image forming apparatus which is not provided in other image forming apparatuses is set, read image data is processed in the specific image forming apparatus based on the set function, and the processed image data is transmitted to other image forming apparatuses so that the concurrent copy process can be executed in each image forming apparatus.

The eighth image forming system in accordance with the present invention having the arrangement of the fifth image forming system is characterized in that upon receiving an instruction to transmit image processing functions, an image forming apparatus executes the image processing function if the image processing function is provided therein and not provided in an image forming apparatus which transmits the instruction to transmit the image processing functions, and sends processed image data to the image forming apparatus which transmits the instruction.

In the above arrangement, if the set function is provided in other plural image forming apparatuses, the plural image forming apparatuses process the data which is read and transmitted from a specific image forming apparatus based on the image processing function, and send back the processed data to the specific image forming apparatus. Then, the specific image forming apparatus transmits the image data to other plural image forming apparatuses, thereby executing the concurrent copy operation in each image forming apparatus.

As described, in the above arrangement, a function can be selected as desired from both the functions provided in a specific image forming apparatus and the functions provided in other image forming apparatuses. Namely, a function which is not provided in a specific image forming apparatus or not provided in some of the other image forming apparatuses may be selected as desired, thereby achieving an effective use of the functions provided in the image forming apparatuses being connected.

For a fuller understanding of the nature and advantages of the invention, reference should be made to the ensuring detailed description taken in conjunction with the accompanying drawings.

BRIEF DESCRIPTION OF THE DRAWINGS

FIG. 6(a) through FIG. 6(f) are views which concretely explaining the data to be transmitted and received by the digital copying machines, wherein FIG. 6(a) shows status request data, FIG. 6(b) shows status information data, FIG. 6(c) shows number of copies specifying data, FIG. 6(d) shows image data, FIG. 6(e) shows job end data and FIG. 6(f) shows receiving confirmation data.

FIG. 24(a) through FIG. 24(e) are concrete examples of the data to be transmitted and received by digital copying machines in accordance with another embodiment of the present invention, wherein FIG. 24(a) shows status request data, FIG. 24(b) shows status information data, FIG. 24(c) shows number of copies specifying data, FIG. 24(d) shows image data and FIG. 24(e) shows print end data.

FIG. 25(a) through FIG. 25(d) are explanatory views showing displayed states on a panel unit, which vary according to a copy operation, in the digital copying machine which serves as a transmitting end of a distributive copy operation.

FIG. 27(a) through FIG. 27(e) are explanatory views showing changes in display state on the panel unit when the copying machine of the transmitting end displays the remaining number of copies in each copying machine and an occurrence of an error during the distributive copy operation.

FIG. 28(a) is an explanatory view showing distributive copy information to be printed in the copying machine of the transmitting end when a distributive information printing flag is set ON.

FIG. 28(b) is an explanatory view showing the distribute copy information to be printed in the copying machine of the receiving end when the distributive information printing flag is set ON.

FIG. 44(a) is an explanatory view showing a basic configuration of the data to be transmitted and received through a communication line.

FIG. 44(b) is an explanatory view showing a data ID for transmission and a data ID for response.

FIG. 44(c) is an explanatory view showing the structure of a function ID.

FIG. 45(a) through FIG. 45(f) show concrete examples of the data to be transmitted and received by the digital copying machines, wherein FIG. 45(a) shows information request data, FIG. 45(b) shows information response data, FIG. 45(c) shows set request data, FIG. 45(d) shows set response data, FIG. 45(e) shows image request data and FIG. 45(f) shows image response data.

FIG. 46(a) through FIG. 46(d) are explanatory views showing displayed states of the display unit on the panel unit in the case where a concurrent copy operation is set in the image forming system wherein the digital copying machines are connected, wherein:

FIG. 46(a) is an explanatory view showing the state where functions provided in each copying machine and set number of copies are displayed;

FIG. 46(b) is an explanatory view showing the state where functions provided in the copying machine of the transmitting end and functions provided with other copying machines are displayed separately;

FIG. 46(c) is an explanatory view showing a display related a set function provided in each copying machine is displayed; and FIG. 46(d) is an explanatory view showing the state where all of the functions provided in the copying machine being connected are displayed.

FIG. 58 is an explanatory view showing a schematic configuration of an operate sheet for use in setting a function in the digital copying machine.

DETAILED DESCRIPTION OF THE PREFERRED EMBODIMENTS

[EMBODIMENT 1]

Figure 2:
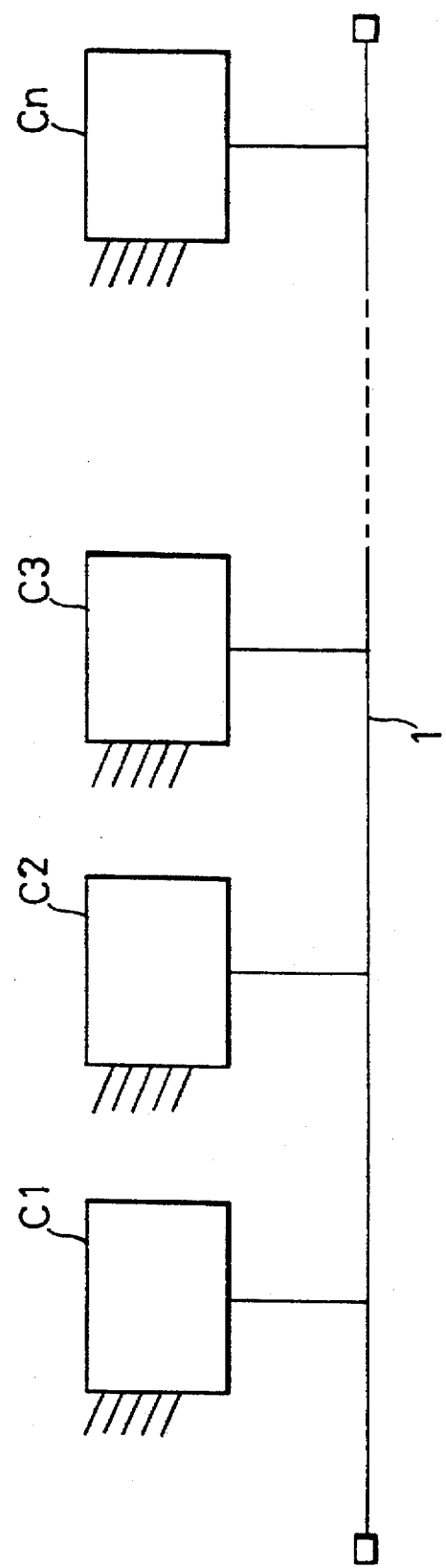
FIG. 2 is an explanatory showing plural digital copying machines being connected.

As shown in FIG. 2, an image forming system in accordance with the present embodiment is composed of plural digital copying machines (hereinafter referred to as copying machines) C1, C2, C3, . . . Cn as image forming apparatus which are connected through a communication line 1 which enables high speed data transmission. In this arrangement, each of the copying machine C1, C2, C3, . . . Cn transmits and receives various data through the communication line 1. Here, the communication line 1 of bus type is used.

Figure 3:
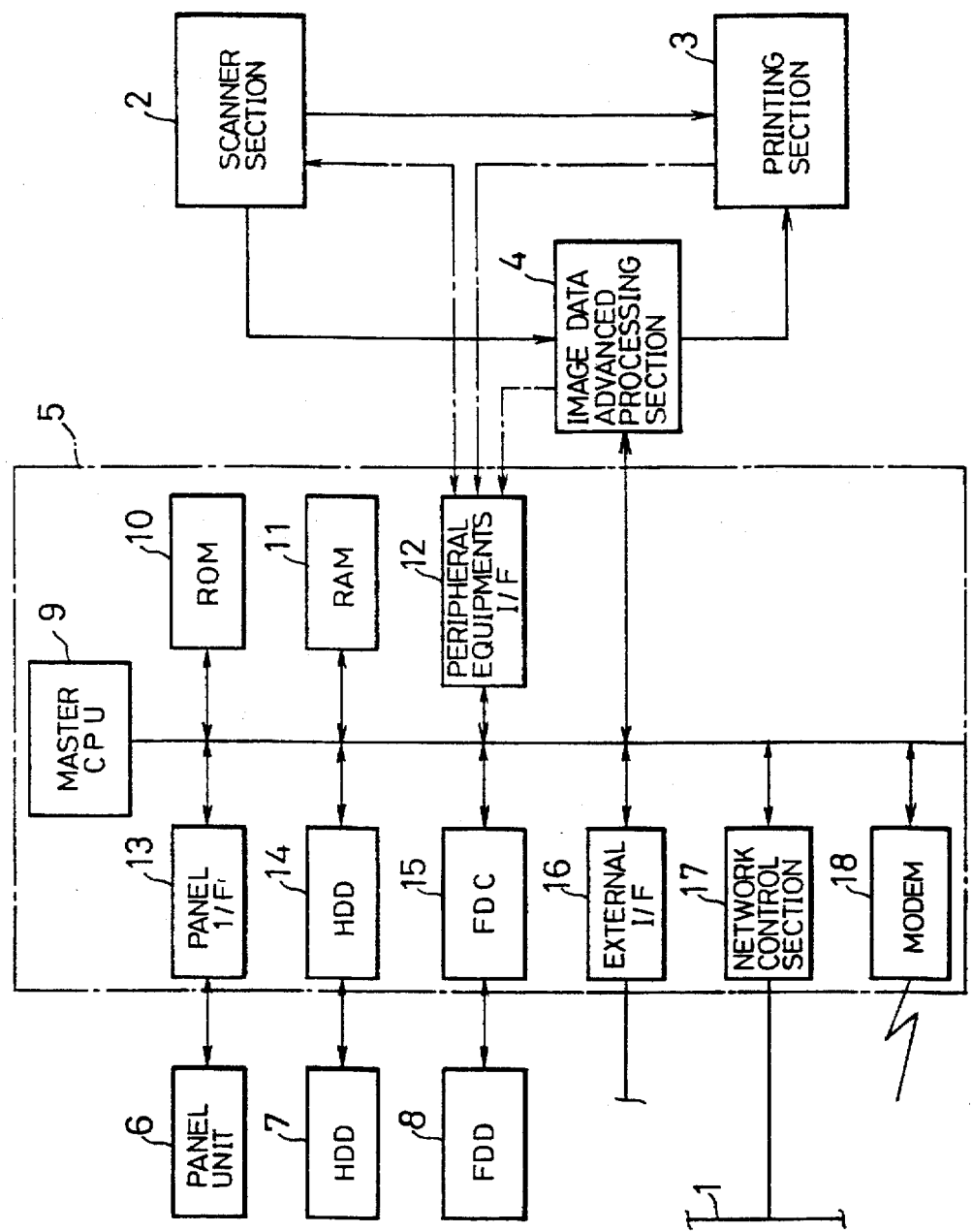
FIG. 3 is a block diagram showing the configuration of each digital copying machine.

As shown in FIG. 3, each of the copying machines C1, C2, C3, . . . Cn is provided with a scanner section 2 (image reading means) for reading an image formed on a document, a printing section 3 (image forming means) for forming an image based on the image data read by the scanner section 2 or based on received image data through the communication line 1, an image data advanced processing section 4 for performing a predetermined image forming process with respect to the read or received image data, such as correcting, magnifying, etc., a controller section 5 for controlling an entire apparatus, a panel unit 6 provided with various keys including a print start key, a ten-key for specifying a number of copies, etc., and with a display panel, a hard disk device (hereinafter referred to as HDD) 7 for storing image data and a floppy disk device (hereinafter referred to as FDD) 8.

The controller section 5 is provided with a central control microprocessor 9 (hereinafter referred to as master CPU). To the master CPU 9, a ROM 10, a RAM 11, a peripheral equipment I/F 12, a panel I/F 13, a hard disk control unit (hereinafter referred to as HDC) 14, a floppy disk control unit (hereinafter referred to as FDC) 15, an external I/F 16, a network control section 17 (data transmission means, distribution number transmission means, data receiving means, distribution number receiving means and processing capacity transmission means) and a modem 18 are connected.

In the ROM 10, various programs to be executed by the copying machine are stored. The master CPU 9 functions as distribution number setting means, processing capacity detecting means, processing capacity transmission instructing means and error detecting means as will be described later, and controls respective copying machines being connected based on the programs stored in the ROM 10. The RAM 11 is a memory composed of a work area for the programs and an area for storing various data such as image data, etc. The panel I/F 13 fetches key data from the panel unit 6 and writes data to be displayed on the display panel.

The peripheral equipment I/F 12 is an interface which enables control information data to be transmitted and received between the controller section 5 and respective peripheral equipments of the scanner section 2, the printing section 3 and the image data advanced processing section 4. The master CPU 9 controls respective peripheral equipments of the scanner section 2, the printing section 3 and the image data advanced processing section 4 through the peripheral equipment I/F 12.

The scanner section 2 is provided for scanning an image formed on a document and converts the image into digital image data. The printing section 3 is provided for printing inputted image data. The image data advanced processing section 4 fetches the image data from the scanners section 2 and transfers the fetched image data to the controller section 5 without applying any process or after applying a predetermined process. The image data advanced processing section 4 also fetches image data from the controller section 5 and transfers the fetched image data to the printing section 3 without applying any process or after applying a predetermined process.

The HDC 14 and FDC 15 control the reading/writing operations of image data with respect to the HDD 7 and the FDD 8. The external I/F 16 serves as a host interface for connecting the copying machine to the host machine, and transmits and receives image data to be printed or print data to be converted into an image or control codes, etc., to and from the host machine. As a result, the copying machine can print the document, etc., in the host machine through the external I/F 16.

The network control section 17 is connected to the communication line 1, and controls receiving and transmission of various data through the communication line 1 between the copying machines being connected through the communication line 1. The modem 18 is provided for connecting a telephone circuit. Through the modem 18, the scanned data can be transmitted by facsimile or the data received by facsimile can be printed.

In reference to figure, the explanations have been given through the case where the copying machine is provided with the HDD 7, the FDD 8, the HDC 14 and the FDC 15. However, these are added to the copying machine as optional functions. Therefore, it is not necessarily that all of the copying machines C1, C2, C3, ... Cn connected through the communication line 1 include the HDD 7, FDD 8, HDC 14 and FDC 15.

In the copying machine, a selection among the following modes is permitted: a distributive copy mode for distributing a specified number of copies to other copying machines being connected, a single copy mode for performing a copy operation independently from other copying machines, and a distributive copy receiving mode for performing a printing process based on the image data transmitted from other copying machine.

On the panel unit 6, a distributive copy mode switch key for switching ON/OFF of the distributive copy mode (the copying machine is set in the single copy mode when the distributive copy mode is switched OFF), a distributive copy receiving mode switch key for switching ON and OFF of distributive copy receiving mode are provided. Each set mode, i.e., either the distributive copy mode and the distributive copy receiving mode are respectively set ON or OFF is stored in the RAM 11, and the memory in the RAM 11 is renewed by operating the corresponding key.

The RAM 11 also stores the number of copies specified or distributed using the panel unit 6, ON/OFF of the job batch flag which determines whether or not the HDD 7 is used for the printing process and a distributive copy job No. for discriminating a distributive copy operation to be executed from other distributive copy operation. These memories are renewed based on operation respective keys of the panel unit 6 or various data received from other copying machines. The current number of copies to be renewed according to the state of copy operation is also stored in the RAM 11.

The copy operation in the copying machine having the described arrangement will be explained. A copy operation in each copying machine C1, C2, C3, ... Cn is different in its flow of image data depending on whether or not the HDD 7 is provided. In the copying machine provided with the HDD 7, images on the document composed of plural pages are scanned by the scanner section 2, and all image data of plural pages are stored in the HDD 7 through the image data advanced processing section 4.

Alternatively, when the image data is transmitted from another copying machine being connected through the communication line 1, received image data of plural pages is sequentially stored in the HDD 7 under the control of network control section 17. Then, the image data stored in the HDD 7 is sequentially read into the RAM 11 page by page in order, and the image data thus read is transferred to the printing section 3 through the image data advanced processing section 4, thereby producing copies as desired. Alternatively, in the case where multiple copies are set, each image data is transferred to the printing section 3 a specified number of times.

On the other hand, in the case of performing a copying operation of the document of plural pages in the copying machine which is not provided with the HDD 7, the first image on the document is scanned by the scanner section 2, and the image data of one page is stored in the RAM 11 through the image data advanced processing section 4. Or the received image data of one page is stored in the RAM 11 under the control of network control section 17. The image data stored in the RAM 11 is transferred to the printing section 3 through the image data advanced processing section 4. Transfer of the image data to the printing section 3 is performed specified number of times.

Figure 4:
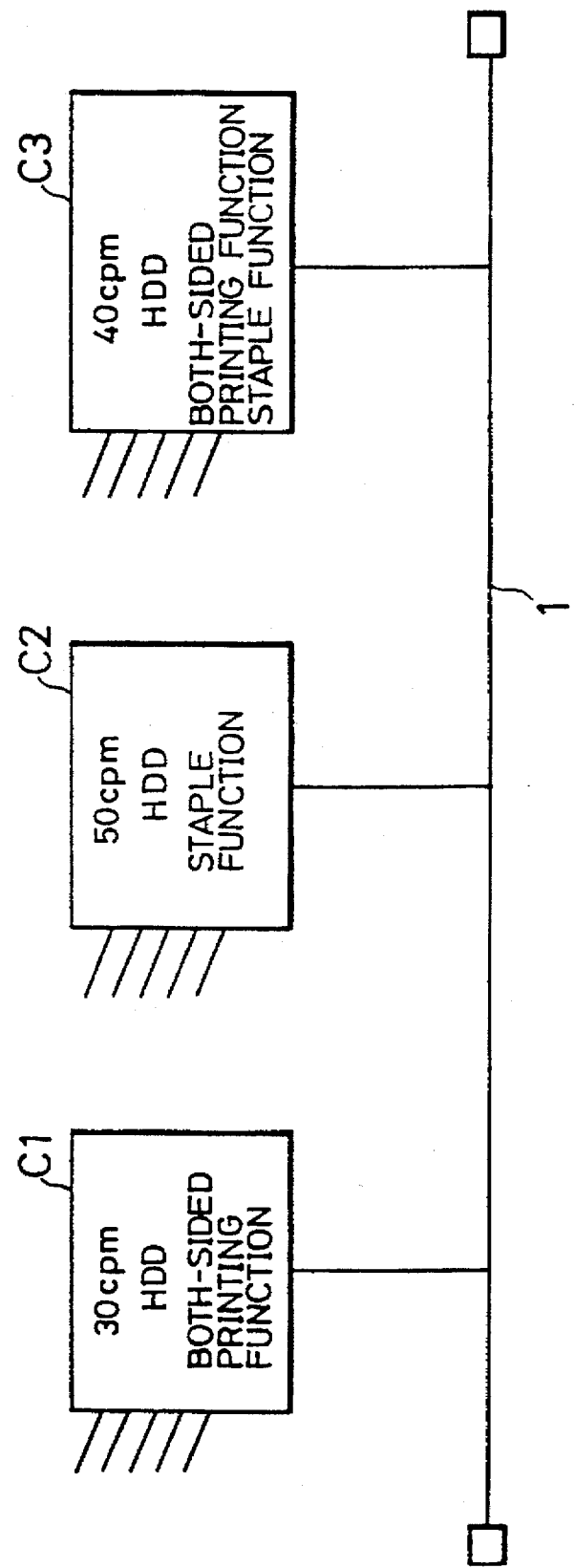
FIG. 4 is an explanatory view showing respective optional functions provided in three digital copying machines being connected through a communication line.

Plural copying machines C1, C2, C3, ... Cn being connected through the communication line 1 respectively have different copy processing capacities, and are provided with different optional functions. More concretely, as shown in FIG. 4, in the case where three copying machines C1, C2 and C3 are connected through the communication line 1, the copying machine C1 has a copy processing capacity of 30 cpm, and is provided with HDD and a both-sided printing function as optional functions.

The copying machine C2 has a copy processing capacity of 50 cpm, and is provided with HDD and a staple processing function for stapling copied sheets as optional functions. The copying machine C3 has a copy processing capacity of 40 cpm, and is provided with HDD and a both-sided copying function and a staple function for stapling produced copies as optional functions. The unit cpm of the copy processing capacity suggests a number of copies that can be produced in one minute. The described copying machines C1, C2 and C3 respectively perform receiving and transmission of various data through the communication line 1 which permits a high speed transportation, thereby enabling a copy operation to be divided into three copying machines.

Figure 5:
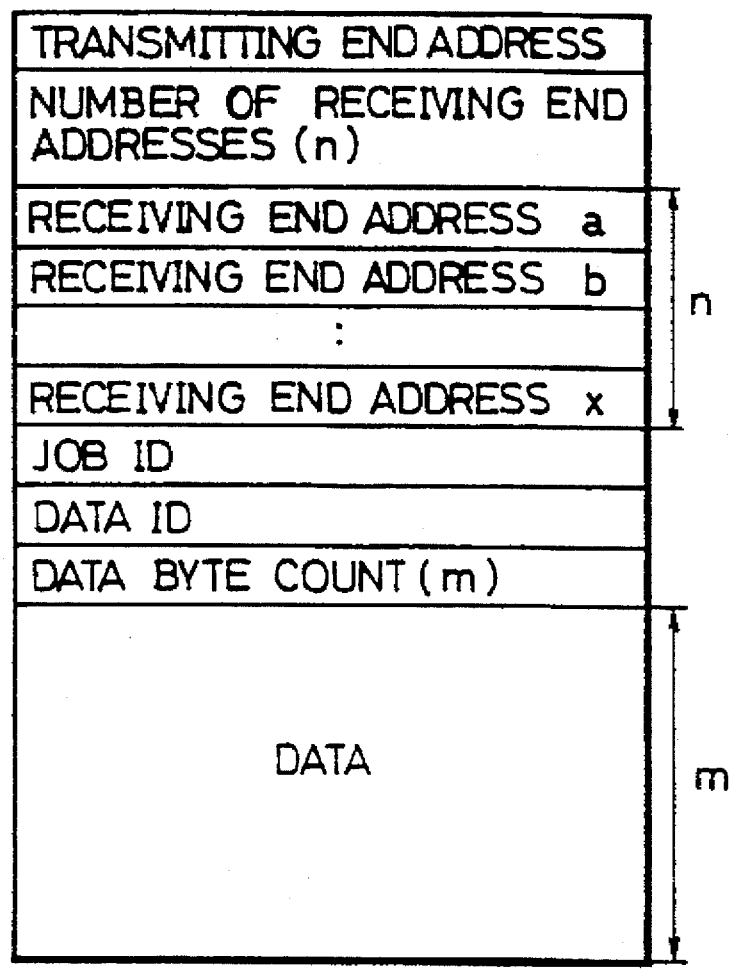
FIG. 5 is an explanatory view showing a basic structure of the data to be transmitted and received by the digital copying machines through the communication line.

FIG. 5 shows respective basic structures of various data to be transmitted and received by respective copying machines C1, C2, C3 . . . Cn through the communication line 1. In order to identify respective copying machines, different addresses are allocated to the respective copying machines C1, C2, C3 . . . Cn. The address of the transmitting end is provided for specifying which copying machine is a transmitting end. The number (n) of receiving end addresses indicates the number of copying machines to which the communication data is transmitted among the copying machines connected to the copying machine through the communication line 1. In the case where the number is set to n, the subsequent data include n receiving end addresses. Therefore, when transmitting the same communication data to plural copying machines, it is not required to separately transmit the data to the plural copying machines, and the data can be transmitted at one time to the desired number of copying machines, thereby achieving an improved communication efficiency. Additionally, the copying machine of the receiving end can determine whether or not the data transmitted from the transmitting end is for its own.

The job ID is the data for identifying each distributive copy operation, and is an address of the copying machine of the transmitting end which initiates the distributive copy operation, that is set to a value not less than 1. In a certain copying machine, if the job ID of the distributive copy operation is different from the job ID of the received data through the communication line 1, it is determined that the received data of the distributive copy operation is different from the job in execution. Therefore, the distributive copy operation by this data is not executed in the copying machine. As described, since the data for each distributive copy job can be distinguished by the job ID, plural distributive copy jobs can be executed simultaneously using the communication line 1.

The data ID identifies this communication data and distinguishes it from other data of six kinds: status request data, status information data, number of copies specifying data, image data, job end data and receiving confirmation data. The data byte count (m) suggests the size of the subsequent data. If the data byte count is m, the size of the data (the amount of data) is m byte.

FIG. 6(a) through FIG. 6(f) respectively explain the data of six kinds in detail. FIG. 6(a) shows a status request data. The status request data is required to be transmitted to all of the copying machines being connected through the communication line 1. Therefore, the number of the receiving end address is "1", and the receiving end address is an address suggesting all of other copying machines are of the receiving end. Here, since the data subsequent to the data ID (status request ID) is not particularly necessary, the data byte count is set to "0".

As shown in FIG. 6(b), the status information data is response data to be transmitted in response to the status request data. Therefore, the number of the receiving end address is "1", and the receiving end address is the transmitting end address of the status request data.

In the data area of the communication data, the status information of each copying machine is set in the following order: state of the copying machine (idle state/busy state/error state), copying performance (copying capacity cpm), and an option value showing the provided optional function (i option values in the case of i optional functions).

FIG. 6(c) shows the number of copies specifying data. Here, the address of the receiving end is the address of the copying machine to which the copy job is distributed. The number of addresses is set at least 1. The data includes the job batch transmission flag and n copies according to the number of copying machines which give n+1.

The job batch transmission flag indicates whether the image data composed of plural pages in one copy job is transmitted plural pages successively at one time or transmitted page by page. When the job batch transmission flag is set ON, the image data of plural pages is transmitted at one time to be stored in the HDD 7, thereby performing a copy operation. On the other hand, when the job batch transmission flag is set OFF, the image data is transmitted page by page to be stored in the RAM 11, thereby performing a copy operation.

The number of copies to be set in the copying machine corresponding to each address is computed from the number of copying machines which divide the copy job or both from the number of copying machines which divide the copy job and the respective copying capacities in the manner to be described later.

FIG. 6(d) shows the image data, and the transmitting end address for the image data is the same as the address of the number of copies specifying data shown in FIG. 6(c). This data contains the image data of one page. The copying machine which receives the image data performs a copy operation based on the received image data so as to produce the number of copies set by the number of copies specifying data.

FIG. 6(e) shows the job end data which indicates the end of the distributive copy job. The receiving end address for the job end data is the same as the address of the number of copies specifying data as shown in FIG. 6(c). Here, since the data subsequent to the data ID (job end ID) is not needed, the data byte count is "0".

FIG. 6(f) shows the receiving confirmation data which indicates that the transmitting data (excluding the address indicating that all of other copying machines are of receiving end) specifying the receiving end address is received. Namely, the receiving end address of the receiving confirmation data is the transmitting end address of the received transmission data.

Figure 1:
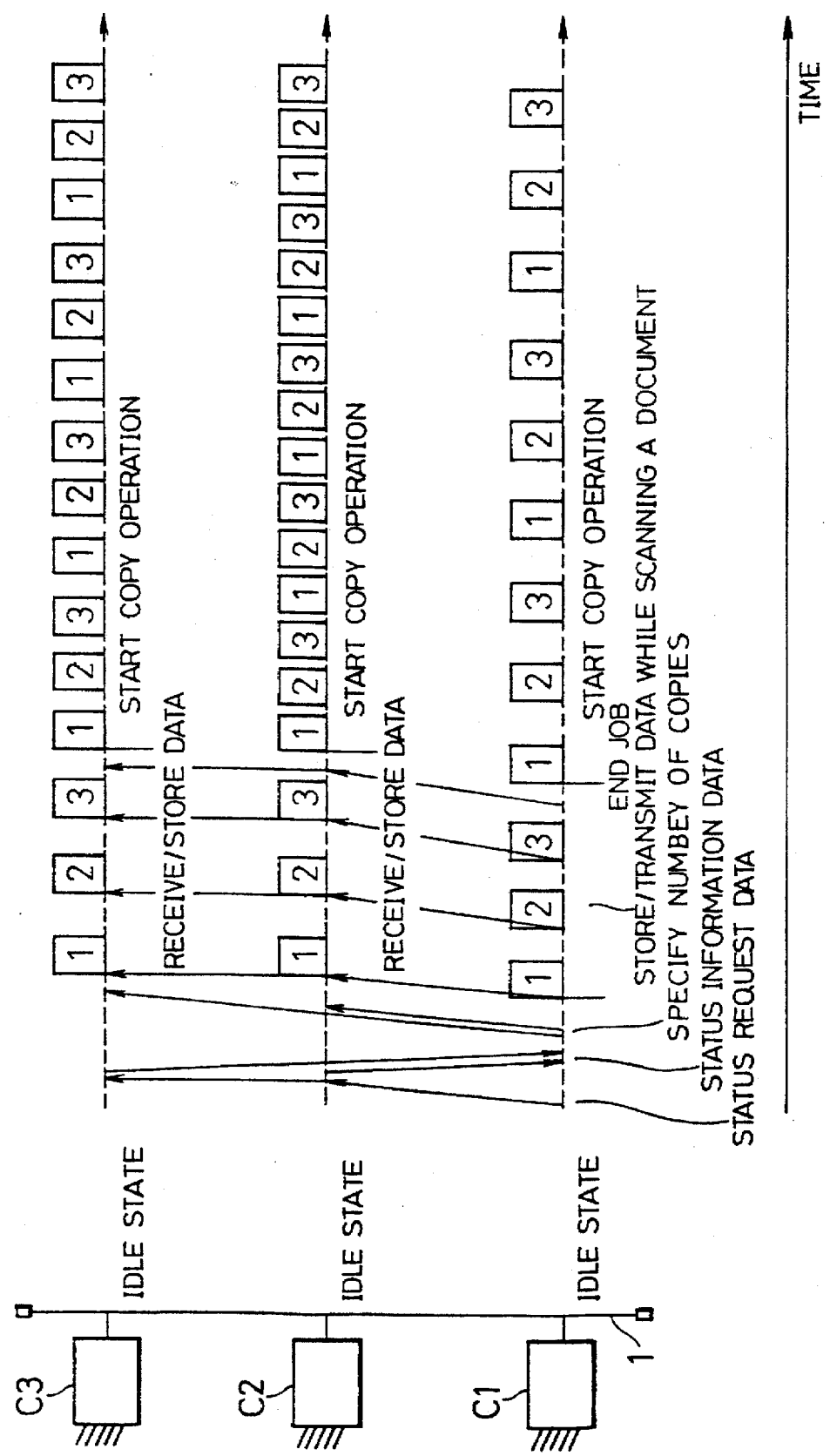
FIG. 1 is a time chart which shows a flow of each data and an execution condition of copy operation in three digital copying machines being connected in accordance with one embodiment of the present invention.

In the state where the copying machines C1, C2 and C3 are connected as in FIG. 4, FIG. 1 is a time chart showing the distributive copy operation in the case of producing 12 sets of copies of the document of three pages when the copying machine C1 is the transmitting end. In the initial state, all of the copying machines C1, C2 and C3 are set in their idle states. In the panel unit 6 of the copying machine C1, the number of copies is set to 12, and by pressing the print start key, the copying machine C1 transmits the status request data (see FIG. 6(a)) to both of other copying machines C2 and C3 connected through the communication line 1.

The copying machines C2 and C3 detect the status request data, and transmit the status information data (see FIG. 6(b)) to the copying machine C1. Next, the copying machine C1 sets the job batch transmitting flag and respective numbers of copies of the copying machines C2 and C3 based on the received status information data so as to prepare the number of copies specifying data (see FIG. 6(c)). Here, since all of the copying machines C1, C2 and C3 are provided with the HDD 7, the job batch transmitting flag is set ON. Possible methods of computing the number of copies to be distributed to the respective copying machines are as follows.

(1) Distributing copies to the number of available copying machines (idle state), and the remaining number of copies is distributed to the copying machine of the transmitting end;

(2) Distributing copies to the number of available copying machines by also considering the copying capacities of respective copying machines. In this method, the number of copies is rounded to the nearest whole number and the remaining number of copies is added to the number of copies distributed to the copying machine of the transmitting end so as to subtract the excessive number of copies from the copying machines of the receiving end; and (3) Distributing copies by computing in the same manner as the method (2), and the remaining number of copies are distributed to the copying machine having the largest copying capacity so as to subtract the excessive number of copies from the number of copies distributed to the copying machine having the lowest copying performance.

Namely, in the method (1), as 12/3=4, and the copy operation is distributed to each available copying machine to produce four copies each. In the method (2), assumed the number of copies distributed to the copying machine C1 is set to a, the number of copies distributed to the copying machine C2 is set to b, the number of copies distributed to the copying machine C3 is set to c. As described, the respective copying capacities of the copying machines C1, C2 and C3 are 30 cpm, 50 cpm and 40 cpm. Therefore, from the equations a+b+c=12, b=(50/30)×a and c=(40/30)×a, a=3, b=5 and c=4. There is no remaining number of copies in this example. However, if there is any, the remaining number of copies is added to the number of copies to be performed by the copying machine C1 of the transmitting end.

In the method (3), the calculation is performed in the same manner as the method (2), and if there is any remaining number of copies, it is added to the number of copies to be performed by the copying machine having the highest copying capacity (i.e., C2 in this example). In this example, since there is not remaining number of copies, the respective numbers of copies in the copying machines C1, C2 and C3 obtained by the methods (2) and (3) are identical. Namely, the respective numbers of copies to be distributed to the copying machines C1, C2 and C3 are respectively 3, 5 and 4.

The copying machine C1 transmits the respective numbers of copies specifying data (see FIG. 6(c)) which are set in the described manner to the copying machines C2 and C3. The copying machines C2 and C3 respectively set the number of copies and the job batch flag according to the respective values specified by the number of copies specifying data. In this case, since the job batch transmitting flag in the data is ON, the copying machine C1 scans the document in order, and the image data is stored in the HDD 7. In the meantime, the image data (see FIG. 6(d)) is transmitted to the copying machines C2 and C3. In the copying machines C2 and C3, the image data transmitted from the copying machine C1 is received, and the received image data is stored in respective HDDs 7 in order. Upon completing the scanning operation of the document, the copying machine C1 transmits the job end data (see FIG. 6(e)) to the copying machines C2 and C3. Upon receiving the job end data, the copying machines C2 and C3 start respective copy operations.

FIG. 1 shows respective copy operations in the copying machines C1, C2 and C3 based on the distributed numbers of copies computed by the method (2) or (3). Here, since the numbers of copies in the copying machines C1, C2 and C3 are set considering the respective copying capacities, all of the copying machines C1, C2 and C3 can complete respective copy operations almost at the same time. Therefore, the described distribution method offers an improved productivity.

The copy operation of the copying machine having the described arrangement will be explained below.

Figure 7:
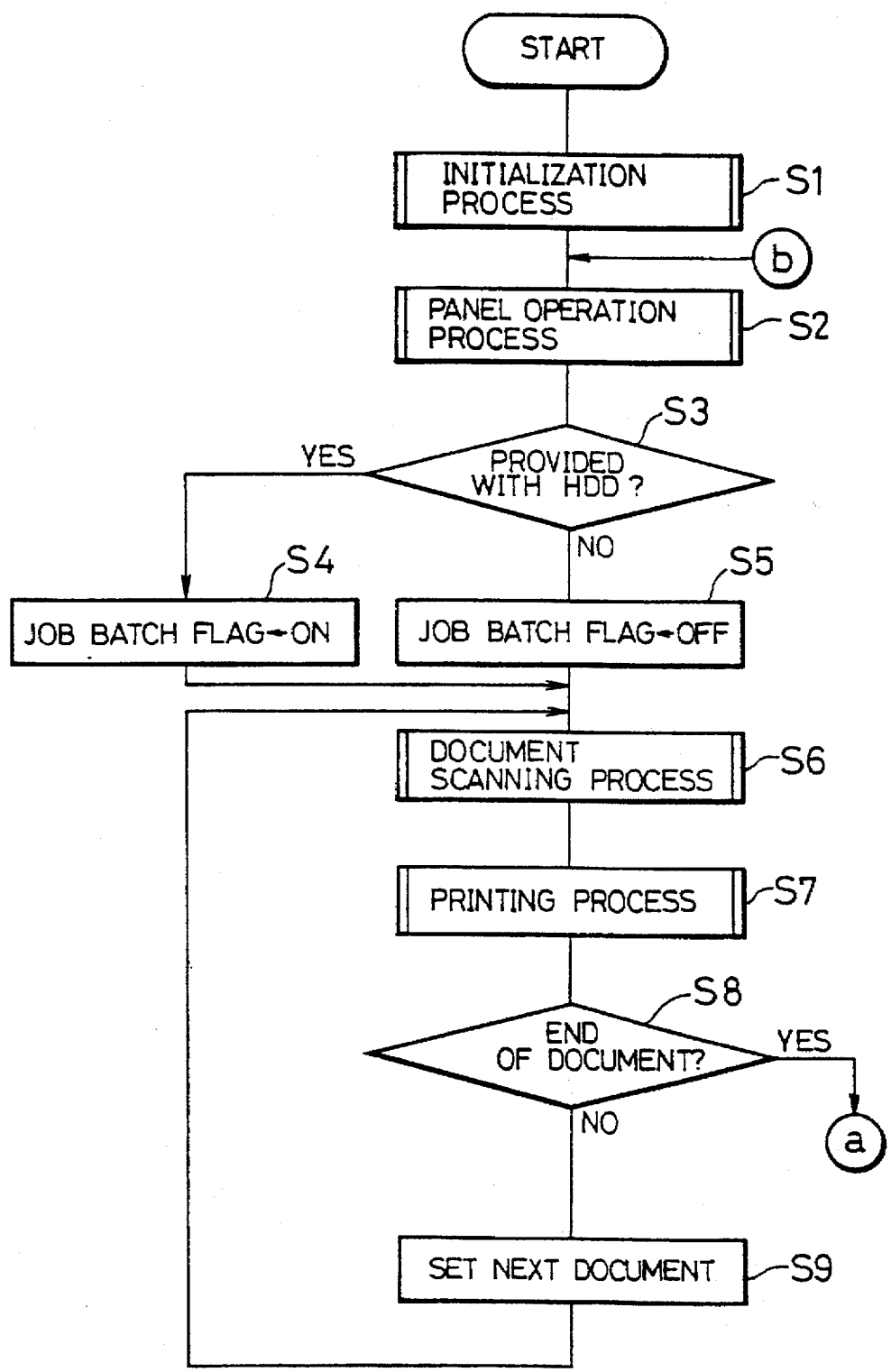
FIG. 7 is a flowchart showing a copy operation in the digital copying machine.
Figure 8:
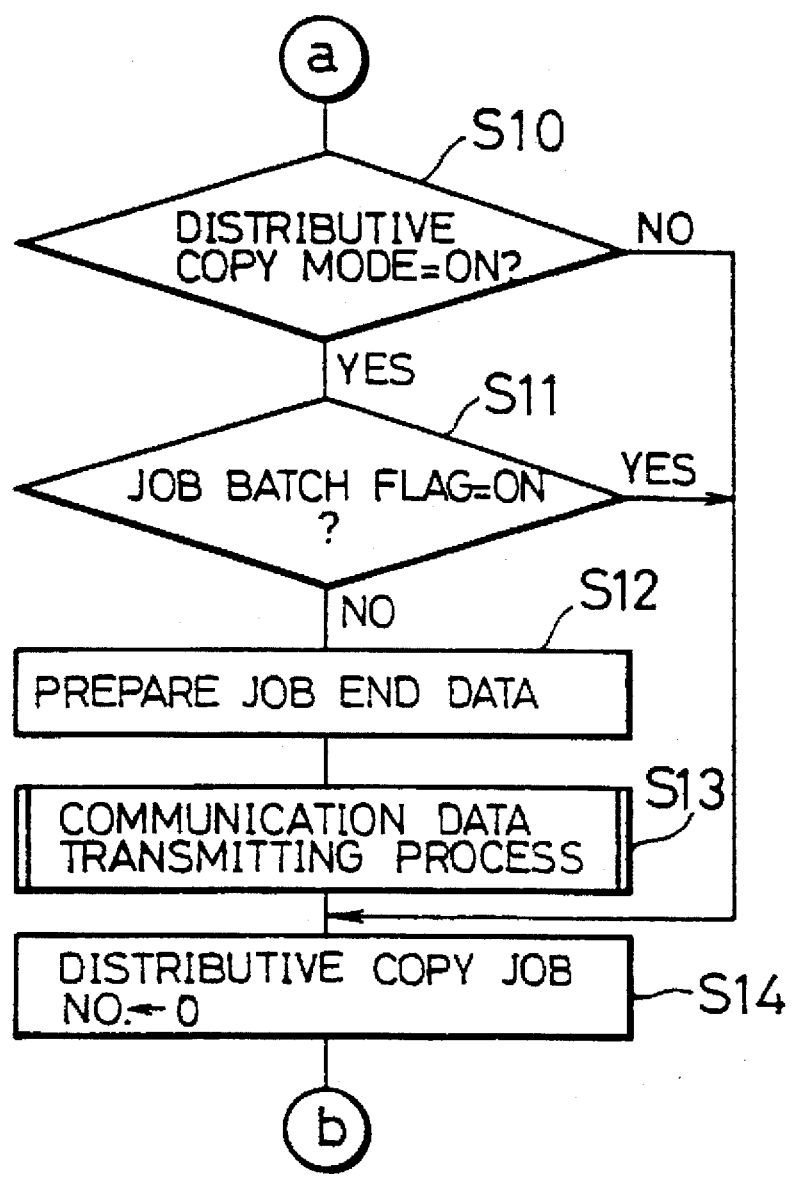
FIG. 8 is a flowchart showing a copy operation in the digital copying machine.

The flowcharts of FIG. 7 and FIG. 8 show entire operations of the copying machines. When a power switch of the copying machine is turned ON, the initializing process is executed (S1), and the copying machine is set in a stand-by state until a panel operation using the panel unit 6 is performed in S2. When the panel operation is performed (S2), the corresponding operation is performed as will be described later. Here, when the print start switch is turned ON, it is checked whether or not the HDD 7 is provided in the copying machine (S3). If so, the job batch flag is set ON (S4). If not, the job batch flag is set OFF (S5).

Thereafter, in order to obtain the image data on the document from the scanner section 2, the scanning operation is started (S6). The image data from the scanner section 2 is transmitted to the printing section 3 to be printed (S7). In the case where the job batch flag is set ON, plural documents are scanned on one time. On the other hand, in the case where the job batch flag is set OFF, the document is scanned by page by page to be copied, and this process is repeated for plural pages. Therefore, after the printing process in S7 is performed, it is checked whether or not a sequential copy job of the document is completed (S8).

In S8, if it is determined the copy job of the document is not completed, the next document is set (S9). Then, the sequence goes back to S6 where the copy operations of the document (S6 and S7) are repeated until it is determined that the copy job for the document is completed. When the copy job for the document is completed, as shown in FIG. 8, it is checked whether or not the distributive copy mode is set ON (S10). If not in S10, the copy operation is performed in the single copy mode, the distributive copy job No. is reset to "0" (S14), and the sequence goes back to S2 to be set in the stand-by state for the start key in the panel unit 6 to be operated.

When the distributive copy mode is set ON, it is checked whether or not the job batch flag is set ON (S11). If not, the job end data is prepared (S12), and the communication data transmitting process is performed so as to transmit the job end data to other copying machines which perform the distributive copy job (S13). Thereafter, the distributive copy job No. is reset to "0" (S14). Like the previously described case, the sequence goes back to S2. If it is determined in S11 that the job batch flag is set ON, the job end data is prepared upon completing the document scanning process and is transmitted as in the manner to be described later. Then, the sequence directly goes onto S14.

Figure 9:
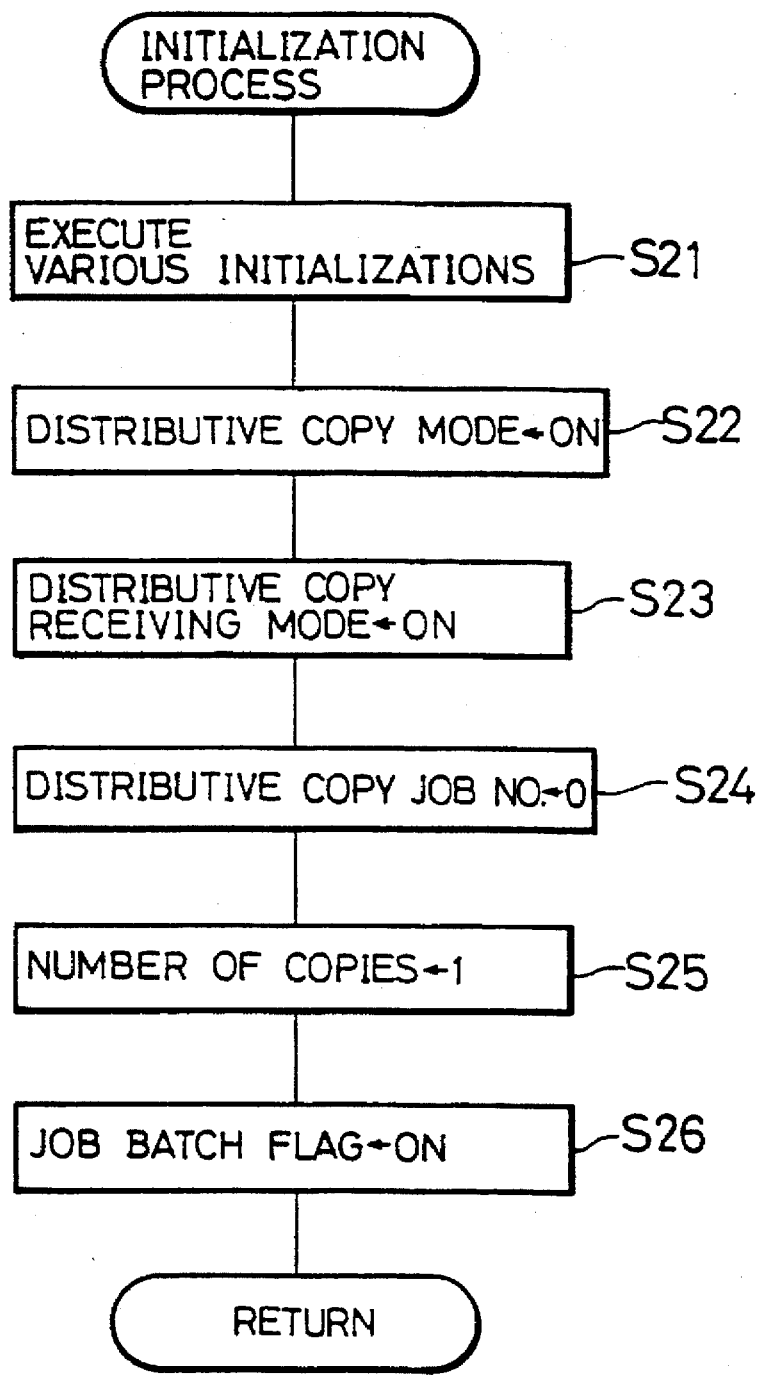
FIG. 9 is a flowchart showing the initialization process in the flowchart of FIG. 7.

The respective processes of the entire operations will be explained in more detail. First, in the initialization process, as shown in the flowchart of FIG. 9, the initialization of the peripheral equipments such as the scanner section 2, the printing section 3, the image data advanced processing section 4, etc., and the initialization of the data is executed (S21). Then, the distributive copy mode is set ON (S22).

In this state, upon pressing the print start key, with respect to respective copying machines connected through the communication line 1, the distributive copy operation for distributing specified number of copies is executed. On the other hand, in the panel operation process to be performed at a later stage, when the distributive copy mode switch key is pressed, the distributive copy mode is set OFF to be set in the single copy mode, and the copy operation is performed in the copying machine alone in which the print start key is pressed.

Next, the distributive copy receiving mode is set ON (S23). In this state, if the status request data, the number of copies specifying data, the image data, etc., are transmitted from other copying machines being connected without operating the print start key of this machine, the distributive copy receiving process is executed by receiving these data. On the other hand, when the distributive copy receiving mode is set OFF by the panel operation to be described later, the distributive copy receiving process is not executed.

Next, the distributive copy job No. is set to "0" (S24). In this state, i.e., the distributive copy job No. is "0", it is determined that the distributive copy job is not being executed. On the other hand, if the distributive copy job No. is not less than 1, this shows the distributive copy job No. in execution.

In the next stage, the number of copies is set to "1" (S25), and then the job batch flag is set ON (S26). In this state, upon pressing the print start key, after storing the image data in all pages in the single copy job once in the HDD 7, the image data in the HDD 7 is read page by page into the RAM 11 to be printed, thereby performing a sequential copy operation. On the other hand, as a result of determination as to whether or not the HDD 7 is provided in S3 of FIG. 7, if the job batch flag is set OFF, the image data is read in the RAM 11 page by page, and this process is repeated for plural pages, thereby performing a copy operation.

As described, when the power switch is set ON, the copying machine is set in the initialization state where the distributive copy mode and the distributive copy receiving mode are set ON, and the distributive copy job No., and the number of copies are respectively set to "0" and "1", and the job batch flag is set ON.

Figure 10:
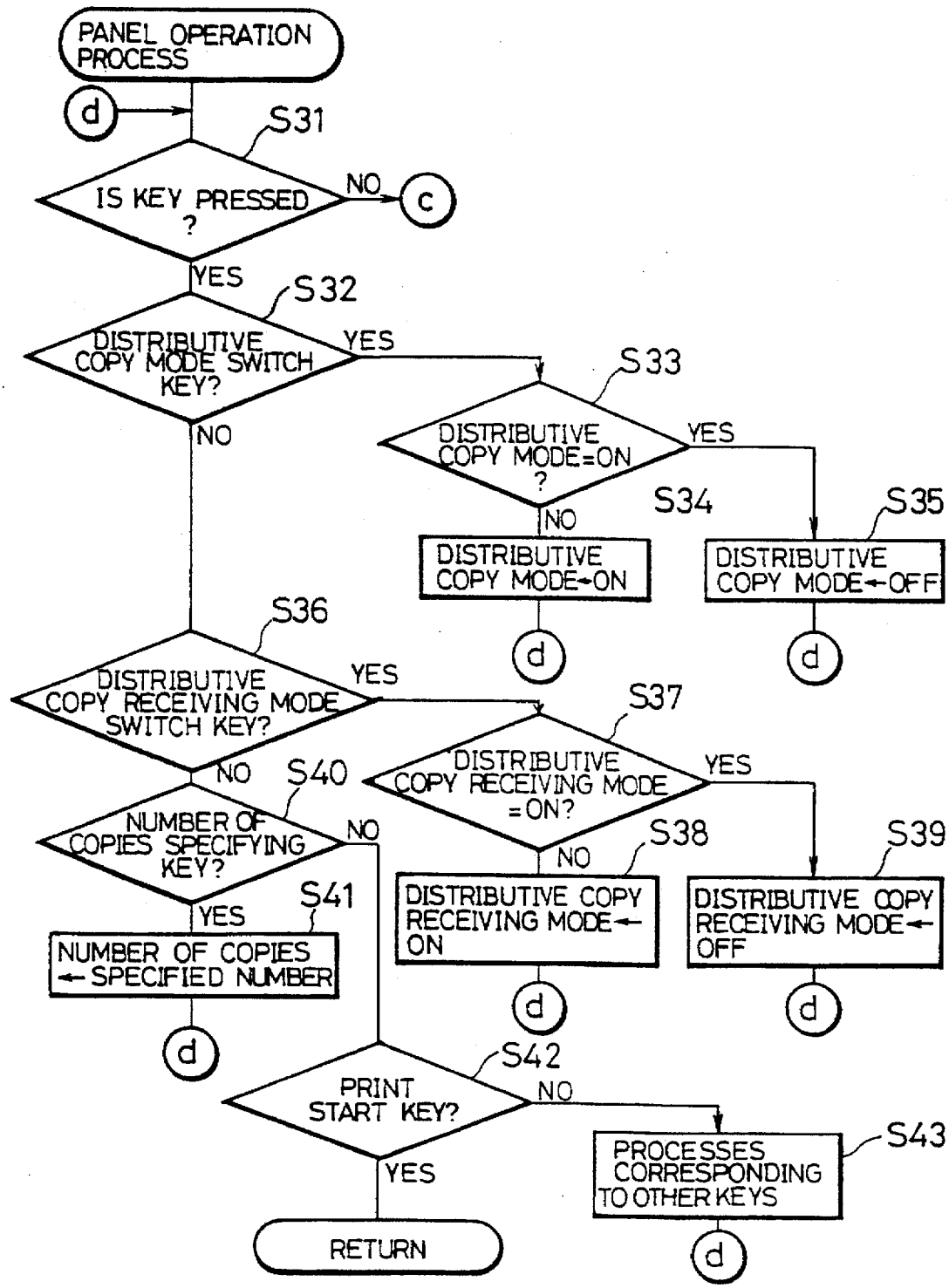
FIG. 10 is a flowchart showing the panel operation process in the flowchart of FIG. 7.
Figure 11:
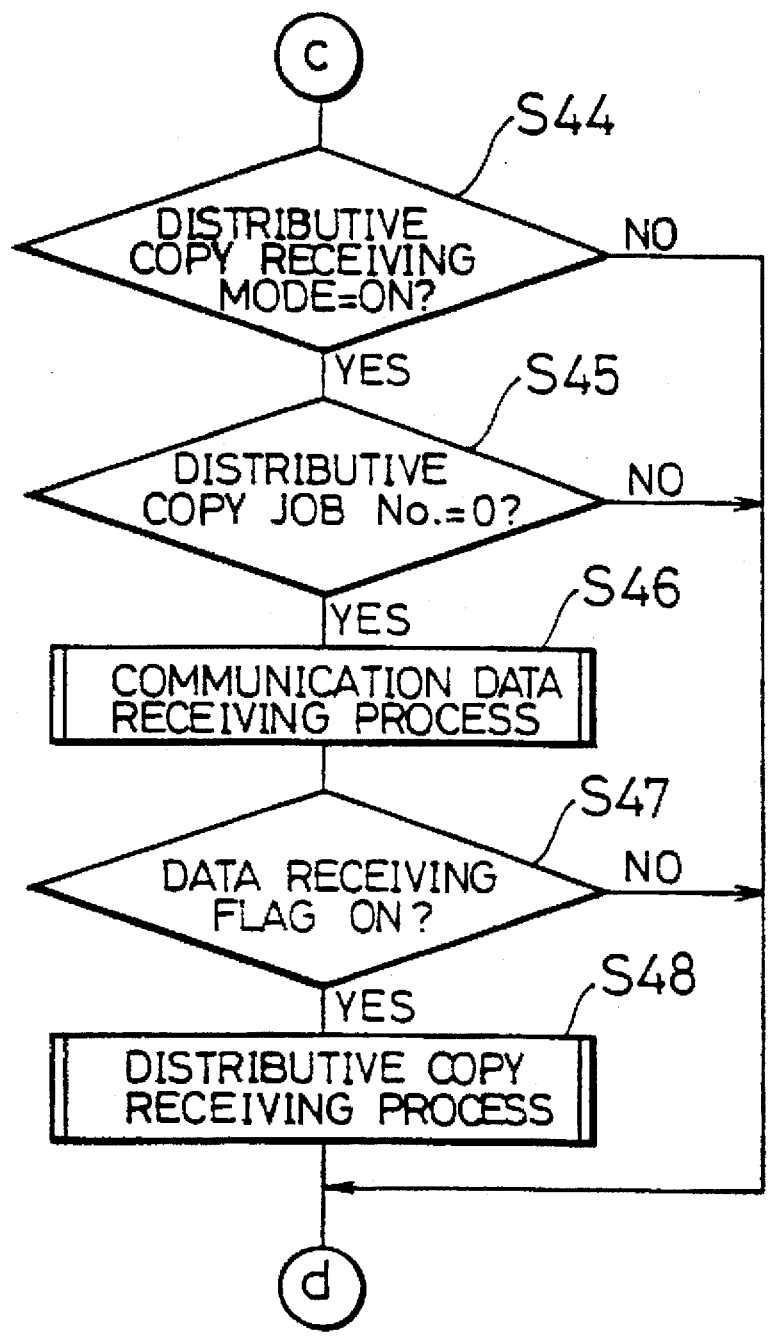
FIG. 11 is a flowchart showing the panel operation process in the flowchart of FIG. 7.

FIG. 10 and FIG. 11 are flowcharts respectively showing the operations of the panel operation process. First, it is determined whether or not a key is pressed (S31). If so, it is checked weather or not the pressed key is the distributive copy mode switch key (S32). If so, the distributive copy mode is checked (S33). If the distributive copy mode is set OFF as a result of check in S33, the distributive copy mode is set ON (S34), and the sequence goes back to S31. On the other hand, when the distributive copy mode is set ON as a result of check in S33, the distributive copy mode is set OFF (S35), and the sequence goes back to S31. When the distributive copy mode is set OFF, the copying machine is set in the single copy mode, and even if plural number of copies is set, the described distributive copy operation is not performed, and the copy operation is executed alone. As described, when the operator does not desire the distributive copy operation, the copy operation can be performed in the copying machine alone, thereby improving an operation efficiency.

On the other hand, if it is determined in S32 that the pressed key is not the distributive copy mode switch key, it is determined whether or not the pressed key is the distributive copy receiving mode switch key (S36). If so, the distributive copy receiving mode is checked (S37). As a result, if the distributive copy receiving mode is set OFF, the distributive copy receiving mode is set ON (S38). On the other hand, if the distributive copy receiving mode is set ON, the distributive copy receiving mode is set OFF (S39), and the sequence goes back to S31. When the distributive copy receiving mode is set OFF, various data to be received when executing the distributive copy operation to be described later are not received. Therefore, since the copy operation can be executed independently, an improved operability can be achieved.

In S36, if the pressed key is not the distributive copy receiving mode switch key, it is checked whether or not the pressed key is the number of copies set key (S40). If so in S40, the number of copies is set to the number specified by operating the key (S41), and the sequence goes back to S31. On the other hand, if the pressed key is not the number of copies set key, it is checked whether or not the pressed key is the print start key (S42). If so, the panel operation process is terminated, and the sequence goes on to the next process.

If it is determined in S42 that the pressed key is not the print start key, processes corresponding other key than the distributive copy mode switch key, the distributive copy mode receiving switch key and the print start key are performed (S43), and the sequence goes back to S31.

If the key operation is not made, the sequence skips from S31 to S44 (see FIG. 11), and the distributive copy receiving mode is checked. Then, if the distributive copy receiving mode is set OFF, the sequence directly goes back to S31. On the other hand, if the distributive copy receiving mode is set ON, the distributive copy job No. is checked (S45). If the job No. is not "0", the sequence goes back to S31. If the distributive copy job No. is "0", the communication data receiving process (to be described later) is executed (S46), and the data receiving flag is checked indicating whether or not the received data exits (S47). If the data receiving flag is set ON, the distributive copy receiving process (to be described later) is executed (S48), and distributed number of copies of the image data transmitted from the transmitting end are produced, and the sequence goes back to S31. On the other hand, if the data receiving flag is set OFF, the sequence directly goes back to S31.

Figure 12:
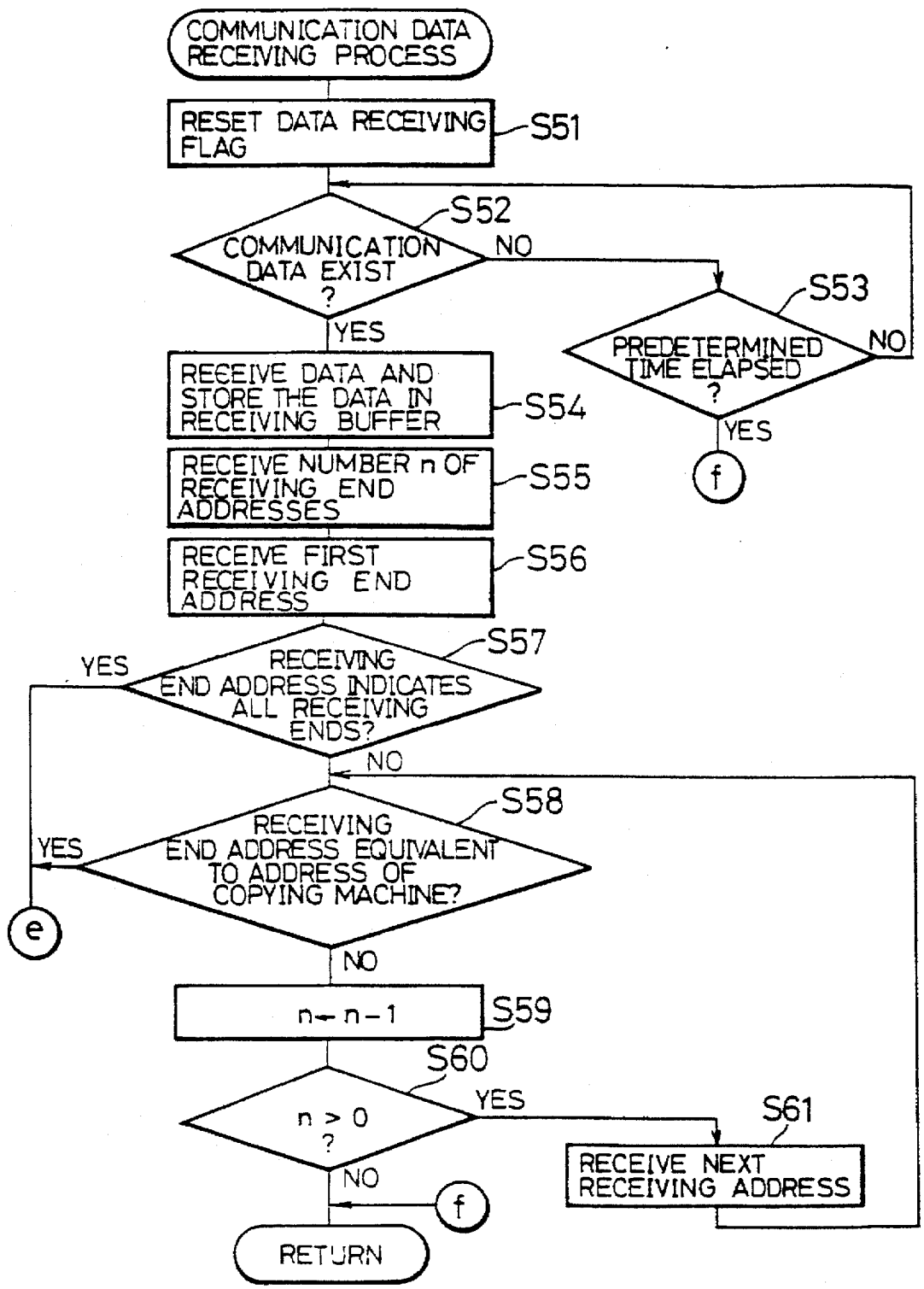
FIG. 12 is a flowchart showing the communication data receiving process in the flowchart of FIG. 11.

The respective communication data receiving processes will be explained in reference to the flowcharts of FIG. 12 and FIG. 13. First, the data receiving flag indicating whether or not the received data exists is reset (S51), and it is checked whether or not the communication data is on the communication line 1 (S52). If not, it is checked whether or not a predetermined elapse of time has passed without receiving any communication data (S53). If so, the processing routine is terminated without executing any process. If not, the sequence goes back to S52. If the communication data exists in S52, the data is received, and the received data is stored in a receiving buffer in the RAM 11 (S54).

By the communication data stored in the receiving buffer, the number of receiving addresses n is obtained (S55), and the address of the first receiving end is obtained (S56). Then, it is determined whether or not the address indicates that all of other copying machines are of receiving end (S57). If not, it is determined whether or not the receiving end address is equivalent to the address of the copying machine which receives the communication data (S58).

If not, one is extracted from the number n of the receiving end addresses (S59). Then, it is determined whether or not the value is greater than "0" (S60). If so, the next receiving end address in the communication data is obtained (S61). Thereafter, the sequence goes back again to S58 where it is determined whether or not the receiving end address is equivalent to the address of the copying machine. In S60, if n is not greater "0", it is determined that the address of the copying machine cannot be found in the transmitting end address set in the communication data, thereby terminating the routine of the communication data receiving processing routine.

Figure 13:
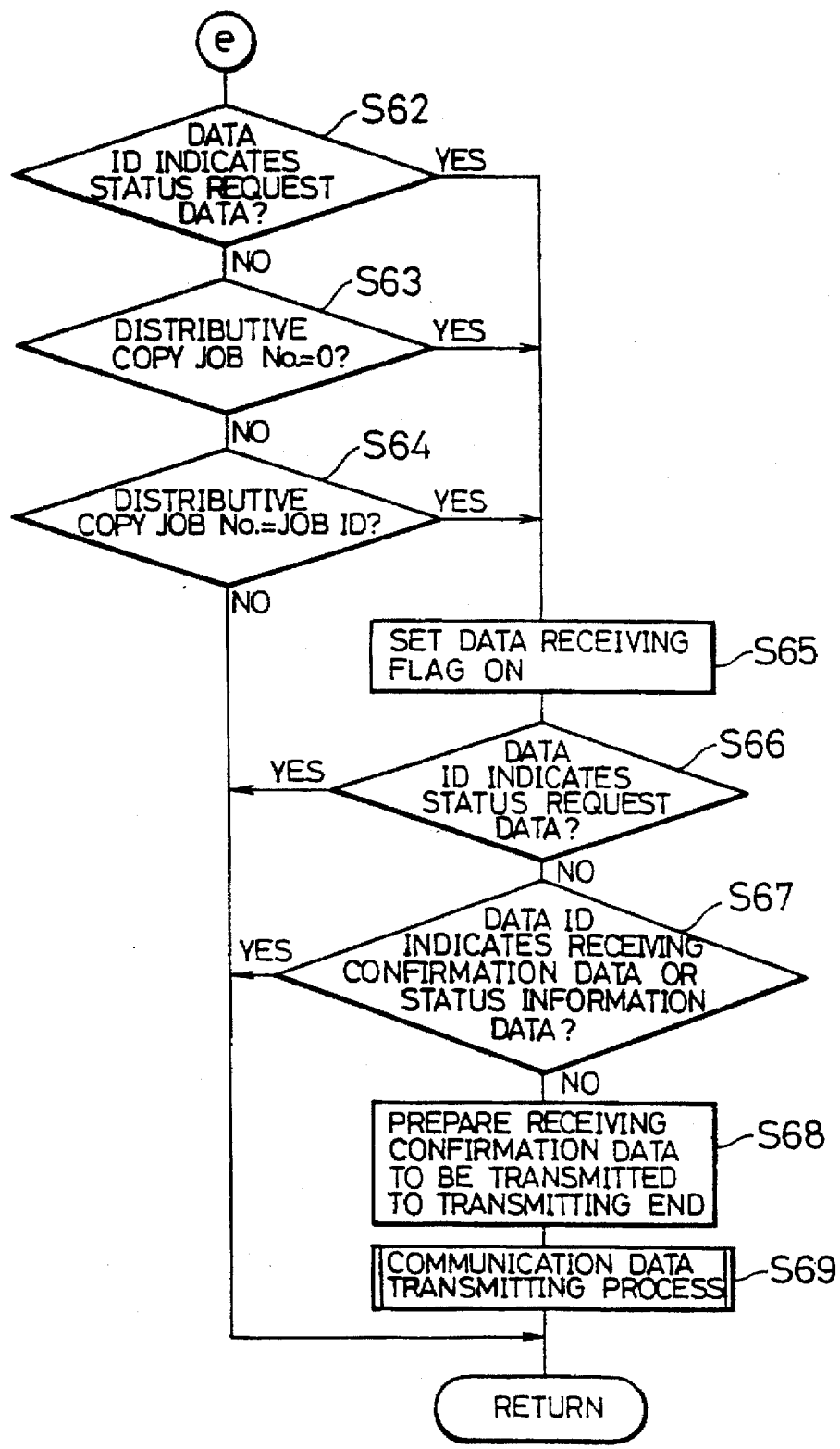
FIG. 13 is a flowchart showing the communication data receiving process in the flowchart of FIG. 11.

On the other hand, if the receiving end address indicates that all of other copying machines are of receiving end in S57, or if the receiving end address is equivalent to the address of the copying machine in S58, as shown in FIG. 13, it is checked whether or not the communication data ID indicates a status request data (S62). If the data ID is a status request, the data receiving flag is set (S65).

Or if the data ID is not a status request, it is checked whether or not the distributive copy job No. of the copying machine is "0" (S63). Here, if the distributive copy job No. is "0", the data receiving flag is set ON (S65). The fact that the distributive copy job No. is "0" suggests that the copying apparatus is not in execution of a distributive copy job at this moment, and the received data is related to the initial distributive copy job.

In S63, if it is determined that the distributive copy job No. is not "0", this suggests that the copying apparatus is in execution of another distributive copy job. Next, it is checked whether or not the distributive copy job No. of the copying machine is equivalent to the job ID (S64). If the distributive copy job No. is equivalent to the job ID of the communication data, the data receiving flag is set ON (S65). On the other hand, if the distributive copy job No. is not equivalent to the job ID, the received communication data is not the distributive copy job in execution nor the status request data, thereby terminating the processing routine.

After setting the data receiving flag ON in S65, it is checked whether or not the data ID is the status request (S66). If not, it is checked whether the data ID is the receiving confirmation data or the status information data (S67). If the data ID is either one of the status request data, receiving confirmation data and the status information data, the processing routine is terminated. On the other hand, if the data ID is neither one of the status request data, receiving confirmation data nor the status information data, the receiving confirmation data with respect to the transmitting end is prepared so that the copying machine of the transmitting end can confirm the receiving of the receiving end (S68). Thereafter, the communication data transmitting process is performed (S69), and the prepared receiving confirmation data is transmitted to the transmitting end, thereby completing the processing routine.

Figure 14:
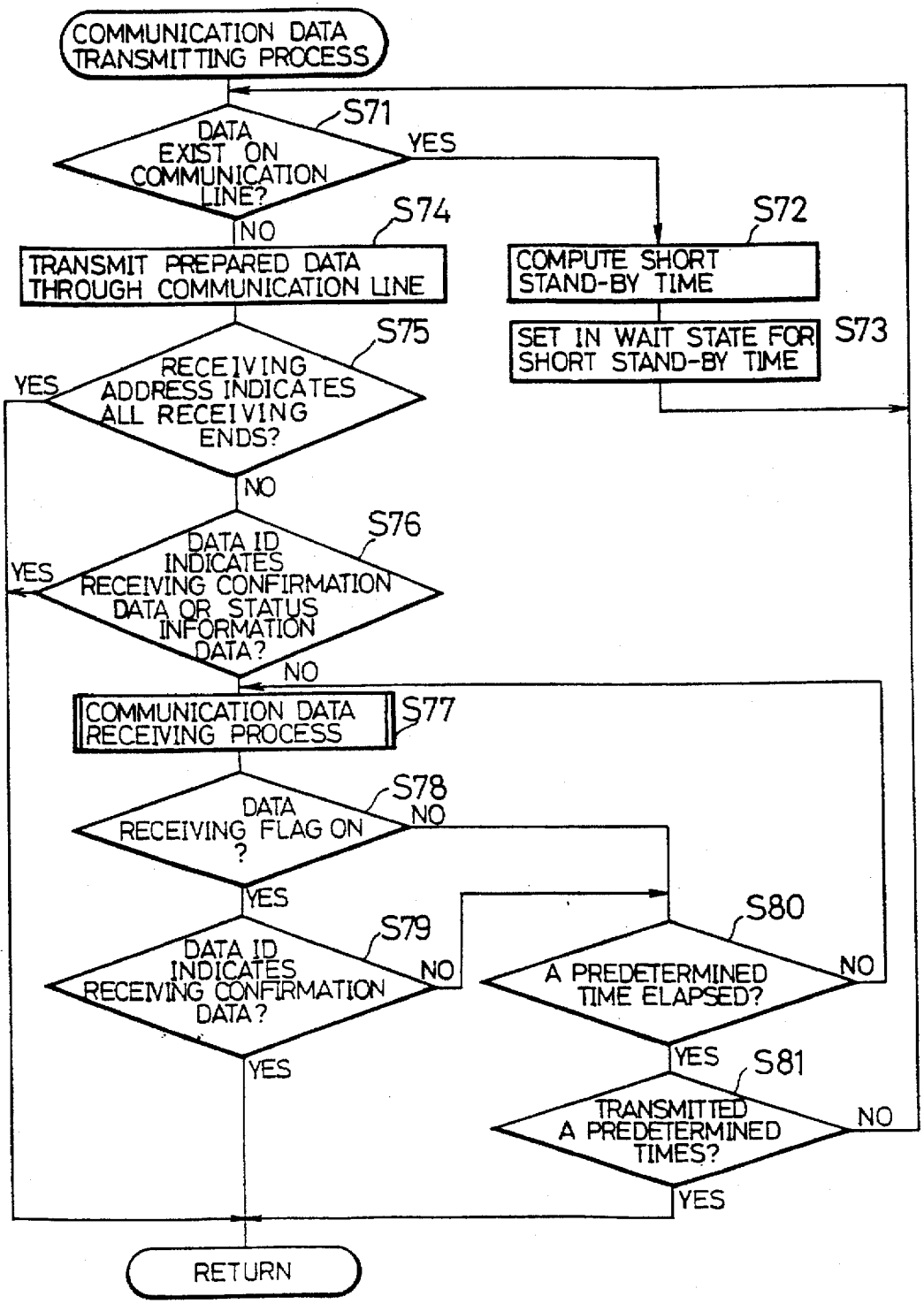
FIG. 14 is a flowchart showing the communication data transmitting process in the flowchart of FIG. 13.

FIG. 14 is a flowchart showing the operation of the communication data transmitting process. Prior to transmitting the prepared data, it is checked whether or not the data is being transmitted or received through the communication line 1 (S71). If so, a short wait time is computed by a random number (S72). After elapsing the wait time (S73), the sequence goes back to S71. In S71, if the data is not being transmitted or received through the communication line 1, the prepared data is transmitted through the communication line 1 (S74), and it is checked whether or not the receiving address for the communication data indicates that all of other copying machines are of receiving end (S75). If not, it is checked whether or not the data ID of the data to be transmitted suggests the receiving confirmation data, or the status information (S76). If the data ID suggests the receiving confirmation data or the status information in S75 that all of other copying machines are of receiving end, as the receiving confirmation from the receiving end is not required, the processing routine is terminated.

On the other hand, if the receiving end address does not indicate that all of other copying machines are of receiving end nor the data ID of the transmitted data is not the receiving confirmation data nor the status information data, the subsequent communication data receiving process is executed (S77). After performing the communication data receiving process, it is checked whether or not the data receiving flag is set ON (S78). If the received data exits, it is checked whether or not the data ID of the received data indicates receiving confirmation data (S79). If so, as the receiving is confirmed, the processing routine is terminated.

If it is not confirmed in S78 that the data receiving flag is set ON or it is determined in S79 that the data ID does not indicate the receiving confirmation data, it is checked whether or not a predetermined elapse of time has passed (S80). Here, the communication data receiving process is performed until a predetermined elapse of time has passed, so a to continue the confirmation of the receiving confirmation data. After a predetermined elapse of time has passed, it is checked whether or not prepared data is transmitted a predetermined number of times (S81). Until the data is transmitted the predetermined number of times, the sequence goes back to S71 to repeat the transmission. If it is determined in S81 that the number of transmissions reach a predetermined number, the processing routine is terminated.

Figure 15:
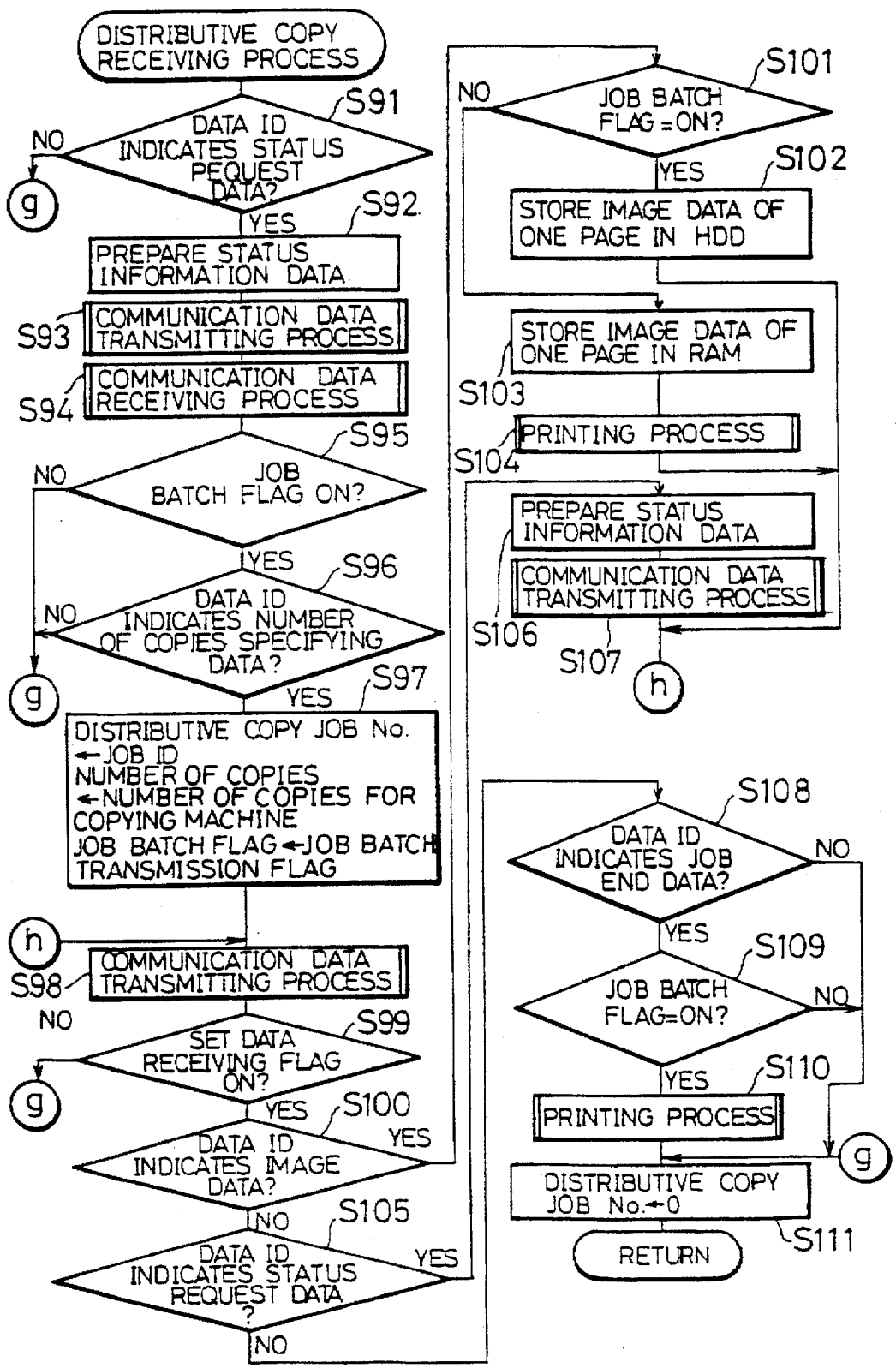
FIG. 15 is a flowchart showing the distributive copy receiving process in the flowchart of FIG. 11.

Next, in the previous panel operation process, under the conditions that the distributive copy receiving mode is set ON, and the distributive copy job No. is set to "0", the distributive copy receiving process in the case where the communication data is received from other copying apparatus being connected will be explained in reference to the flowchart of FIG. 15. First, it is checked whether or not the data ID of the received data indicates the status request data (S91). If not, as this suggests that the operation is not performed in correct order, the distributive copy job No. is set to "0" (S111), thereby terminating the processing routine. If the data ID suggests the status request data, the status information data is prepared to respond to the transmitting end (S92), and the prepared status information data is transmitted by the previously described communication data transmission processing routine (S93).

Thereafter, data receiving process is performed by the communication data receiving processing routine (S94), and it is checked whether or not the data receiving flag which confirms the received data is set (S95). If the data received flag is set, it is checked whether or not the received communication data is the number of copies specifying data (S96). If the communication data is not the number of copies specifying data or the data receiving flag is not set ON, as this suggests that the process is not performed in correct order, the distributive copy job No. is set to "0" (S111), and the processing routine is terminated.

If the communication data is the number specifying data, based on the received number of copies specifying data, the distributive copy job No. of the copying machine is set to the job ID in the number specifying data. Among the specified number of copies, the number of copies to be distributed to the copying machine is set to the number corresponding to the address of the copying machine. Further, based on the job batch transmitting flag in the number of copies specifying data, ON/OFF of the job batch flag in the copying machine is set (S97).

Next, the data receiving process is performed again by the communication data receiving processing routine (S98), and it is checked whether or not the data receiving flag is set ON (S99). If the data receiving flag is set ON, it is checked whether or not the communication data is the image data (S100). On the other hand, if the data receiving flag is not set ON, and the communication data is not received, as this suggests that the process is not performed in correct order, the distributive copy job No. is set to "0" (S111), and the processing routine is terminated.

If the received communication data is the image data, it is checked whether or not the job batch flag is set ON (S101). If the job batch flag is set ON, the image data of one page is stored in the HDD 7 (S102), and the sequence goes back to S98, and the receiving and storing of the image data of the next page are performed. If the job batch flag is set OFF, the image data of one page is stored in the RAM 11 (S103), and the printing process for the image data of one page is executed (S104), and the sequence goes back to S98. Here, if the job batch flag is set OFF, this suggests that the copying apparatus in which executes the distributive copy is not provided with the HDD 7. Therefore, since all of the sequential image data printed by one copy job cannot be stored, every time the image data of one page is received, the printing process is executed.

If it is determined in S100 that the received data is not the image data, it is checked whether or not the data ID is a status request (S105). If the data is the status request, the status information data for returning it to the transmitting end is prepared (S106), and the status information data prepared by the communication data transmission processing routine is transmitted (S107), and the sequence goes back to S98. As described, irrespectively of the status of the copying machine being connected, the status request data is transmitted. Also, when the copying machine being in execution of the distributive copy operation receives the status request data, the status information data is always returned. Therefore, the copying machine of the transmitting end can recognize the number of copying machines in the idle state. Therefore, even when one distributive copy operation is being executed, using other copying machines in the idle state, another distributive copy operation can be controlled independently of the previous distributive copy operation. As a result, plural distributive copy jobs can be executed simultaneously.

On the other hand, if it is determined in S105 that the data is not the status request data, it is checked whether or not the data ID is the job end data (S108). If not in S108, since the process is not performed in correct order, the distributive copy job No. is set to "0" (S111), and the processing routine is terminated. On the other hand, if the data ID indicates the job end data in S108, it is checked whether or not the job batch flag is set ON (S109). If the job batch flag is set ON, the printing process is performed using the image data stored in the HDD 7 (S110). Then, after the printing process is completed, the distributive copy job No. is set to "0" for the next distributive copying (S111), and the processing routine is terminated. On the other hand, when the job batch flag is set OFF, since the image data is already printed for each image data, without executing the printing process, the distributive copy job No. is set to "0" (S111), thereby terminating the processing routine.

Figure 16:
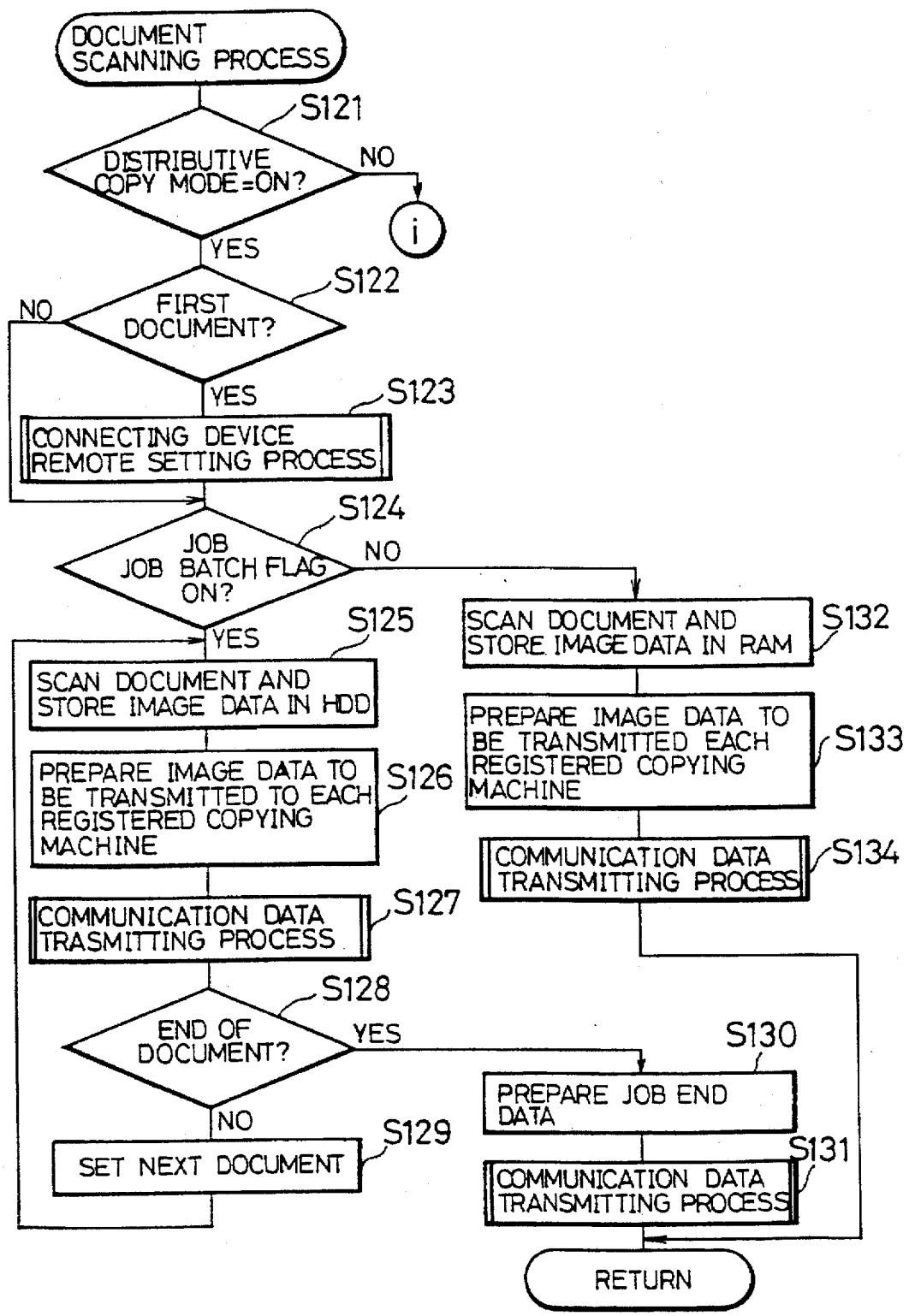
FIG. 16 is a flowchart showing the document scanning process in the flowchart of FIG. 7.

Next, in the previous panel operation process, the document scanning process to be executed when the print start key is pressed will be explained in reference to the flowcharts of FIG. 16 and FIG. 17. First, it is checked whether or not the distributive copy mode is set ON (S121). If so, this copying machine becomes the transmitting end of the distributive copy job. Then, it is checked whether or not the document is the first document (S122). If so, the connecting device remote setting processing routine (to be described later) is performed (S123), and the respective statuses of the copying machines being connected are checked so as to register the copying machines which divide the distributive copy job. In the meantime, according to the number of copies specified in the panel operation process, the number of copies to be distributed to each copying machine is set by the previously described computing method. When the connecting device remote set processing is completed, the job batch flag is checked (S124).

On the other hand, if the document is not the first document in S122, the number of copies is already set in each copying machine. Therefore, the sequence directly goes onto the next step where the job batch flag is checked (S124). In the connecting device remote set process, the job batch flag is set depending on whether or not all of the copying machines (in their idle state) available for the distributive copy job are provided with the HDD 7. Namely, in S124, if the job batch flag is set ON, as all of the copying machines available for the distributive copy job are provided with the HDD 7, a sequential image data used in one distributive copy job can be stored in the HDD 7. Therefore, when the job batch flag is set ON, by scanning the document, the resulting image data is stored in the HDD 7 (S125).

Next, based on the scanned image data, the image data to be transmitted to the registered copying machine is prepared (S126), and the communication data transmission process is performed (S127), thereby transmitting the prepared data to each copying machine.

When the communication data transmission processing routine is completed, it is confirmed whether or not all the document has been scanned (S128). If not, the next document is set (S129), and the sequence goes back to S125. Then, until it is determined in S128 the scanning of the document is completed, the processes of scanning the document, storing the image data, and transmission of the image data to each copying machine are repeated. Then, if the scanning of the document is completed in S128, the job end data is prepared (S130). The job end data is transmitted by the communication data transmission process (S131), thereby completing the processing routine.

On the other hand, if the job batch flag is set OFF in S124, since only the image data of one page can be stored in the RAM 11 of each copying machine which executes the distributive copy, the transmitting end copying machine scans the document for one page, and the resulting image data is stored in the RAM 11 (S132). Based on the image data, the image data to be transmitted to each of the registered copying machines is prepared (S133), and the communication data transmission processing routine is performed (S134). Then, the prepared image data is transmitted to each copying machine, and the processing routine is terminated. Here, if the job batch flag is set OFF, the document scanning process and the printing process are repeated by the image data of one page. Therefore, the job end data cannot be transmitted. Therefore, in this case, as shown in the flowchart of FIG. 8, upon completing the printing process of all the document, the job end data is prepared to be transmitted to each copying machine.

Figure 17:
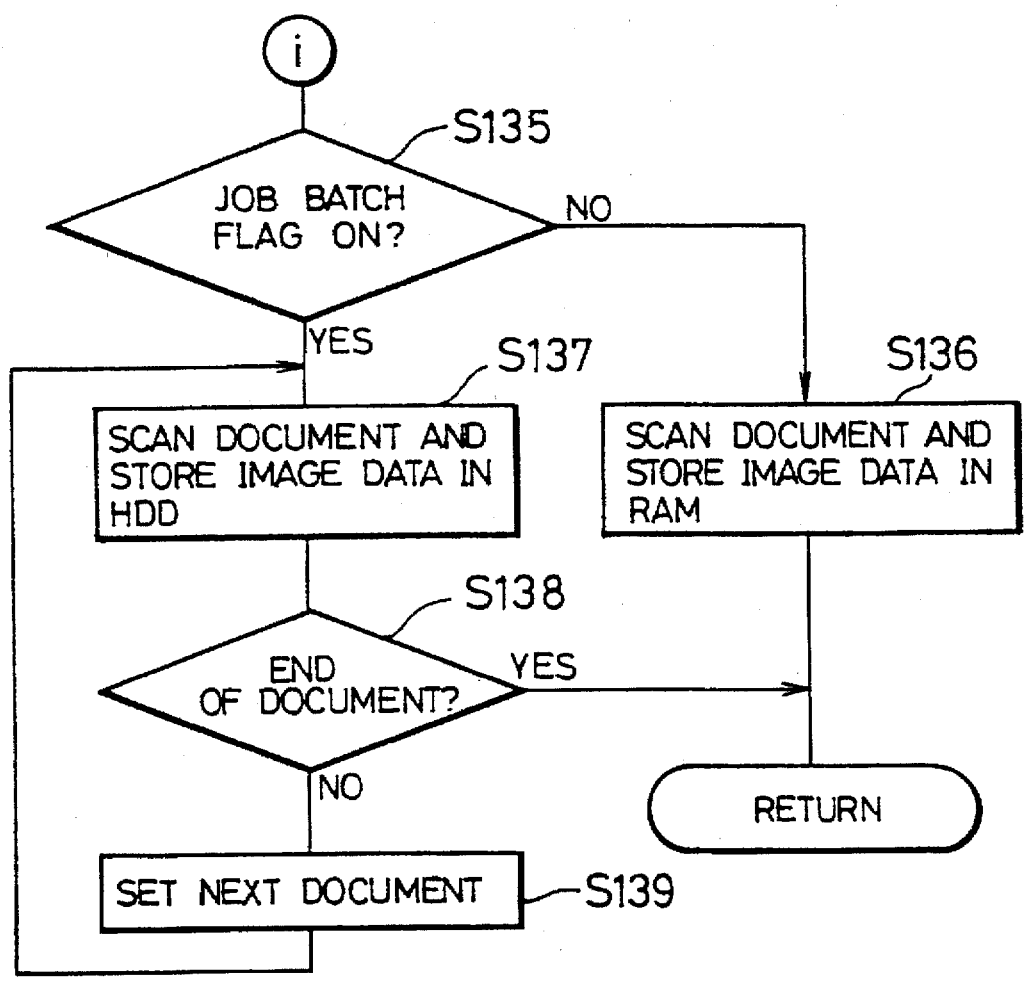
FIG. 17 is a flowchart showing the document scanning process in the flowchart of FIG. 7.

In S121, if it is determined that the distributive copy mode is set OFF, i.e., the single copy mode is set, as shown in FIG. 17, the job batch flag is checked (S135). The job batch flag to be checked is set beforehand based on the determination as to whether or not the copying machine is provided with the HDD 7 (see S3 in FIG. 7). Therefore, if the job batch flag is set OFF, the document is scanned, and the image data is stored in the RAM 11 (S136), thereby terminating the processing routine.

On the other hand, if the job batch flag is set ON in S135, the document is scanned, and the image data is stored in the HDD 7 (S137). Then, it is checked whether or not the scanning of the document is completed (S138). If it is not confirmed that the scanning of the document is completed, the next document is set (S139). Then, the sequence goes back to S137, and the scanning of the document and the storing of the image data are performed. On the other hand, if it is confirmed in S138 that the scanning of the document is completed, the processing routine is terminated. As described, if the distributive copy mode is set OFF, since the copying machine is driven independently, the image data and the job end data are not transmitted to other copying machines.

In either case of the distributive copy mode or the single copy mode, when the described scanning of the document is completed, the printing process (to be described later) is executed by the printing section 3, thereby forming images based on the image data resulting from scanning.

In the distributive copy mode, the connecting device remote set processing to be performed by the transmitting end copying machine will be explained in reference to the flowcharts of FIG. 18 and FIG. 19. The copying machine of the transmitting end in which the key input is made by the print start key in the distributive copy mode recognizes all of the copying machines being connected. Then, in order to determine the copying machines by which the distributive copy job is executed, the status request data to be transmitted to all of the copying machines is prepared (S141). Then, the communication data transmission processing routine is executed (S142), and the prepared status request data is transmitted. Then, the communication data receiving processing routine is executed (S143). Then, based on the result of check as to whether or not the data receiving flag is set (S144), the receiving of the communication data from each copying machine is confirmed. If the data receiving flag is not set, and the data is not received, the sequence moves onto to S149, and goes back to S143 where the receiving process is repeated until a predetermined elapse of time has passed.

If it is confirmed in S144 that the data receiving flag is set, and the data is received, it is checked whether or not the received data is the status information (S145). If the data is not the status information, the sequence goes onto S149, and the data receiving process is repeated until a predetermined elapse of time has passed. If the received data is the status information, it is checked whether or not the status of the copying machine suggested by the status information is the idle state (S146). If the confirmed state of the apparatus is the idle state, the status information is registered (S147). In the meantime, the copying machine is determines as one of the copying machine which execute the distributive copy. Thereafter, the receiving process is repeated until a predetermined elapse of time has passed.

In S146, if the confirmed state of the apparatus is not the idle state, the job ID of the status information is checked (S148). The subsequent distributive copy job is required to be distinguished from other distributive copy job. Therefore, it is required to set the job No. of the distributive copy job to be executed to any values other than the job ID of the status information. Therefore, by checking the job ID of the status information, the job ID of various data to be transmitted when executing the distributive copy job is computed. Thereafter, a receiving process is repeated until a predetermined elapse of time has passed.

Here, by arranging such that not only the status of the copying machine but also the optional functions of each copying machine is checked using the status information, only the copying machines which can execute the copy operation using the same setting of the transmitting end copying machine can be selected. For example, in the connecting state shown in FIG. 4, when the copying machine C1 is the transmitting end, and the distributive copy job is performed in the both sided printing mode, only the copying machine C3 having the both-sided copying function is selected. Thus, the distributive copy job is performed using two copying machines: the copying machine C1 and the copying machine C3. Similarly, when the copying machine of the transmitting end is provided with the staple function, the distributive copy job is executed using only the copying machine provided with the staple function.

Figure 18:
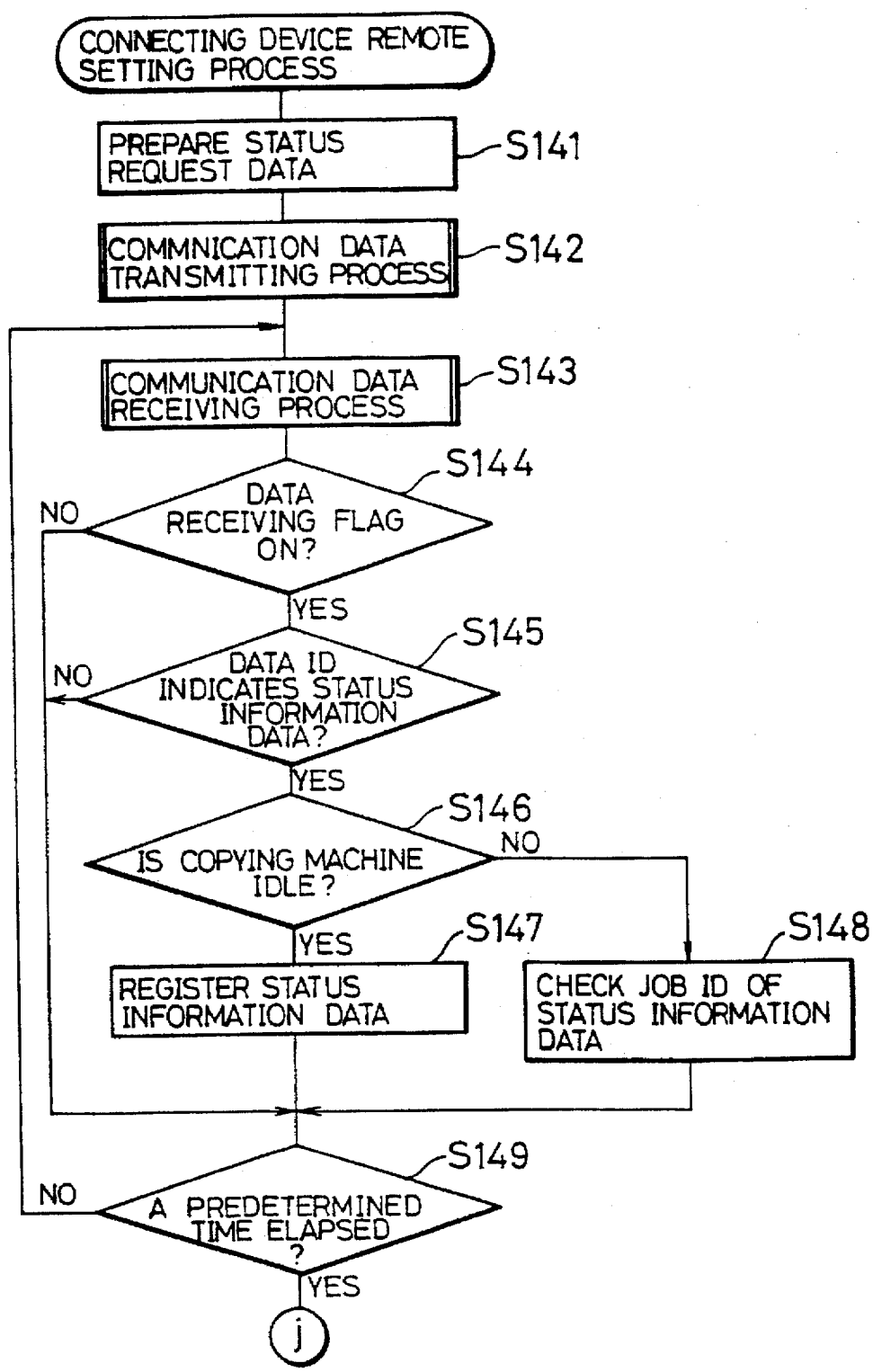
FIG. 18 is a flowchart showing the connecting device remote setting process in the flowchart of FIG. 16.
Figure 19:
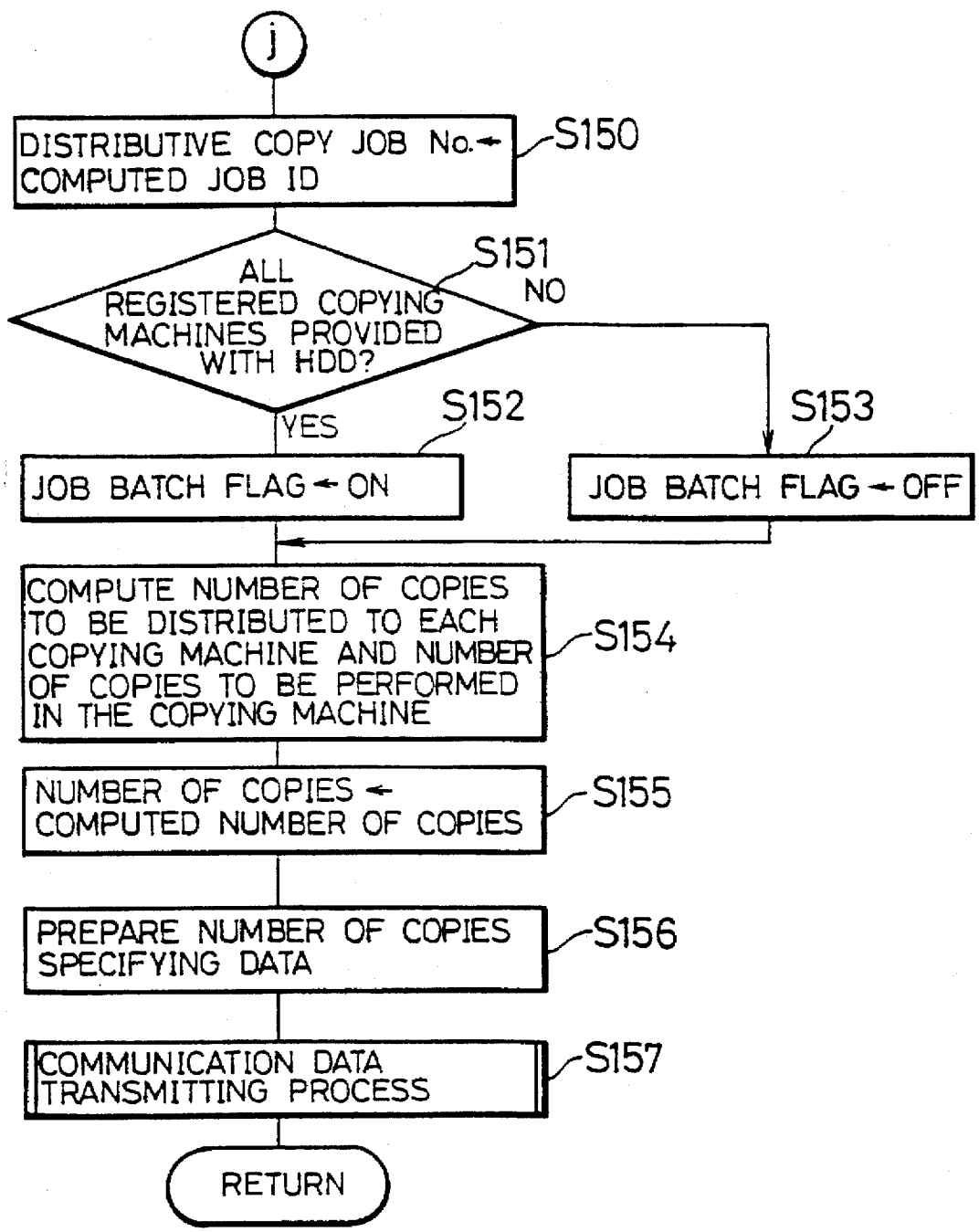
FIG. 19 is a flowchart showing the connecting device remote setting process in the flowchart of FIG. 16.

If it is determined that a predetermined elapse of time has passed in S149 of FIG. 18, it is determined that the status information data are obtained from all of the copying machines. Next, in S150 of FIG. 19, the distributive copy job No. of the copying machine (transmitting end) is set to the job ID computed based on the job ID of the status information data. Next, it is checked whether or not all of the copying machines in which the status information is registered are provided with the HDD 7 (S151). If so, the job batch flag is set ON (S152). On the other hand, if there are any copying machine which is not provided with the HDD 7, the job batch flag is set OFF (S153).

As described, in the connecting device remote set processing, by checking whether or not all of the copying machines being connected are provided with the HDD 7, the job batch flag is switched, and based on this job batch flag, the transmitting method of the image data (to be performed later) is selected. Namely, in the case where all of the copying machines are provided with the HDD 7, a sequential image data is transmitted without being interrupted. However, in the case where any copying machine which is nor provided with the HDD 7 is included, the image data is transmitted page by page, and image data of the next page is transmitted only after the printing process is completed. Therefore, by the described processes, the system of the present invention may include the copying machine which is not provided with the HDD 7.

Next, an appropriate number of copies to be distributed to each of the registered copying machine and the number of copies to be performed in the transmitting end copying machine are computed based on the registered number of copying machines or copying capacity obtained from the registered status information (S154). Then, the number of copies of the copying machine of the transmitting end is set to the number of copies of the copying machine thus computed (S155).

Thereafter, a number of copies specifying data to be transmitted to each of the registered copying machines is prepared (S156) based on the job batch flag set in S152 or S153 or the number of copies of each copying machine computed in S154 or the job ID previously computed, etc. Then, the communication data transmitting processing routine is executed so as to transmit the number of copies specifying data (S157), thereby terminating the processing routine.

Figure 20:
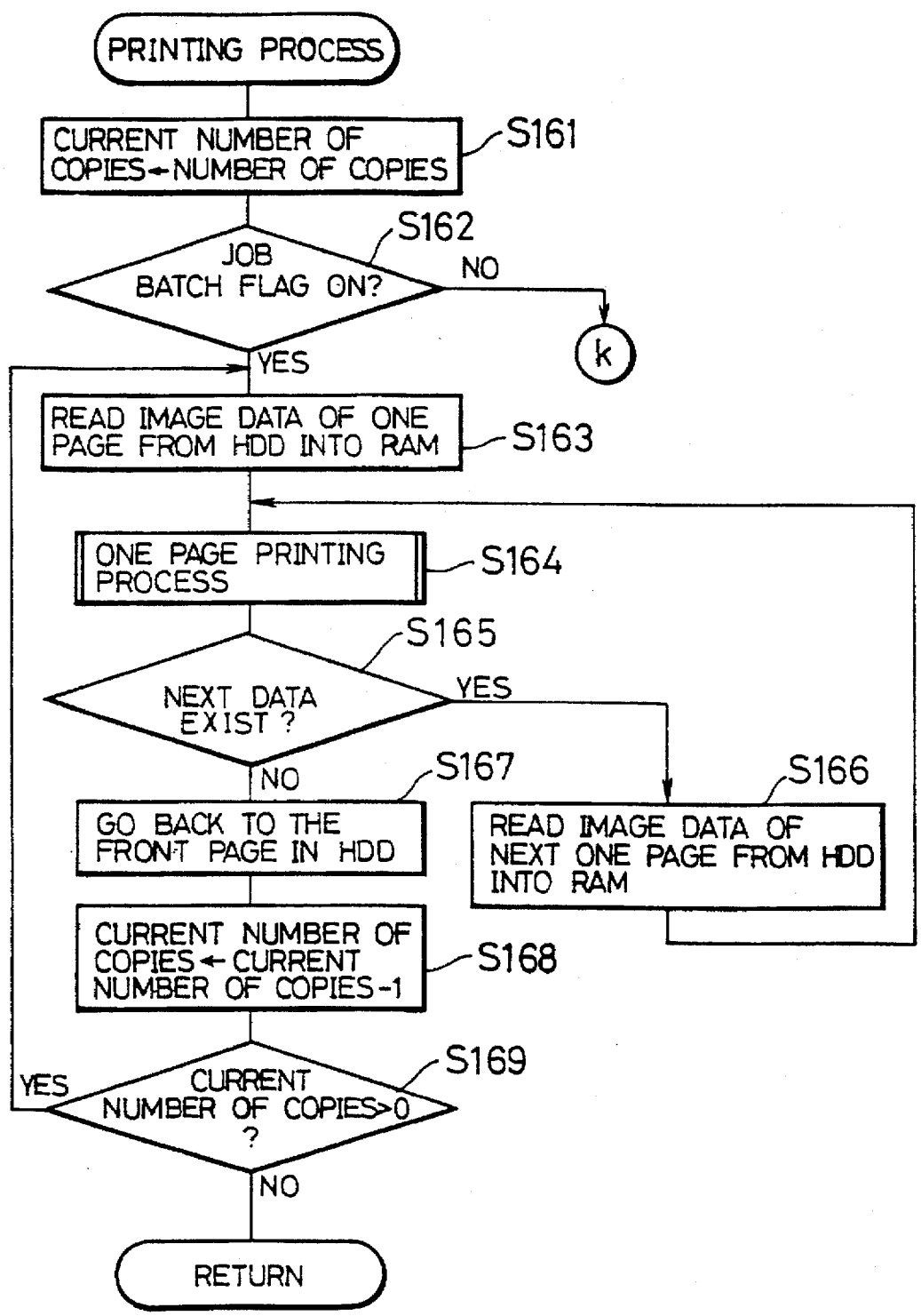
FIG. 20 is a flowchart showing the printing process in the flowcharts of FIG. 7 and FIG. 15.

The above-mentioned printing process will be explained below in reference to FIG. 20 and FIG. 21.

First, in order to store the specified or distributed number of copies, the current number of copies is set in the stored number of copies (S161). Then, it is checked whether or not the job batch flag is set ON (S162). If the job batch flag is set ON, the image data of one page stored in the HDD 7 is read in the RAM 11 by the document scanning process (S163). Then, by the printing process of one page, the image data is printed (S164). When the printing process of one page is completed, it is checked whether or not the next image data exists in the HDD 7 (S165). If so, the image data of the next page is read in from the HDD 7 to the RAM 11 (S166). Then, the sequence goes back to S164, and the printing process of one page is repeated until it is determined that the next image data does not exits in S165.

In S165 if it is determined that the next image data does not exist, the process goes back to the front page in the HDD 7 (S167), and the number of copies is reduced by one and renewed (S168), and the renewed number of copies is compared with "0" (S169). If the number of copies is greater than "0", this suggests that the number of copies have not reached the specified or distributed number of copies. Therefore, the sequence goes back again to S163, and the image data is read out from the front page of the HDD 7, and the printing process of one page is repeated (S164). In S169, if it is determined that the number of copies is "0", the specified or distributed number of copies has been completed, thereby terminating the processing routine.

Here, in the case where the HDD 7 is provided (the job batch flag is set ON in S162), reading of the image data from the HDD 7 and the printing process are repeated page by page until the number of copies reaches the specified or distributed number of copies. However, it may be also arranged such that plural copies are produced for each page.

Figure 21:
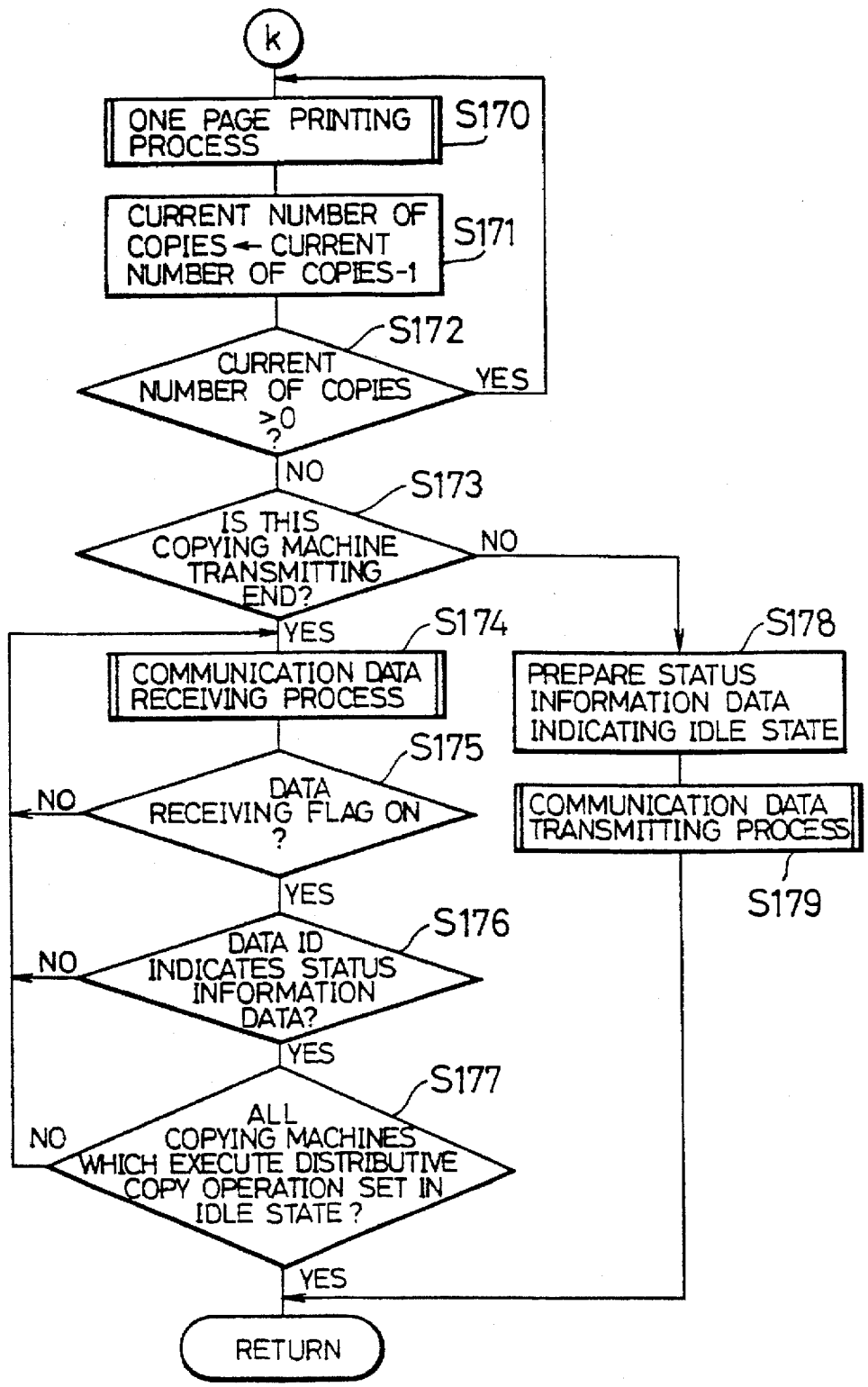
FIG. 21 is a flowchart showing the printing process in the flowcharts of FIG. 7 and FIG. 15.

In S162, if the job batch flag is set OFF, the image data stored in the RAM 11 is printed by one page printing process (S170) as shown in FIG. 21. Then, the number of copies is reduced by "1", and is renewed (S171). Then, it is checked whether or not the renewed number of copies is greater than "0" (S172). If so, this suggests that the copy operation is not completed. Therefore, the sequence goes back to S170 and the printing process is repeated until the number of copies becomes "0".

As described, in the printing process where the job batch flag is set OFF, the document is printed only by a page. In this case, the document scanning process and the printing process are repeated by each page of the document. Therefore, among plural copying machines which execute the distributive copy job, it is required to synchronize each time the printing process of one page is completed. Namely, in the transmitting end copying machine, the document scanning process of the next page is started only after confirming that all of the copying machines to which the copies are distributed complete the printing process of the image data of previous one page.

Therefore, when the job batch flag is set OFF, it is checked whether or not the copying machine is the transmitting end of the distributive copy job (S173). If not, the status information data indicating the idle state is prepared (S178), and the prepared status information data is transmitted to the transmitting end by the communication data transmitting process (S179), thereby completing the processing routine.

On the other hand, if the copying machine is the transmitting end, the communication data receiving process is executed (S174). Then, if it is confirmed that the data receiving flag is set (S175), it is checked whether or not the data ID of the subsequently received data is the status information data (S176). If the data is not received or the received data is not the status information data, the sequence goes back to S174, and the receiving process of the communication data are repeated. If the communication data is the status information data in S176, it is checked whether or not all of the copying machines which execute the distributive copy operation are set in the idle state (S177). If there is any copying machine which has not been set in the idle state, the sequence goes back to S174, and the communication data receiving process is repeated. Upon confirming that all of the copying machines are set in the idle state, the processing routine is terminated.

As described, when plural pages of the document are not printed together, every time the printing process for one page is performed, the printing process of the next page is performed after waiting for all of the copying machines complete the printing process, thereby preventing the problem that the data disappears by transmitting the image data of the next page to the copying machine in which a print error has occurred. Therefore, the system in which the execution of the distributive copy operation is permitted even when the copying machine which is not provided with the HDD 7 is included, thereby providing the system of reduced price by eliminating the HDD 7, etc.

Figure 22:
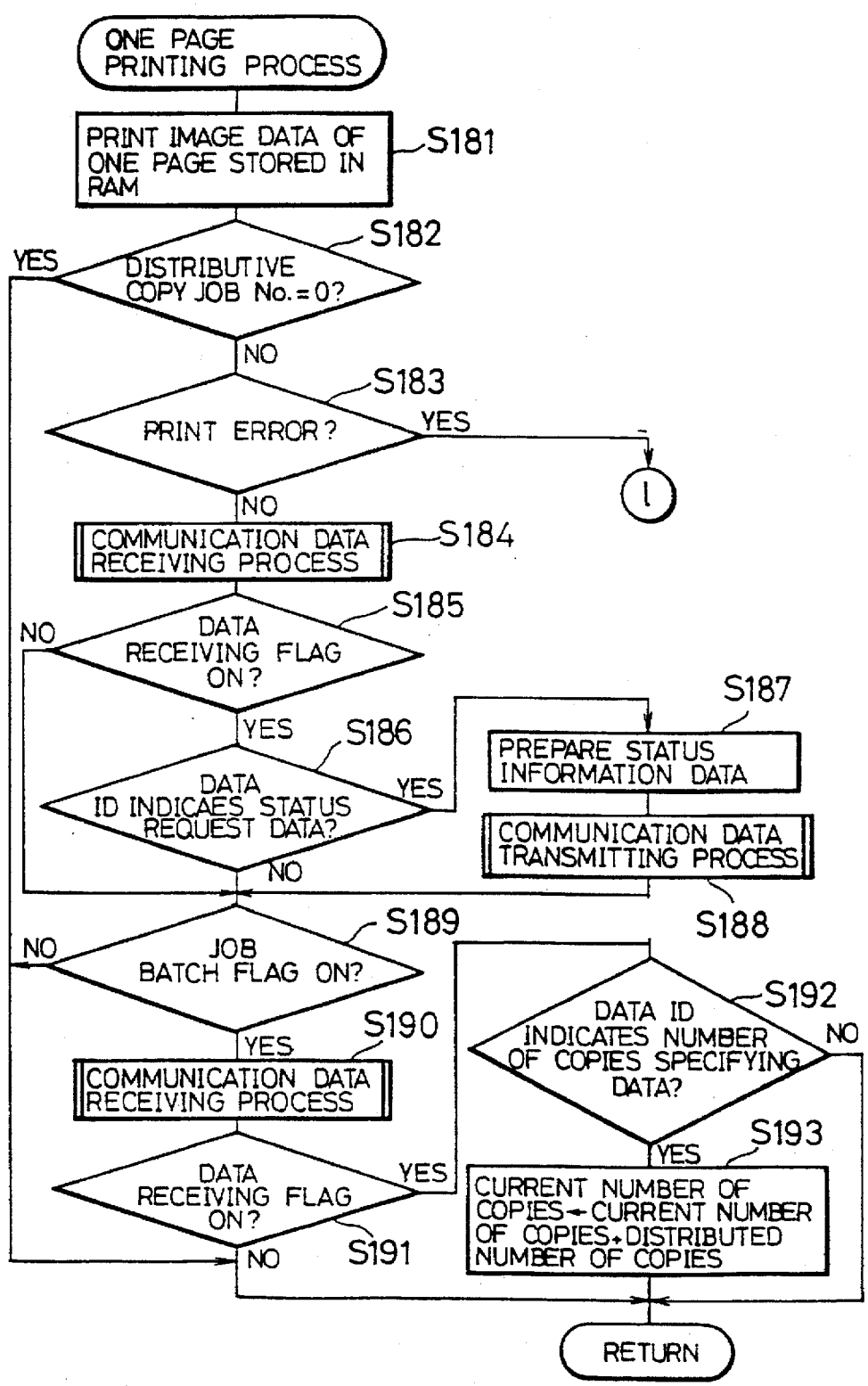
FIG. 22 is a flowchart showing one page printing process in the flowcharts of FIG. 20 and FIG. 21.

The one page printing processing will be explained in reference to the flowchart of FIG. 22 and FIG. 23. First, the image data of one page stored in the RAM 11 is transmitted to the printing section 3, and the copy operation is performed (S181). Next, the distributive copy job No. is checked (S182). If the distributive copy job No. is "0", the copying machine is in execution of a single copy mode, thereby terminating the processing routine. On the other hand, if the distributive copy job No. is not "0", this suggests that the apparatus is in execution of the distributive copy operation, and it is checked whether or not the printing error has occurred (S183). If not, the communication data receiving process is executed (S184), and the receiving of data by the data receiving flag is confirmed (S185). Further, by checking the data ID, it is checked whether or not the data ID is a status request (S186).

If so, the distributive copy job No. in execution is set to the job ID, and the status information data is prepared (S187). Then, the communication data transmitting process is performed (S188), and the prepared data is transmitted to the transmitting end of the status information data. As a result, the copying machine which transmits the status request data can determine the job No. which activates another copy job, and plural jobs can be executed simultaneously. If the received data is not confirmed in S185, the data ID is not the status request in S186, or the transmission of the status information data is completed in S188, it is checked whether or not the job batch flag is set ON (S189).

If the job batch flag is set ON, the receiving process of the communication data is executed again (S190). If it is confirmed that the data receiving flag is set in S191, it is checked whether or not the received data is the number of copies specifying data (S192). If the number of copies specifying data is received, as this suggests that the number of copies specifying data is transmitted from the copying machine in which a print error has occurred (to be described later) due to the error occurred in another copying machine which executes the same distributive copy job, additionally distributed number of copies is added to the copying machine so as to renew the number of copies (S193).

On the other hand, if the job batch flag is set OFF in S189, as described above, the copies which have not been processed will not be re-distributed, thereby terminating the processing routine. Moreover, even if the job batch flag is set ON, if data is not received in S191 or the received data is not the number of copies specifying data (S192), it is determined that an error has not occurred in any of the copying machines, thereby completing the processing routine.

Figure 23:
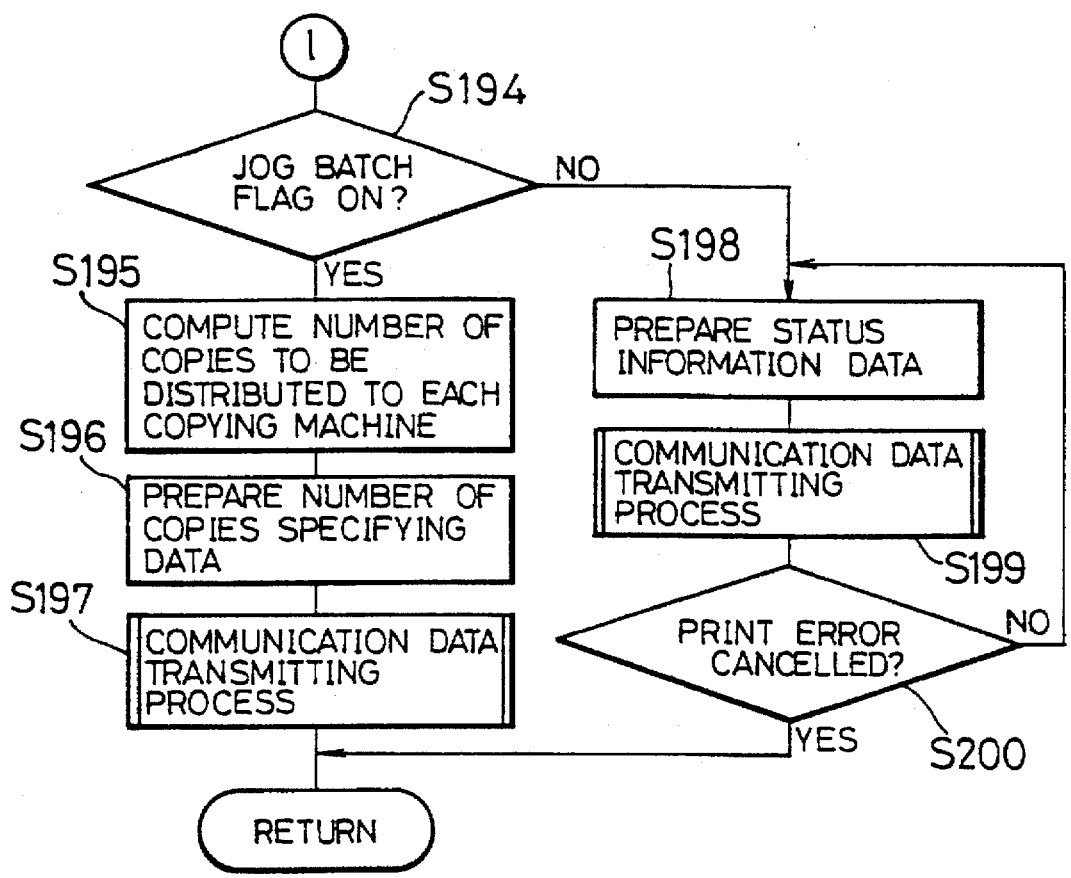
FIG. 23 is a flowchart showing one page printing process in the flowcharts of FIG. 20 and FIG. 21.

In S183, if it is confirmed that the print error has occurred in S183, as shown in FIG. 23, it is checked whether or not the job batch flag is set ON (S194). If so, in order to re-distribute the number of copies that have not been processed due to an error to other copying machines, the number of copies to be distributed to other copying machines is computed based on the current number of copies and the number of apparatus which execute the distributive copy job (S195). Then, the job batch flag is set, and in the meantime, based on the computing results, the number of copies specifying data is prepared for each copying machine (S196), and the communication data transmitting process is performed (S197). Then, by transmitting the prepared number of copies specifying data to each copying machine, the processing routine is terminated.

As a result, even if the copying machine being connected shows the inability of operating, the remaining number of copies can be re-distributed to other copying machines. Therefore, without eliminating the print error in the copying machine, the distributive copy operation can be continued. Additionally, the number of copies can be produced as desired with accuracy. Additionally, it may be also arranged so as to wait until the print error is cancelled without re-distributing the remaining number of copies in the copying machine subject to the print error.

On the other hand, in S194, if it is confirmed that the job batch flag is set OFF, the status information data indicating the error state is prepared (S198), and the communication data transmitting process is performed (S199). Then, the prepared status information data is transmitted. As a result, the transmitting end is informed of an occurrence of an error. Then, until the cancellation of the print error is confirmed (S200), the preparation and the transmission of the status information data are repeated. Then, if the print error is cancelled, the processing routine is terminated.

As described, in the system composed of plural copying machines being connected, when the copy operation of the document is to be executed by specifying plural number of copies, in response to the received status of other copying machines being connected, the copying machines to be used are selected, and the number of copies to be distributed to each copying machine is set. Then, the image data is transmitted to other copying machines. In the copying machine where the image data is transmitted, since copies are produced based on the image data, one copy job can be distributed to plural copying machines, thereby improving productivity of copies and utilization efficiency of the copying machines.

Additionally, by arranging such that copies are distributed by considering the respective copying capacities, copy operations can be performed effectively. Alternatively, the job ID is added to each data to be transmitted from the copying machine of the transmitting end. Therefore, the copying machine of the receiving end reads only the necessary data to be used. Therefore, plural copy operations can be performed independently.

Furthermore, in the process of the printing operation by reading the image data page by page (the job batch flag is set OFF), if an error has occurred in any of the copying machines, the occurrence of error is immediately transmitted to the copying machine of the transmitting end. Then, until the error is cancelled, the transmitting end copying machine does not transmit the image data of the next page, thereby preventing the problem that the transmission of the image data is continued although the error has occurred and the required number of copies cannot be produced.

Additionally, in the case where a sequential printing process is performed (the job batch flag is set ON) after all the image data on the document is stored in the HDD 7, if the print error has occurred, the number of copies that cannot be produced is re-distributed to other copying machines. Therefore, in this case, without cancelling the print error, the required number of copies can be produced in the remaining copying machines.

Additionally, in the copying machines of the present embodiment, the operator can freely select a mode among the single copy mode, the distributive copy mode and the distributive copy receiving mode.

[EMBODIMENT 2]

The following descriptions will discuss another embodiment of the present invention. For convenience, members having the same functions as the aforementioned embodiment will be designated by the same reference numerals, and thus the descriptions thereof shall be omitted here.

As in the first embodiment, an image forming system of the present embodiment is arranged such that plural digital copying machines (hereinafter referred to as a copying machine) are connected by a communication line 1 which permits transmission of an image data, etc. The arrangement of each copying machine is the same as the first embodiment (see FIGS. 2 and 3). However, in the present embodiment, when executing a distributive copy operation, the kinds of data to be processed among the copying machines are different from those of the first embodiment, and based on these data, the copying machine of the transmitting end displays the status of the distributive copy operation and the occurrence of error, etc., onto the panel display (informing means).

In the RAM 11, in addition to the specified number of copies, ON/OFF of the distribution information print mode for setting the distributive copy information (to be described later) to be printed prior to the copying machine is stored.

In the present embodiment, explanations will be given through the case where all of the copying machines are provided with the HDD 7.

The basic structure of the data which is processed in the copying machines of the present invention is the same as the embodiment 1 as shown in FIG. 5. In the data, the data ID that is to be set for showing the communication data is of five kinds: status request, status information, copying number, image data and print end.

FIG. 24(a) through FIG. 24(e) show the communication data of five kinds in detail. The status request data shown in FIG. 24(a) and the image data shown in FIG. 24(d) are the same as the first embodiment, and thus the descriptions thereof shall be omitted here. The status information data shown in FIG. 24(b) is the response data in response to the status request data, and thus has almost the same structure as the first embodiment except that the remaining number of copies is included in the data. The remaining number of copies suggests the remaining number of copies of the copying machine in the process of the distributive copy operation. The copying machine of the transmitting end displays the process of the distributive copy operation of the receiving end based on this remaining number of copies in the process of the distributive copy operation.

The number of copies specifying data shown in FIG. 24(c) is the same as the number of copies specifying data used in the first embodiment except that the job batch transmission flag is not included in the data. The present embodiment is based on the assumption that all of the copying machines are provided with the HDD 7. Therefore, the job batch transmission flag is not needed. However, if a copying machine which is not provided with the HDD 7 is connected to the communication line 1, by adding the job batch transmission flag to the number of copies specifying data like the first embodiment, the setting and judgement of the job batch flag are performed as a required timing in the processes to be described later.

FIG. 24(e) shows the print end data, and is used in transmitting the end of the printing operation of one copying machine to the copying machine of the transmitting end. As to this print end data, since the data is not needed, the byte count of the data is "0".

Through the case where three copying machines C1 through C3 are connected by the communication line 1 as shown in FIG. 4, the copy operation of the transmitting end copying machine C1 which distributes 12 sets of copies and respective copy operations of other copying machines, which are subject to change according to the the copying process.

Figure 26A:
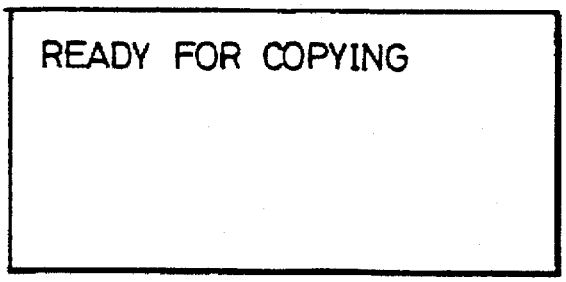
FIG. 26(a) through FIG. 26(d) are explanatory views showing displayed states on a panel unit, which vary according to a copy operation, in the digital copying machine which serves as a receiving end of a distributive copy operation.

First, it is assumed that all of the copying machines C1 through C3 are in the idle state where copying is permitted. As shown in FIG. 25(a), on the panel device 6 of the copying machine C1, "ready for copying" is displayed. Similarly, as shown in FIG. 26(a), "ready for copying" is displayed also on the respective panel units 6 of the copying machines C2 and C3.

In the panel unit 6 of the copying machine C1, the number of copies is set to 12. Then, upon pressing the print start key, the copying machine C1 first transmits the status request data (see FIG. 24(a)) to other copying machines C2 and C3. The copying machines C2 and C3 transmit the status information data (see FIG. 24(b)) to the copying machine C1 according to the received status request data. Next, based on the received status information data, the copying machine C1 computes the respective numbers of copies of the copying machines C1 through C3 by the similar method in the first embodiment and prepares the number of copies specifying data (see FIG. 24(c)).

In the next stage, the copying machine C1 transmits the prepared number of copies specifying data to the copying machines C2 and C3 and scans the document in order so as to store the resulting image data in the HDD 7. In the meantime, based on the stored image data, the copying machine C1 prepares the image data (see FIG. 24(d)), and transmits to the copying machines C2 and C3. Here, in the panel unit 6 of the copying machine C1, as shown in FIG. 25(b), the computed number of copies to be distributed to each copying machine and a message "distributive copy" are displayed. In the copying machines C2 and C3, by receiving the number of copies specifying data or the image data, the display of the panel display 6 changes from the state shown in FIG. 26(a) to the state shown in FIG. 26(b), and a message "distributive copy of the copying machine 1" is displayed.

Upon completing the scanning operation of the document, the copying machine C1 transmits the image data having the data byte count of "0", in the meantime, starts the printing operation. When the image data having the data byte count of "0", the copying machines C2 and C3 confirm the completion of the document, thereby starting the printing operation.

Figure 26B:
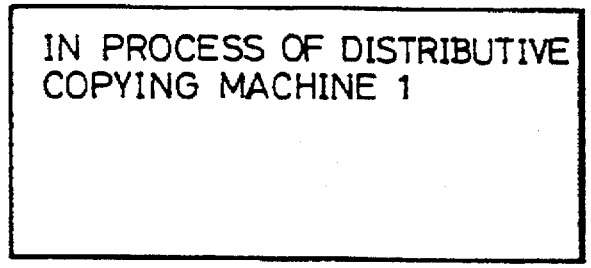
Figure 26C:
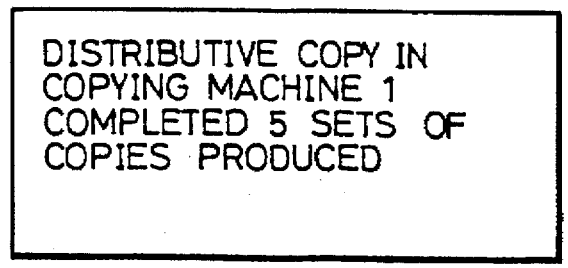

In the printing operation, the copying machines C2 and C3 transmit the status information data (see FIG. 24(b)) in which the remaining number of copies is renewed every time a set of copy is completed to the copying machine C1. The copying machine C1 receives the status information data, and as shown in FIG. 27(b), the remaining number of copies of each copying machine is displayed. Upon completing the printing operation, the copying machines C2 and C3 transmit the print operation end data (see FIG. 24(e)) to the copying machine C1, and displays a message "The distributive copy in the copying machine 1 is completed and 5 sets of copies are produced." as shown in FIG. 26(c).

Figure 26D:
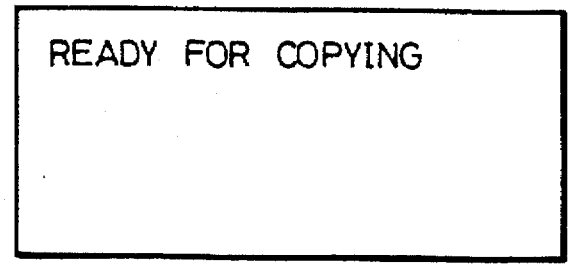

By receiving the printing operation end data from the copying machines C2 and C3, the transmitting end copying machine C1 displays a message "12 distributed copies have been produced" as well as the number of copies produced by each copying machine as shown in FIG. 25(c). In the described manner, upon completing one distributive copy job, the copying machines C1, C2, C3 display the message "ready for copying" again as shown in FIG. 25(d) and FIG. 26(d).

Additionally, when a print error has occurred during the distributive copy operation, the status information data indicating the occurrence of an error is transmitted to the transmitting end copying machine C1. As a result, for example, when sheets are run out, a message "no sheets in copying machine 2" is displayed on the panel unit 6 of the copying machine C1 as shown in FIG. 27(e) so as to inform the operator of the message.

When the distribution information print flag is set ON, in the described sequential operation, before starting the printing operation, the transmitting end copying machine C1 prints distributive copy information is printed as shown in FIG. 28(a). On the other hand, in the copying machines C2 and C3 of the receiving end, prior to starting the printing operation, the distributive copying information is printed as shown in FIG. 28(b).

In the image forming system in accordance with the present embodiment, the informing means is composed of the panel unit 6, the master CPU 9 and the printing section 3, and in the copying machine, information related to the distributive copy operation is displayed or printed. As a result, these information can be effectively used, and operability and utilization efficiency can be improved.

The distributive copy operation in the copying machines of the present embodiment will be explained below in reference to the flowcharts of FIG. 29 through FIG. 39.

Figure 29:
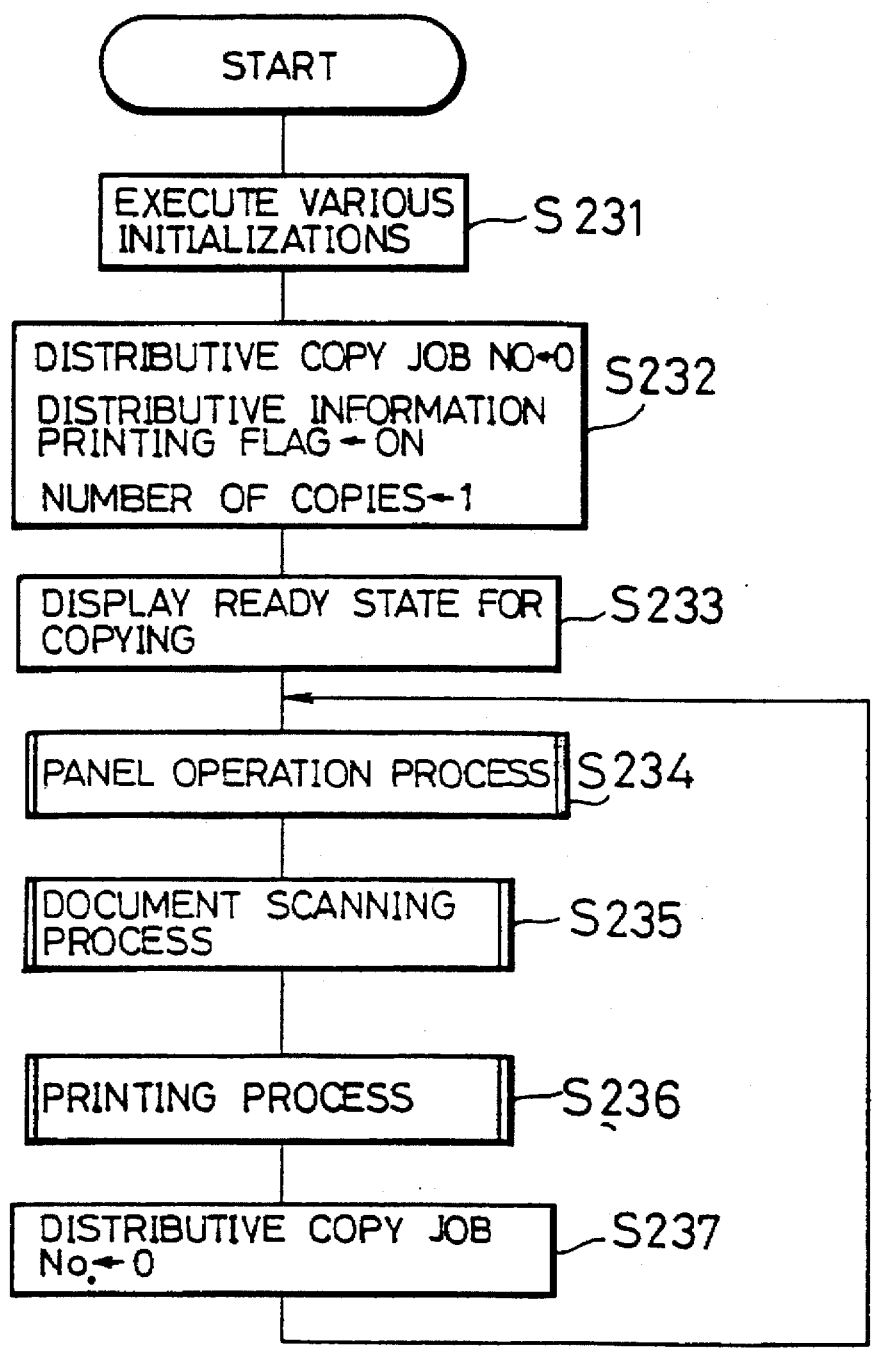
FIG. 29 is a flowchart copying an entire copy operation in the digital copying machine.
Figure 30:
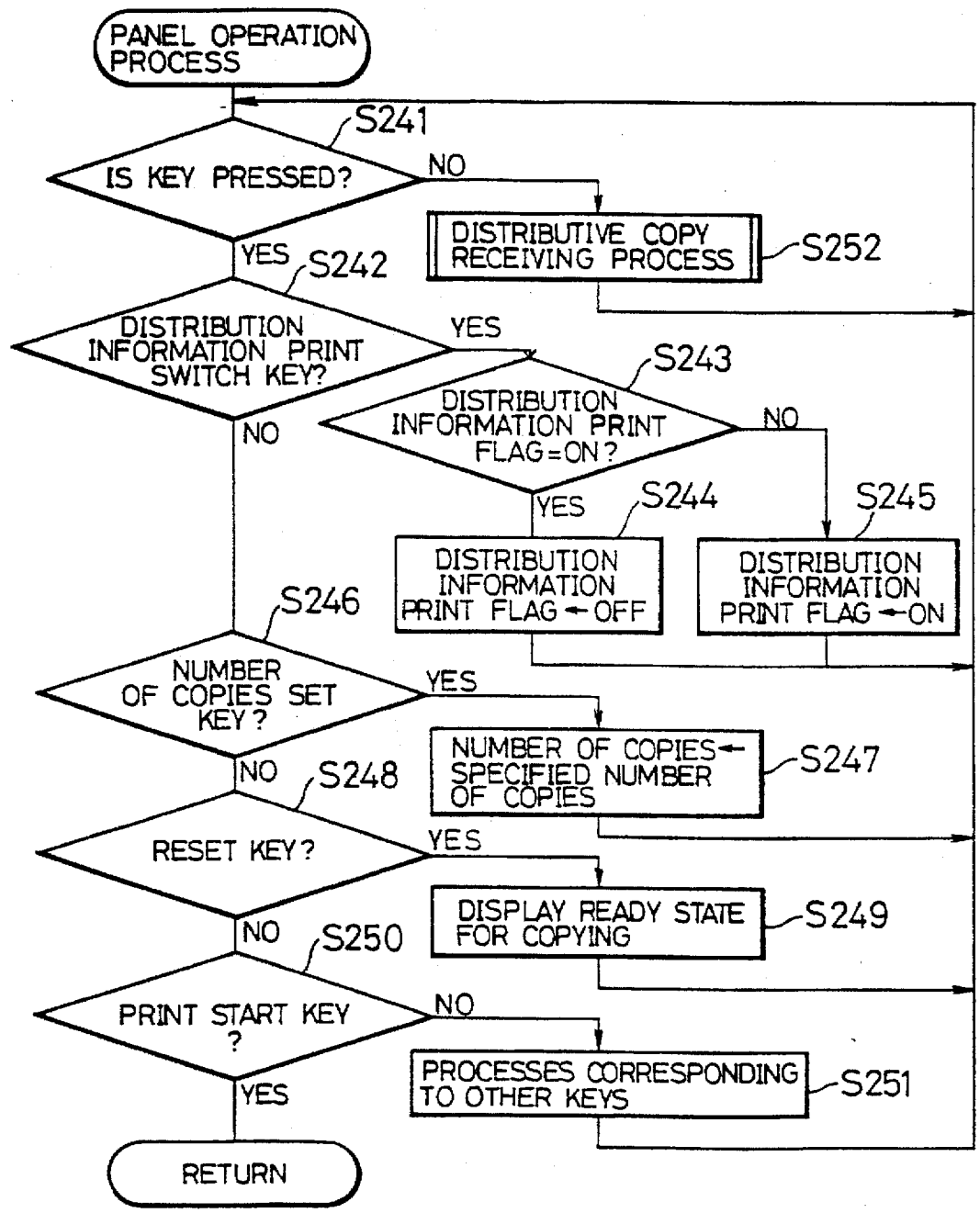
FIG. 30 is a flowchart showing the panel operation process in the flowchart of FIG. 29.

FIG. 29 shows a basic flow of the copy operation. The copying machine is activated by turning ON the power, and the initialization of peripheral equipments and the initialization of the data are executed (S231). Then, the distributive copy job No. is set to "0", the distribution information print flag is set ON, and the number of copies is set to "1" (S232). As in the case of the first embodiment, the distributive copy job No. is a variable indicating the job ID of the distributive copy being carried out by the copying machine. The distribution information print flag is a flag indicating whether or not the distribution information is printed when starting the distributive copy job. If the distribution print flag is set ON, the printing is performed, and if it is set OFF, on the other hand, the printing is not performed.

Upon completing these processes, a message indicating that it is ready for copying is displayed on the panel display 6 as shown in FIG. 25(a) (S233) so as to inform the user that the copying machine is set in the copy operation permitting state. In this state, by performing the panel operation process using the panel unit 6 (S234), the number of copies is specified, etc. Furthermore, by pressing the print start key, the document scanning operation is performed by the scanner section 2 (S235), and the resulting image data is stored in the HDD 7. Next, the image data stored in the HDD 7 is transmitted to the printing section 3, and a printing operation is performed (S236). While the described scanning operation or printing operation is being performed, a message indicating that the copy operation is in execution is displayed, and while performing the distributive copy operation, information from other copying machines is also displayed (see FIG. 25(b)). Upon completing this printing process, the display of the panel device 6 is shown as shown in FIG. 25(c), and the distributive copy job No. is reset to "0" to be ready for the next distributive copy operation (S237), and is set in the stand-by state until the panel operation process is performed again (S234). In this state, the message indicating that it is ready for copying is still displayed.

Each process in the flowchart of FIG. 29 will be explained in detail. First, the panel operation process will be explained in reference to FIG. 30.

When it is confirmed that the key operation is operated in S241, it is checked whether or not the pressed key is the distribution information print switch key (S242). If so, the distribution information print flag is checked (S243). Then, if the distribution information print flag is set ON, it is switched OFF (S244), On the other hand, if the distribution information print flag is set OFF, it is switched ON (S245). Upon completing the switching of the distribution information print flag, the sequence goes back to S241.

If the pressed key is not the distribution information print switch key, it is checked whether or not the pressed key is the number specifying key (S246). If so, based on the specified number, the number of copies stored in the RAM 11 is renewed (S247). Upon completing the renew of the number of copies, sequence goes back to S241.

If the pressed key is neither the distribution information print key or the number specifying key, it is checked whether or not the pressed key is a reset key (S248). If so, the display on the panel unit 6 is reset to a message indicating it is ready for copying (S249), and the sequence moves back to S241. When the distributive copy information is displayed on the panel unit 6, by operating the reset key, the displayed screen is cleared.

If the pressed key is neither one of the distribution information print key, the number specifying key and the reset key, it is checked whether or not the pressed key is a print start key (S250). If so, the processing routine is ended to be ready for the next document scanning process. On the other hand, if the pressed key is not the print start key neither, the process corresponding to another key is processed (S251), and the sequence moves back to S241.

On the other hand, if the key operation is not confirmed in S241, the distributive copy receiving process is executed (S252). As described, while the key operation is not performed, the distributive copy receiving process can be always executed.

The distributive copy receiving process will be explained in reference to the flowchart of FIG. 31 and FIG. 32. First, the communication data receiving process (to be described later) is performed (S261), and it is checked whether or not the data receiving flag is set (S262). If the data receiving flag is set, the data ID of the received data is checked, and it is checked whether or not the data ID specifies the number of copies specifying data (S263). If the data receiving flag is not set or the data is not the number of copies specifying data, as the operation is not performed in correct order, the sequence goes onto S273 shown in FIG. 32 so as to reset the distributive copy job No., thereby terminating the processing routine.

Figure 31:
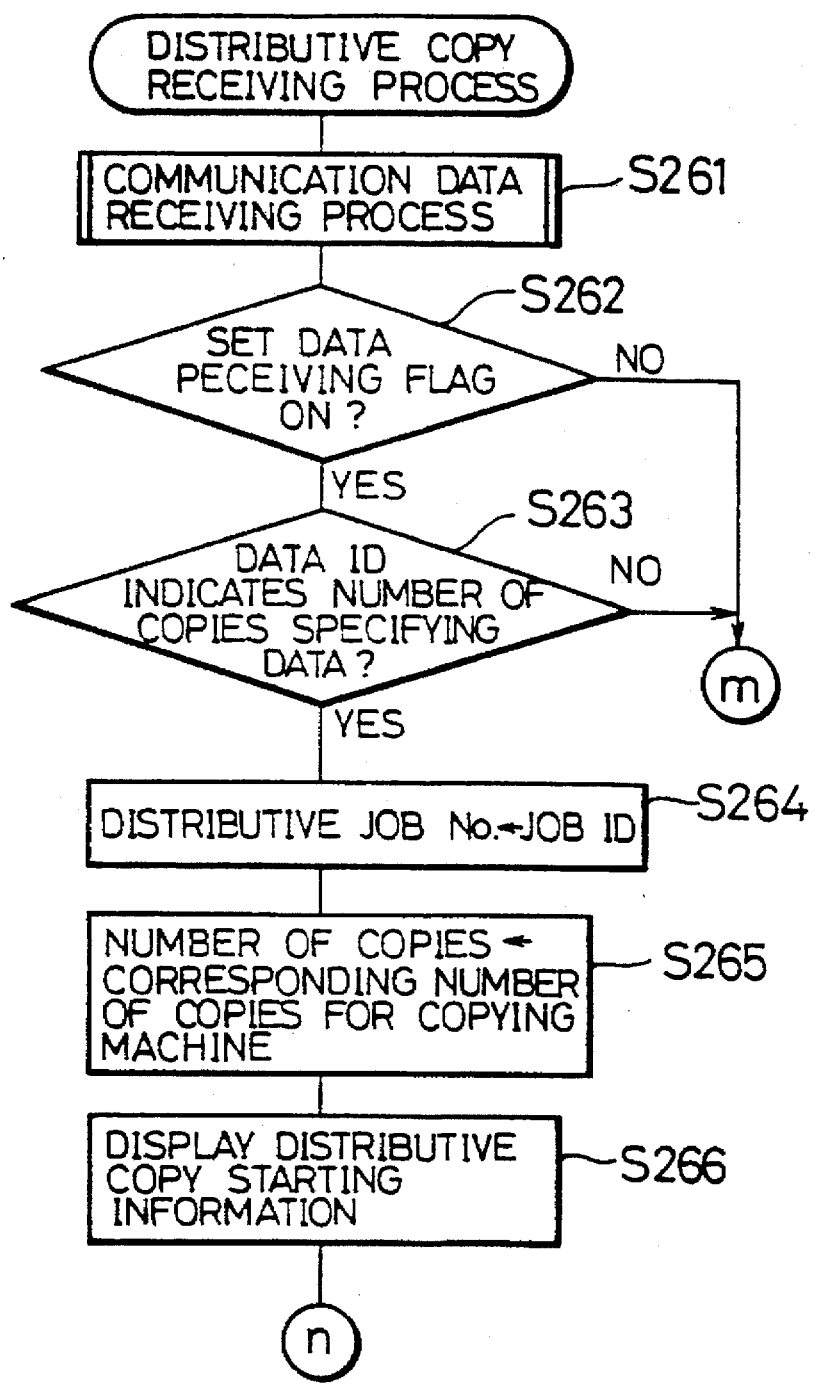
FIG. 31 is a flowchart showing the distributive copy receiving process in the flowchart of FIG. 30.

On the other hand, in S261 shown in FIG. 31, if the received data is determined to be the number of copies specifying data (S263), the distributive copy job No. stored in the RAM 11 is renewed to the value of the job ID in the number of copies specifying data (S264). Next, based on this data, the number of copies is renewed to the number of copies corresponding to the copying machine (S265), and the distributive copy starting information shown in FIG. 26(b) is displayed on the panel unit 6 (S266). As a result, it can be confirmed that the copying machine has started the distributive copy receiving process, and also the copying machine which transmits the distributive copy job can be confirmed. Although not shown in the figure, by arranging that the distributed number of copies is displayed at the same time, the distributed number of copies can be also confirmed.

Figure 32:
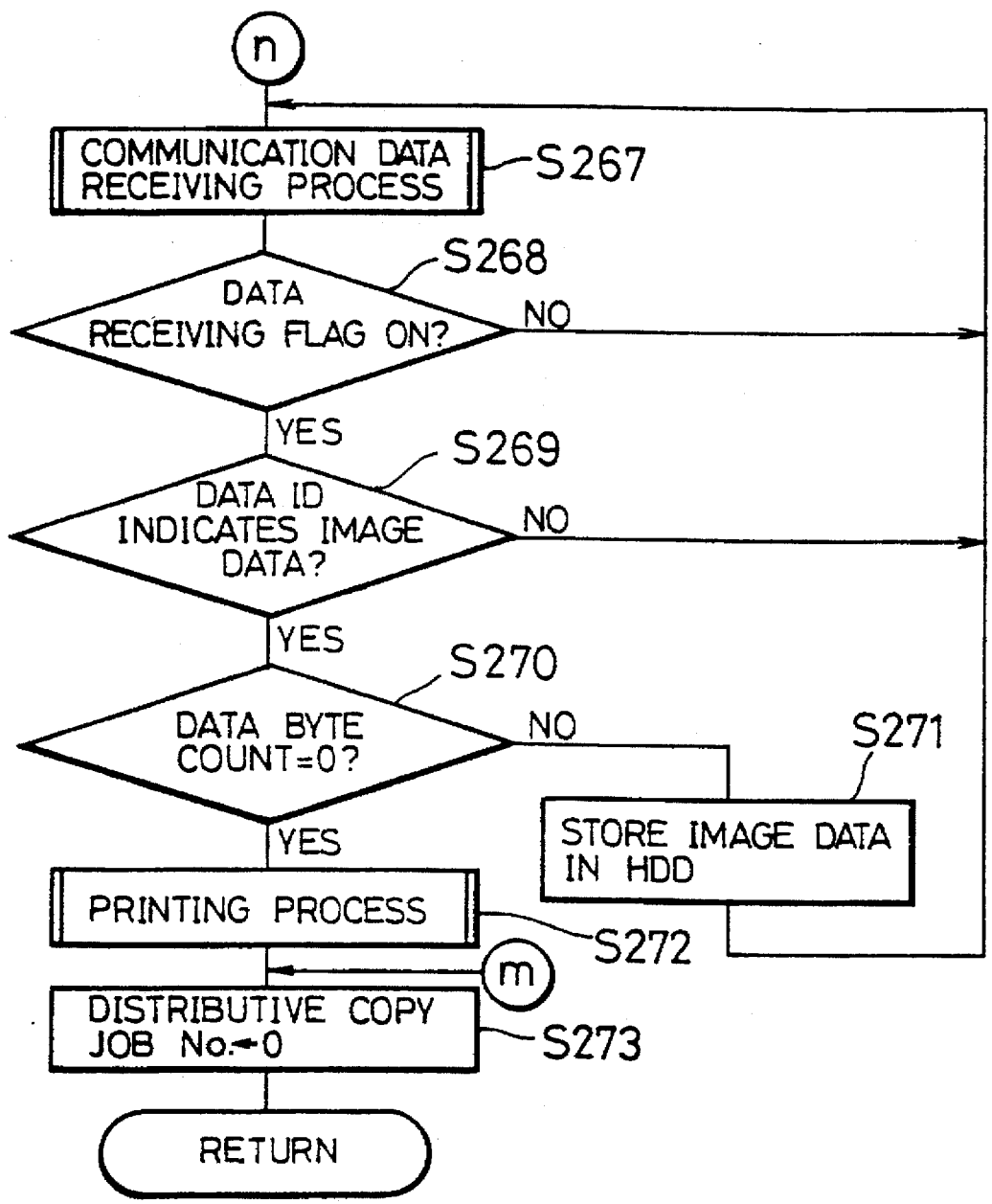
FIG. 32 is a flowchart showing the distributive copy receiving process in the flowchart of FIG. 30.

Next, as shown in FIG. 32, the communication data receiving process is performed (S267), and it is checked whether the data receiving flag is set (S268). If so, the data ID of the received data is checked so as to determine whether the data is the image data (S269). If the data is the image data, it is checked whether or not the data byte count is "0" (S270). Here, if the data byte count is not "0", the image data of one page is stored in the HDD 7 (S271), and the communication data receiving process is executed again (S267). If it is not determined that the data receiving flag is set in S268, or if the data ID is not the image data in S269, the sequence goes back to S267, and the communication data receiving process is executed.

If the data byte count is "0" in S270, since this suggest that the end of image data in the distributive copy job, based on the image data stored in the HDD 7, the printing operation (to be described later) is executed (S272). Namely, the storage of the image data is kept until it is determined that the data byte number is "0". Upon completing the printing process, the distributive copy job No. is reset to "0" (S273), and the processing routine is ended.

Figure 33:
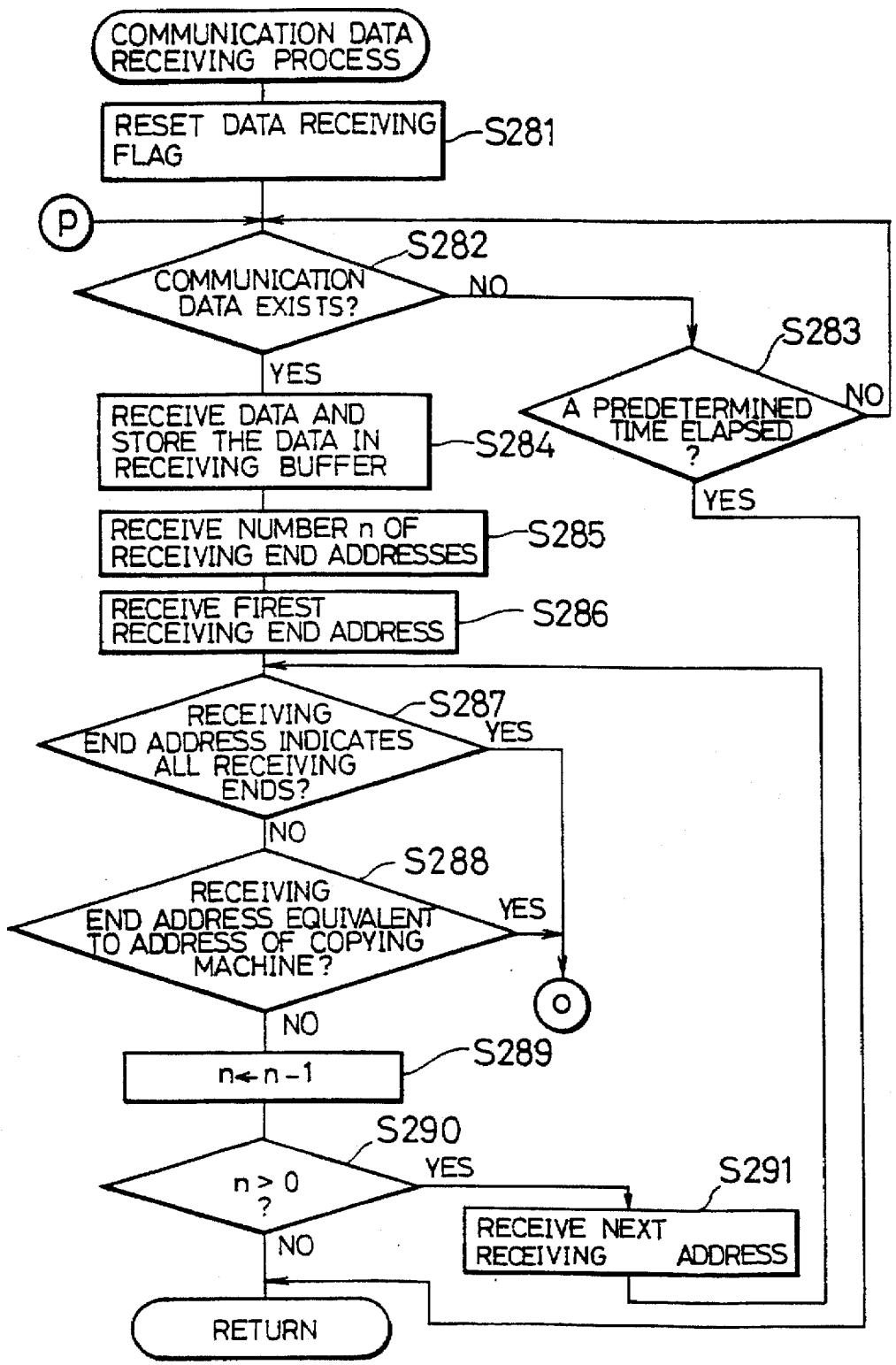
FIG. 33 is a flowchart showing the communication data receiving process in the flowchart of FIG. 31.

Next, the communication data receiving process will be explained based on the flowcharts of FIG. 33 and FIG. 34.

First, the data receiving flag is reset (S281), and it is checked whether or not the communication data on the communication line 1 exists (S282). Here, if it is determined that no communication data exits, it is determined whether or not a predetermined time has elapsed (S283), and this check in S282 is continued until a predetermined time elapses. On the other hand, if a predetermined time has elapsed without receiving the communication data, the processing routine is terminated.

On the other hand, if it is determined that the communication data exists on the communication line 1 in S282, the data is received and is stored in the receive buffer in the RAM 11 (S284). Then, the number n of the transmitting end addresses is fetched from the stored data (S285) so as to obtain the first receiving end address (S286). Then, it is checked whether or not the receiving address suggests all of the receiving ends (S287). If not, it is checked whether or not the receiving end address is equivalent to the address of the copying machine (S288).

If not, the number n fetched in S285 is renewed to be set to the number n−1 (S289), and it is checked whether or not renewed n is greater than "0" (S290). If n is greater than "0", the next transmitting address is obtained from the stored data (S291), and the sequence goes back to S287. On the other hand, if n is determined to be "0" in S290, since this suggests that the address is not included in the set receiving end address, the processing routine is terminated.

Figure 34:
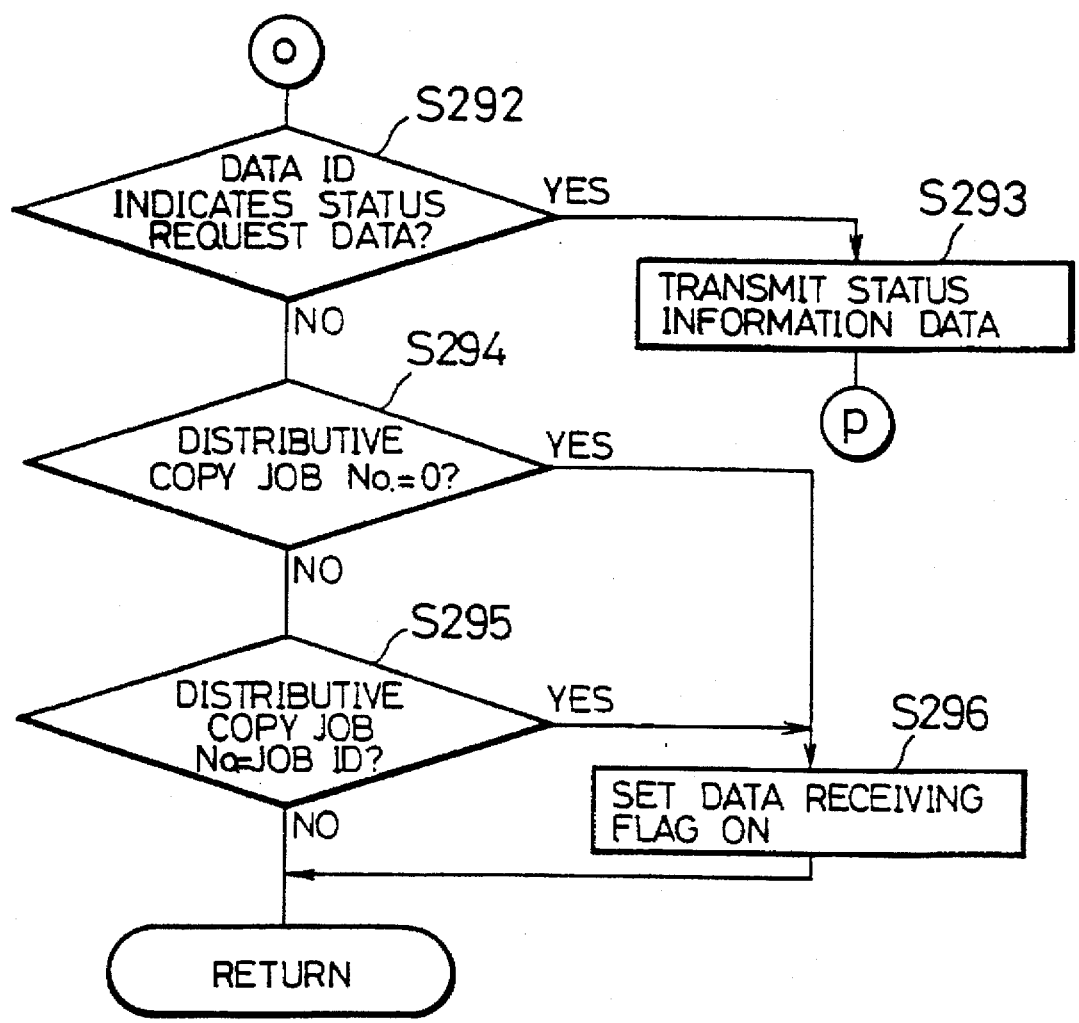
FIG. 34 is a flowchart showing the communication data receiving process in the flowchart of FIG. 31.

On the other hand, if the receiving end address suggests all of the receiving ends in S287, or if the transmitting end address is equivalent to the address of the copying machine in S288, as shown in FIG. 34, the data ID of the stored data is checked, and it is checked whether or not the data is the status request data (S292). If the data is the status request data, the status information data is prepared, and the status information data is transmitted to the transmitting end of the status request data (S293).

If the data ID does not show the status request data, the distributive copy job No. of the copying machine is checked (S294). If the distributive copy job No. is "0", the data receiving flag is set (S296), and the processing routine is terminated. On the other hand, if the distributive copy job No. is not "0", since this suggests that the copying machine is in the duration of the distributive copy job, it is checked whether or not the distributive copy job No. is identical with the job ID of the stored data (S295).

If the distributive copy job No. is identical with the job ID, since this suggests that the stored data is related to the distributive copy job being performed by the copying machine, the data receiving flag is set (S296), and the processing routine is terminated. On the other hand, if the distributive copy job No. is not identical with the job ID, since this suggests that the stored data is not related to the distributive copy job in execution, the processing routine is terminated without setting the data receiving flag.

As described, in the communication data receiving process, if the received data is the status request data, even in the duration of the distributive copy job, the status information data is transmitted, and thereafter, an attempt is made again so as to receive the data. Therefore, the transmitting end copying machine can always grasp the state of all of the copying machines, and the distributive copy job can be executed using only the copying machine in the idle state. Namely, plural distributive copy jobs can be executed simultaneously.

Figure 35:
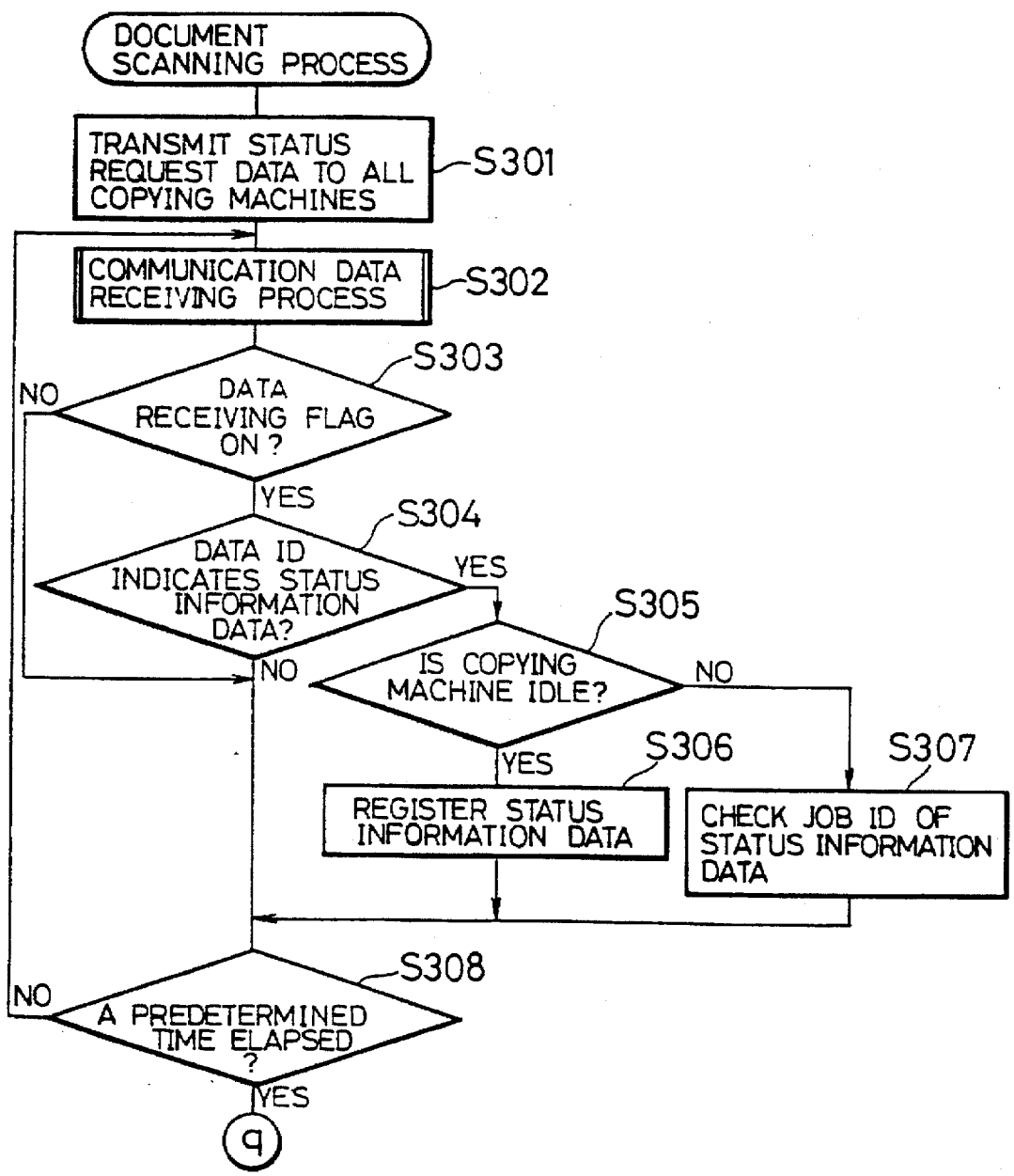
FIG. 35 is a flowchart showing the document scanning process in the flowchart of FIG. 29.

Next, in the panel operation process, the document scanning operation to be performed upon pressing the print start key of the copying machine of the transmitting end will be explained in reference to the flowcharts of FIG. 35 and FIG. 36.

First, the transmitting end copying machine transmits the status request data with respect to all of the copying machines being connected to the communication line 1 so as to determine the copying machines for executing the distributive copy operation (S301). Then, the communication data receiving process is executed (S302). Next, it is confirmed that the data receiving flag is set (S303). If the data receiving flag is set, the data ID of the received data is checked so as to determine whether or not the data is the status information data (S304). If the data is the status information data, it is checked whether or not the status ID of the copying machine in the status information data is in the idle state (S305).

If the status ID of the copying machine shows the idle state, the status information data is registered (S306). Here, the copying machine in which the status information data is registered is registered as one of the copying machines for executing the distributive copy operation.

On the other hand, if the status ID of the copying machine does not show the idle state, since this suggests that the copying machine which transmits the status information data is in execution of another distributive copy job, the transmitting end copying machine checks the job ID in the status information data (S307), and based on the checked job ID, the job ID of the distributive copy job to be executed is set to a value other than the job ID. After performing the processes in S306 and S307, it is checked whether or not a predetermined elapse of time has passed (S308), and the sequence moves onto S302 and the communication data receiving process is repeated until a predetermined time elapses.

In S303, if it is not confirmed that the data receiving flag is set, or if the data ID checked in S304 is not the status information data, it is checked whether or not a predetermined elapse of time has passed after the sequence moves onto S308. If not, the sequence goes back to S302. As described, the communication receiving process is repeated until a predetermined elapse of time has passed. Based on the status information data received during the communication receiving process, the copying machines for executing the distributive copy operation are registered. Additionally, as the received status information data include the data related to the optional functions provided in the copying machine, by arranging such that the optional functions of each copying machine is also checked when checking the state in S305, only the copying machines which are ready for the copy operation with the same setting of the transmitting end copying machine can be selected.

Figure 36:
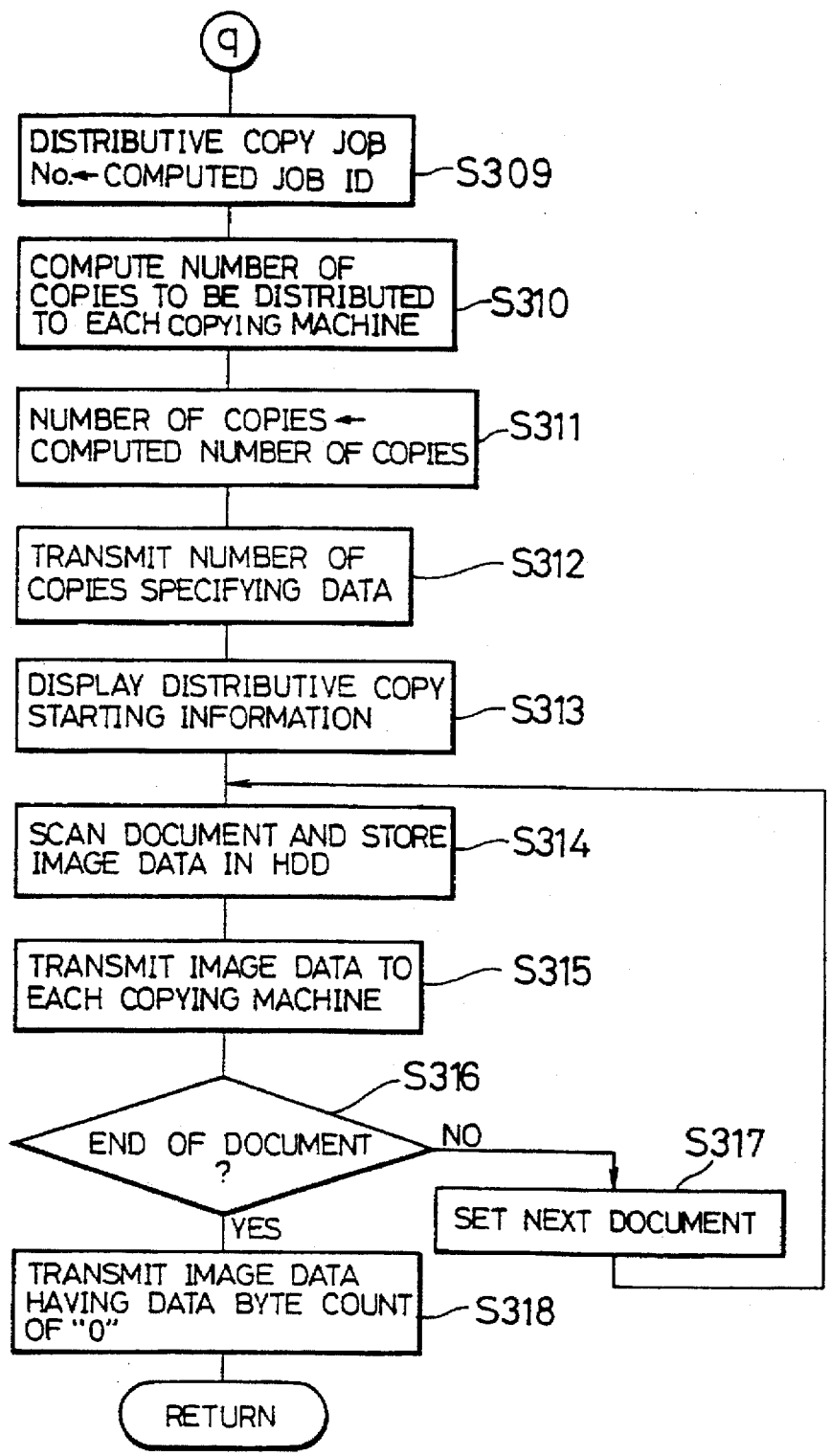
FIG. 36 is a flowchart showing the document scanning process in the flowchart of FIG. 29.

If it is determined that a predetermined elapse of time has passed in S308, as shown in FIG. 36, based on the job ID checked by the status information data, the previously obtained job ID is renewed as the distribution job No. (S309). Next, based on the number of copies specified by the panel operation process, registered number of copying machines, the status information data, etc., the number of copies distributed in each copying machine is computed (S310), and the number of copies stored in the RAM 11 is renewed to the computed number corresponding the copying machine (S311). Then, based on the computed number of copies of each copying machine, the number of copies specifying data is prepared to be transmitted to each copying machine (S312).

Thereafter, the distributive copy information shown in FIG. 25(b) is displayed on the panel unit 6 (S313). As a result, the copying machine can confirm that the distributive copy operation is started, and the respective number of copies distributed to the copying machines can be confirmed. Next, the copying machine store the image data obtained by scanning the document in the HDD 7 (S314), and the image data is transmitted to the registered copying machines (S315). Then, it is checked whether or not the documents are completed (S316). If not, the next document is set (S317), and the document scanning process and the image data storing process (S314) and the transmission of the image data (S315) are repeated until the end of the document is confirmed in S316.

Upon determining the end of the document in S316, in order to show that the document subject to the distributive copy operation is ended, the image data of the data byte count of "0" is prepared to be transmitted to each copying machine (S318), thereby terminating the processing routine.

Figure 38:
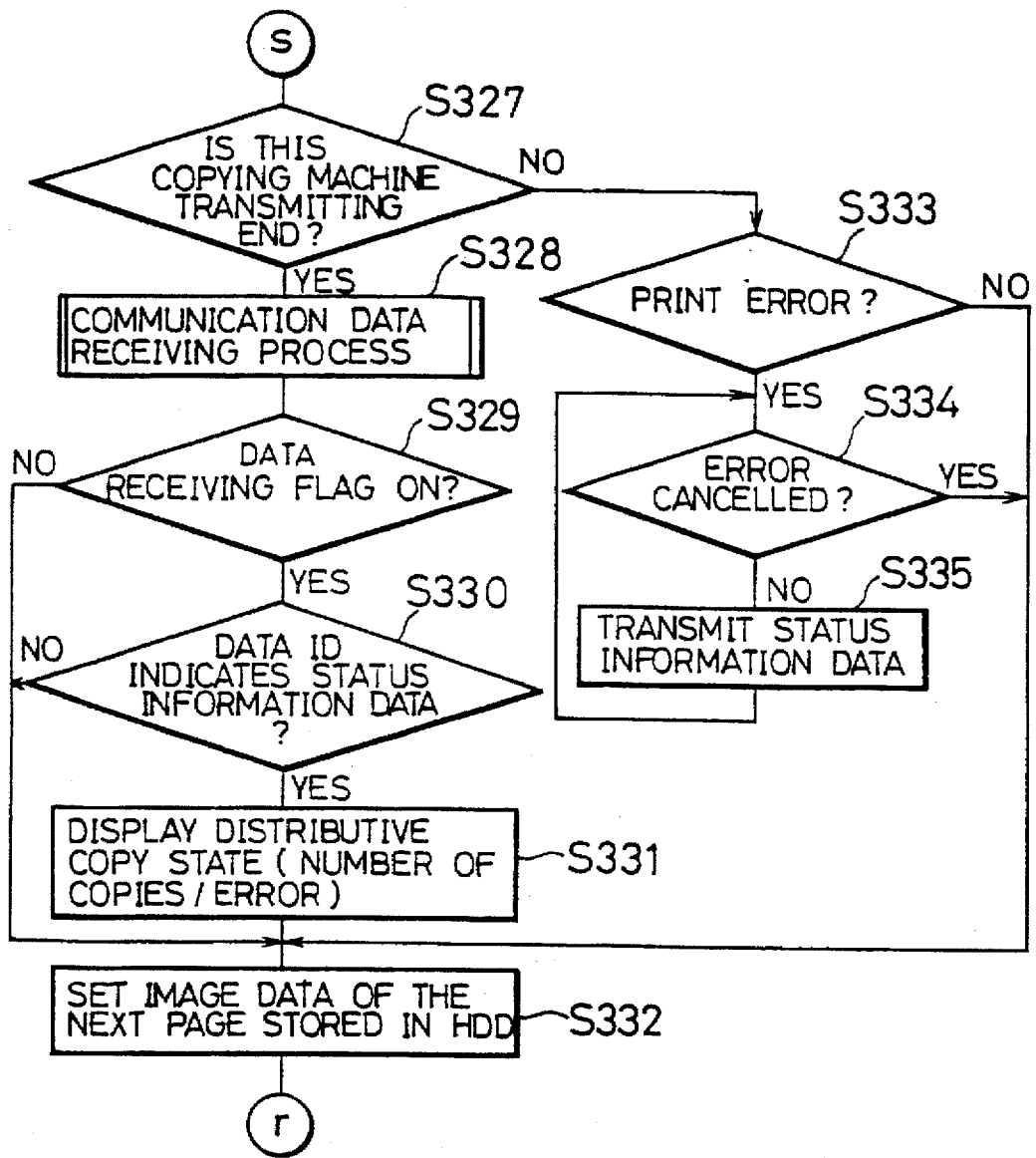
FIG. 38 is a flowchart showing the printing process in the flowcharts of FIG. 29 and FIG. 32.
Figure 39:
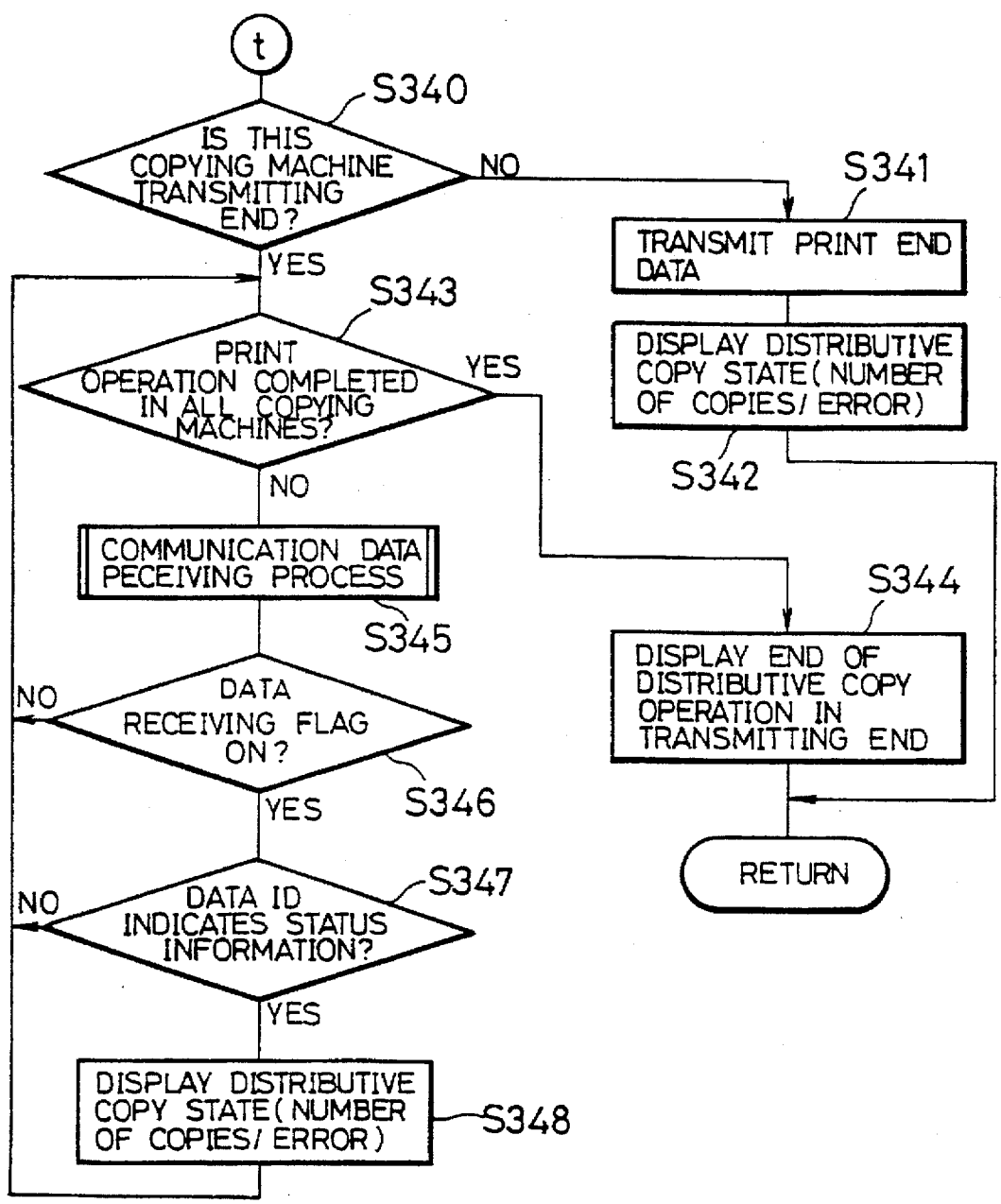
FIG. 39 is a flowchart showing the printing process in the flowcharts of FIG. 29 and FIG. 32.

The described distributed copy receiving process or the printing process based on the image data stored in the HDD 7 by scanning the document will be explained in reference to the flowcharts of FIG. 37 through FIG. 39. First, in order to store the set number of copies, the current number of copies stored in the RAM 11 (the number of copies to be executed by the copying machine) is set to the set number of copies, and in order to process the image data stored in the HDD 7 from the front page, the image data in the HDD 7 is set to the front page (S320).

Next, it is checked whether or not the distribution information print flag is set ON (S321). If so, it is checked whether the copying machine is the transmitting end or receiving end (S322). If the copying is of the transmitting end, the distributive copy job No., the receiving end copying machines which execute the distributive copy job and the respective numbers of copies distributed to the copying machines are printed as distribution copy information of the receiving end (see FIG. 28(a)) (S323). On the other hand, if the copying machine is of the receiving end, the distributive copy job No., the copying machine of the transmitting end which transmits the distributive copy job, and the number of copies to be distributed to this copying machine are printed as distribution copy information of the transmitting end (see FIG. 28(b)) (S324).

After printing the distributive copy information, an actual printing process is performed, and the image data of one page stored in the HDD 7 is transmitted to the printing section 3 to be printed (S325). If it is determined that if the distribution information print flag is set OFF in S321, the sequence moves onto S325 without printing the distributive copy information. As described, when the distribution information print flag is set ON, upon starting the distributive copy operation, irrespectively of whether the copying machine is of transmitting end or of receiving end, since the distributive copy information is printed as the printing process of the first page, the content of the distributive copy in execution can be confirmed immediately. Additionally, by setting OFF the distribution information print flag by the distribution information print switch key in the panel unit 6, a copy operation can be started without printing the distributive copy information, thereby saving the sheets when such information is not particularly needed.

After printing the image data of one page, it is checked whether or not next data exists in the HDD 7 (S326). If next data exists, the sequence moves onto S327 shown in FIG. 38 so as to determine whether or not the copying machine is the transmitting end. If it is determined that the copying machine is the transmitting end, the receiving process of the data is executed by the communication data receiving process (S328). Thereafter, the data receiving flag is checked (S329), and it is confirmed if the data is received. Here, if the data is received, it is checked whether or not the data is the status information data (S330). If the received data is the status information data, this suggests that when an error has occurred in the copying machine of the receiving end or when a copy operation of a sequential document (a set of copies) is completed, the status information data is transmitted from the copying machine of the receiving end to the copying machine of the transmitting end. Therefore, based on the content of this status information, the copying machine of the transmitting end displays the current state of the distributive copying (the remaining number of copies in each copying machine to which the distributive copy operation is distributed, the state of each copying machine, etc.) onto the display panel 6 (S331).

For example, if an error has occurred due to the shortage of sheets in the copying machine of the receiving end, in the copying machine of the transmitting end, a display is performed as shown in FIG. 27(e). On the other hand, if the status information data indicating that a completion of a set of copies is received from the copying machine of the receiving end, the copying machine of the transmitting end displays as shown in FIG. 27(b) based on the remaining number of copies in the data.

Figure 37:
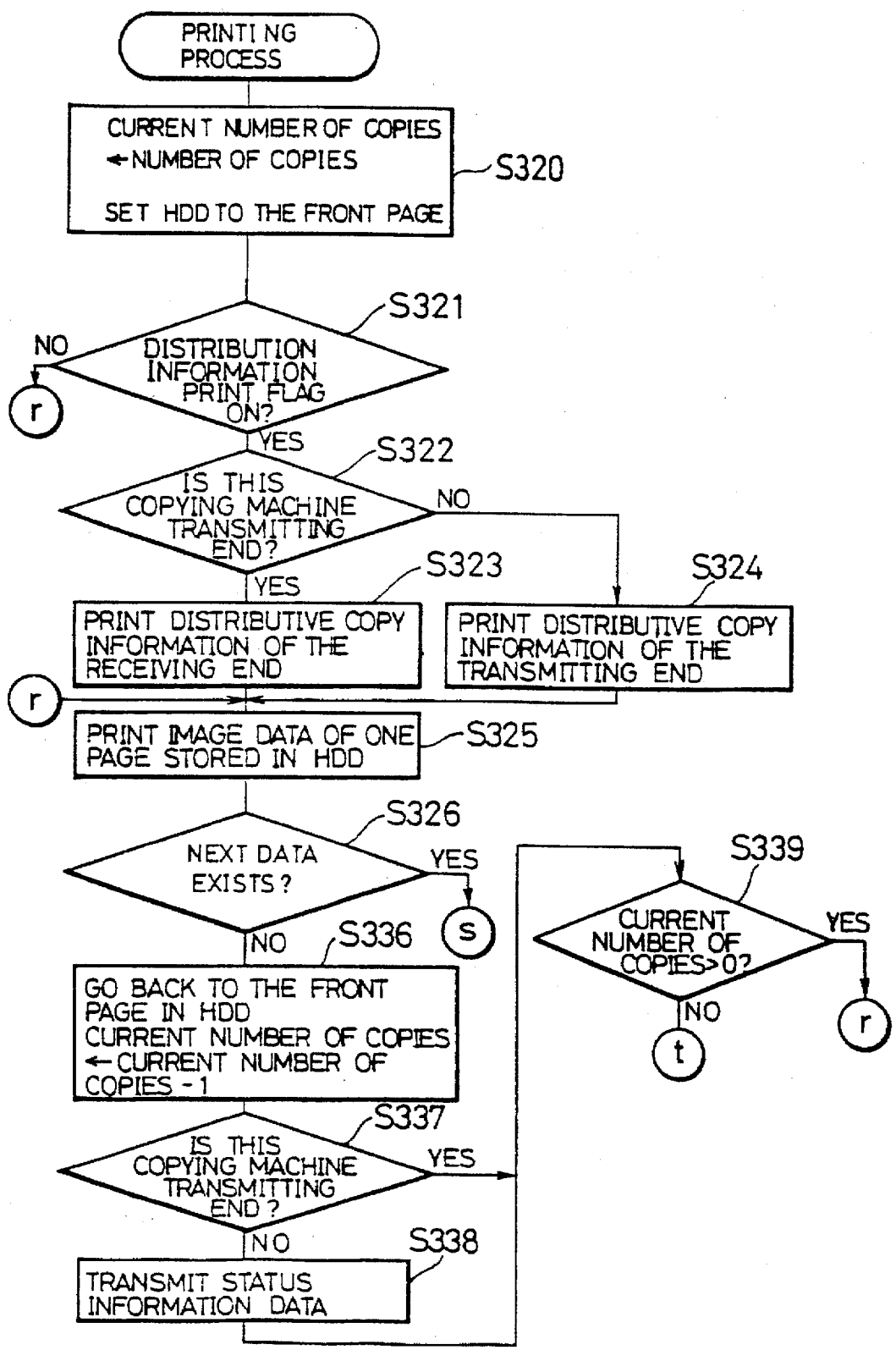
FIG. 37 is a flowchart showing the printing process in the flowcharts of FIG. 29 and FIG. 32.

Thereafter, the image data of the next page of the HDD 7 is set (S332), and the sequence goes back to S325 shown in FIG. 37, and the newly set image data is printed. If it is not confirmed that the data receiving flag is set in S329, or if the received data is not the status information data in S330, the sequence directly moves onto S332 so as to set the image data of the next page in the HDD 7.

On the other hand, in S327, if it is determined that the copying machine is of the receiving end, it is checked whether or not a print error has occurred (S333). If not, the sequence moves onto S332 where the image data of the next page of the HDD 7 is set. If a print error has occurred, it is checked whether or not the error has been cancelled (S334). If not, the status information data in which a value for setting the copying machine in the error state is prepared to be transmitted to the transmitting end (S335). The described transmission of the status information data is repeated until the error cancellation is determined in S334. Upon confirming that the error has been cancelled, the sequence moves onto S332 where the image data in the HDD 7 is set to the next page.

After the sequence moves from S332 to S325 shown in FIG. 37 and the image data is printed, if it is determined in S326 that no data exists, the setting of the image data is returned to the front page, and the previously stored number of copies is extracted by "1" to renew the current number of copies (S336). Then, it is checked whether the copying machine is of the transmitting end or the receiving end (S337). If the copying machine is of the receiving end, the status information data is prepared so as to be transmitted to the transmitting end (S338). As described, every time a set of copies is completed, the copying machine of the receiving end transmits the renewed status information data. Therefore, in the copying machine of the transmitting end which receives the status information data, as previously described, the distributive copy state showing the remaining number of copies, etc., in each copying machine of the transmitting end is displayed in the copying machine of the transmitting end. As a result, in the copying machine of the transmitting end, the copy state of each of the distributed copy operation is renewed to be displayed on the operation panel of the panel unit 3, the operator can confirm the current distributive copy state of each copying machine to which the copy operation is distributed by the operation panel of the copying machine of the transmitting end.

If it is determined that the copying machine is the transmitting end in S337, it is checked whether or not the renewed number of copies in S336 is greater than "0" (S339). Similarly, in the case where the copying machine is of the receiving end, after the status information data is transmitted (S338), it is checked whether or not the current number of copies is greater than "0" (S339). Here, if the current number of copies is greater than "0", since this suggests that the distributed number of copies have not been produced, the sequence goes back to S325, and the printing process of the image data is repeated. On the other hand, if the current number of copies is "0", since this suggests that the distributed number of copies have been produced, the sequence moves onto S340 shown in FIG. 39, and it is checked again whether the copying machine is of the transmitting end or of the receiving end.

If the copying machine is of the receiving end, the print end data is transmitted to the copying machine of the transmitting end (S341), and the display shown in FIG. 26(c)

is made so as to display a message that the copies distributed to the receiving end have been produced (S342), thereby terminating the processing routine. On the other hand, in the case where the copying machine is of the transmitting end, it is checked whether or not all the copying machines of the receiving end complete the respective printing operations (S343). Whether or not all of the copying machines complete the printing operation can be determined by determining whether or not the print end data is received from the receiving end.

If all of the copying machines have not complete the respective printing operations, the communication data receiving process is executed (S345). As a result, it is confirmed if the data receiving flag is set (S346). If the data is received, it is checked whether or not the data ID of the data received subsequently shows the status information data (S347). If the received data is the status information data, based on the state of the copying machine or remaining number of copies in the data, the display of the distributive copy state is switched (S348), and the sequence returns to S343. In S343, if it is determined that all of the copying machines complete the printing operation, as shown in FIG. 25(c), a message "the distributive copy on the transmitting end is completed" is displayed (S344), thereby terminating the processing routine.

As a result, in the copying machine of the transmitting end, even if the printing operation of the copying machine is completed, until all of the coping machines of the receiving end to which the copy operation is distributed complete respective copy operations, the state of each copying machine can be confirmed by the panel unit 6. When all of the copying machines complete the respective printing operation, printing operation end data is transmitted from each copying machine to the copying machine of the transmitting end, and based on the data, the panel display 6 of the copying machine of the transmitting end displays a message "all of the copying machines have completed the printing operation". As a result, it can be confirmed by the copying machine of the transmitting end that all of the copying machines have completed respective printing operation. Additionally, in each copying machine of the receiving end, it can be confirmed by the panel unit 6 of its own that the distributive copy job is completed.

As described, in the system composed of plural copying machines being connected, when a copy operation of the document is executed, specified numbers of copies are distributed to respective other copying machines being connected, and the image data read in the copying machine of the transmitting end is transmitted to other copying machines. Then, each copying machine which receives the image data executes a printing operation based on the received image data and the distributed number of copies. In the system having the described arrangement, in accordance with the distributive copy operation, in respective copying machines of the transmitting end and receiving end, the distributed number of copies, the state of the printing operation, etc., are displayed on the panel unit. In the meantime, if necessary, prior to the copy operation, the distributed state can be printed. Therefore, the content of the distributive copy operation and the state of the distributive copy operation, etc., can be confirmed.

In the present embodiment, explanations have been given through the case whether each copying machine is provided with the HDD 7, and all the image data in the document of plural pages for one copy job are once stored in the HDD 7, and a sequential copy is printed plural times. However, it may be also arranged such that the image data stored in the HDD 7 is printed page by page so as to produce plural sets of copies. Alternatively, when adopting such output system, each copying machine for executing the distributive copying is not necessarily provided with the HDD, nor it is not necessarily to store all the image data of the document of plural pages at one time.

Like the first embodiment, the present embodiment may be applicable to the copying machine in which a single copy mode and a distributive copy mode can be selected.

Furthermore, in the described preferred first and second embodiments, the communication line of bus type is used as the communication line 1, which connects plural copying machines and permits high speed communication. However, as long as plural copying machines can be connected, the communication line is not limited to that of bus type. The communication line 1 physically exists. However, plural copying machines may be connected by wireless radio wave, etc.

The described preferred first and second embodiments have been explained through the case where all of the copying machines are provided with the scanner section and the printing section. However, the present invention is not limited to this arrangement, and it is preferable as long as at least one of the copying machine is provided with the scanner section. Additionally, the copying machine provided with the scanner section is not necessarily provided with the printing section.

[EMBODIMENT 3]

The following descriptions will discuss still another embodiment of the present invention. Namely, an image forming system wherein each image forming apparatus of the present invention is effectively used and the functions thereof is fully used will be explained. For convenience, members having the same functions as the aforementioned embodiments will be designated by the same reference numerals, and thus the descriptions thereof shall be omitted here.

Figure 42:
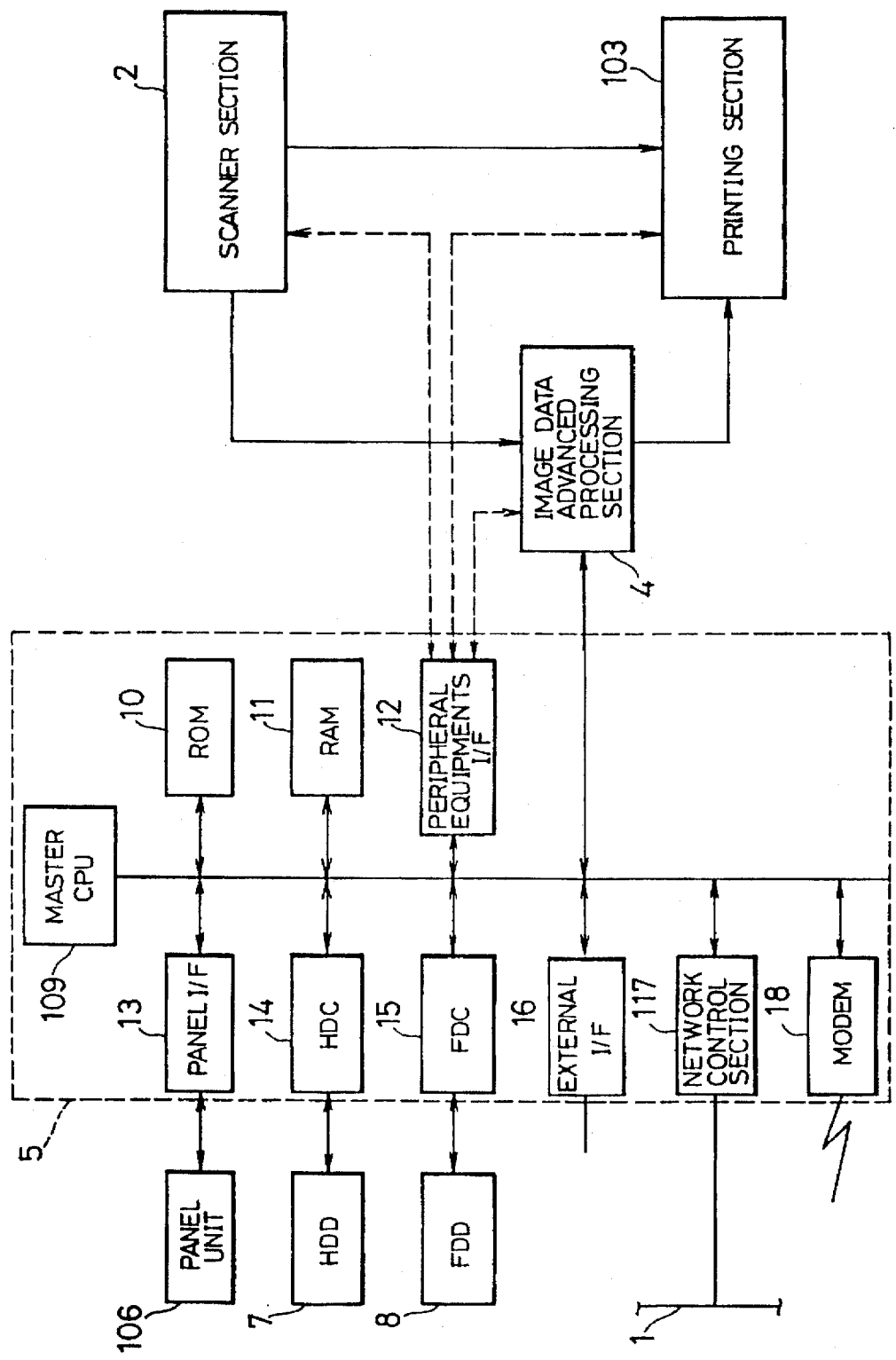
FIG. 42 is a block diagram showing the configuration of the digital copying machine.

An image forming system in accordance with the present invention is composed of plural digital copying machines (hereinafter referred to as a copying machine) C1, C2, C3, . . . Cn as image forming apparatus which are connected through a communication line 1 for permitting a high speed transmission of image data, etc., as in the case of the first embodiment. The configuration of each copying machine is the same as that of the first embodiment (see FIG. 2 and FIG. 3). However, in the present embodiment, as shown in FIG. 42, a panel unit 106 functions also as display means for an image processing function in addition to the function of the panel unit 6 in the first embodiment. A network control section 117 functions not only as data transmission means, distribution number transmission means, data receiving means, distribution number receiving means, and processing capacity transmission means, but also as the image processing function transmission means. The master CPU 109 functions not only as distribution number set means, processing capacity detection means, processing capacity transmission instruction means and error detecting means, but also as image processing capacity detecting means, image processing function transmission instructing means and image processing function setting means. A printing section 103 has the same function as the printing section 3.

In the copying machine, a selection can be made between a concurrent copy mode wherein a distributive copy operation (printing) is performed concurrently with other copying machines being connected to which a specified number of copy job are distributed according to the set function and an independent copy mode wherein a copy operation is performed independently without using other copying machines.

Therefore, on the panel unit 106, a concurrent copy mode switch key is formed for switching ON/OFF of the concurrent copy mode for performing a concurrent copy operation. Here, when the concurrent copy mode switch key is set OFF, the copying machine is set in the independent copy mode. The set mode, i.e., whether the concurrent copy mode and the independent copy receiving mode are set ON or OFF is stored in the RAM 11, and the memory can be renewed according to operation of each key.

The copy operation in the copying machine having the above arrangement will be explained. A copy operation in each copying machine C1, C2, C3, . . . Cn differs in its flow of image data depending on whether or not an HDD 7 is provided. However, as the difference is the same as the first embodiment, the explanations thereof shall be omitted here.

Figure 43:
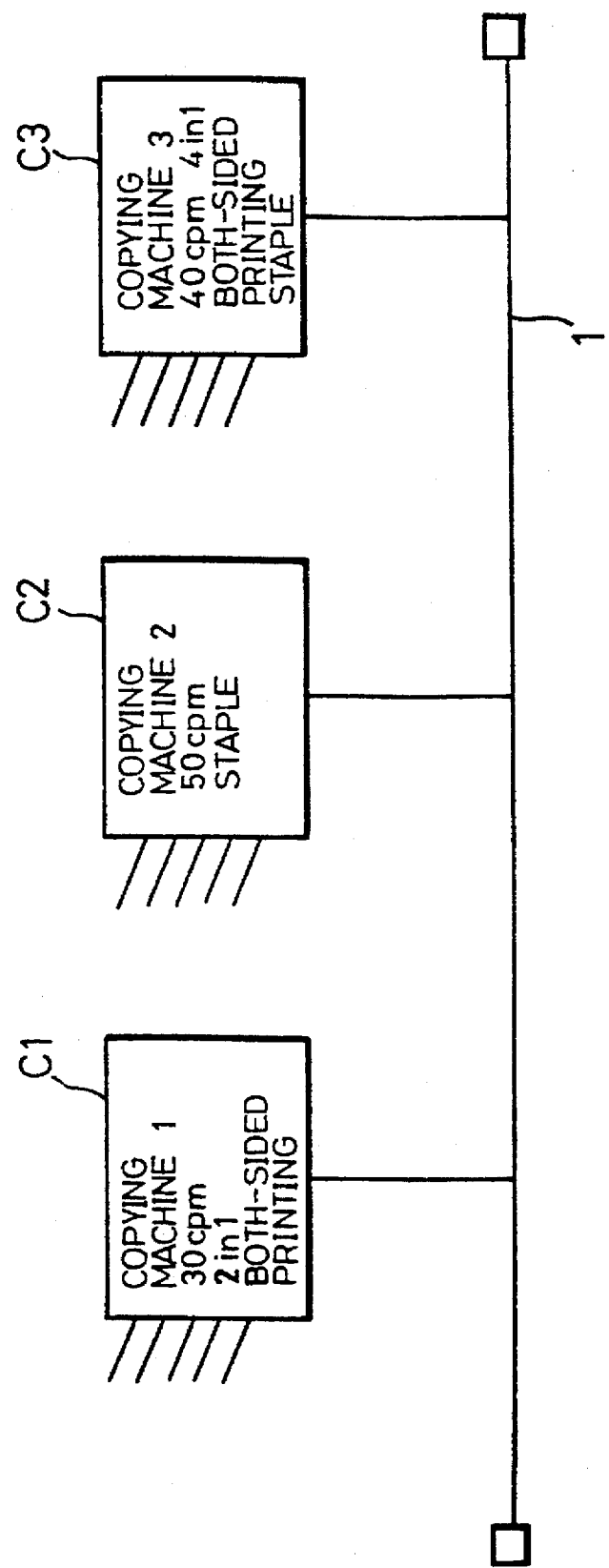
FIG. 43 is an explanatory view explaining respective optional functions provided in the three digital copying machine being connected through a communication line.

A plural copying machines C1, C2, C3, . . . Cn connected through the communication line 1 respectively have different copying processing capacities and optional functions. More concretely, for example, as shown in FIG. 43, in the case where three copying machines C1, C2 and C3 are connected through the communication line 1, the copying machine C1 has a copy processing function of 30 cpm, and is provided with the HDD as an optional function and with a 2in1 function for reducing the image of two pages into one page and a both-sided printing function as unique image processing functions.

The copying machine C2 has the copy processing function of 50 cpm, and is provided with the HDD as an optional function and with a staple processing function for stapling each set of copied sheets as a unique image processing function. The copying machine C3 has a copy processing capacity of 40 cpm, and is provided with the HDD as an optional function and with a 4in1 function for recording an image of 4 pages in one page, a both-sided printing function and a stapling function for stapling each set of copied sheets as unique image processing functions.

FIG. 44(a) through FIG. 44(c) respectively show basic structures of various data which are transmitted and received by the copying machines C1, C2 and C3 through the communication line 1. The copying machines C1, C2 and C3 respectively have different addresses so as to be distinguishable. The address of the transmitting end is the address indicating the copying machine of the transmitting end. The address of the receiving end is an address indicating the copying machine of the receiving end. If the receiving address is "0", without specifying any particular copying machine, all of the copying machines being connected through the communication line 1 are of the receiving end.

The job ID is the data identifying each concurrent copy operation. The job ID is an address of a transmitting end copying machine which initiates the execution of the concurrent copying process. The address is set to a value of not less than 1 (as "0" is an address suggesting all of the copying machines). In the case where a concurrent copy operation is being executed in one copying machine, if the concurrent copy job No. of the copying machine is different from the job ID of the received data through the communication line 1, the concurrent copy operation for the received data is different from the copy job being executed in the copying machine. Therefore, the concurrent copy operation for this data will not be executed. As described, since the data of each concurrent copy job can be identified by the job ID, plural copy jobs can be executed simultaneously using the same communication line 1.

The data ID defines the kind of this communication data so as to distinguish the data of six kinds: the information request data, information response data, set request data, set response data, image request data and image response data. A data byte count (m) defines the size of the subsequent data. For example, if the byte count is m, the size (amount of data) is m bytes.

In FIG. 44(b), the data Id indicating the kind of the communication data explained in reference to FIG. 44(a) and the corresponding data are summarized. As described, the communication data is of the six kinds: information request data, information response data, set request data, set response data, image request data and image response data.

The information request data is the data for requesting information regarding respective copying machines with respect to the copying machine being connected. The copying machine which receives information request data transmits the information response data.

The set request data is the data for requesting the set condition with respect to the copying machine being connected. The respective copying machine which receives the set request data sets the respective values according to the set value of the set request data, and transmits the set response data having set values with respect to the transmitting end of the set request data.

The image request data is the data for requesting the memory for storing the image data for recording (copying) with respect to the copying machine being connected. The respective copying machines which receive the image request data transmit the image response data to the transmitting end of the image request data indicating that the image data is stored by receiving the image request data.

FIG. 44(c) shows an example of the function ID explained in reference to FIG. 45(a) through FIG. 45(f). FIG. 44(c) show respective functions provided in the copying machines C1, C2 and C3 explained in FIG. 43. In the present embodiment, the function ID is of four kinds: 2in1 function, 4in1 function, both-sided copy function, and staple function. The function ID is not limited to the above functions, and other examples of such functions include: the function for synthesizing plural image data, a sort function with a sorter, etc. With response to these function. ID, the set value is either for the ON state or OFF state. Namely, the value for the ON state is set when setting each function.

FIG. 45(a) through FIG. 45(f) respectively show the data of six kinds in detail, and the configuration of various communication data to be transmitted and received between the specific copying machine of the transmitting end and plural copying machines being connected.

FIG. 45(a) is the information request data, and in the data ID, the ID for defining as the information request data is set. Normally, since the data is required to be transmitted to all of the copying machines being connected through the communication line 1, the address of the receiving end is an address suggesting that the all of copying machines are of the receiving end ("0"). However, by setting the address of a specific copying machine, the data ID may be transmitted only to the specific copying machine.

As described, the job ID is the data for identifying each concurrent copy operation, and an address of the copying machine of the transmitting end which initiates the concurrent copy process is set. Since the copying machine of the transmitting end which initiates the concurrent copy operation is the copying machine which transmits the information request data, in the job ID, the address of the copying machine which transmits the information request data is set. As the data such as an actual image, etc., is not needed, the byte count of the data is "0".

FIG. 45(b) is the information response data, and in the data ID, the ID indicating information response data is set. Since the information response data is in response to the information request data, the receiving and address of this data is the transmitting end address of the information request data, and the job ID is the same as the job ID of the information request data.

In the data area of the communication data, the name of the registered copying machine, the copying capacity (copy processing capacity cpm), status ID indicating the state of the copying machine (idle state/busy state/error state), remaining number of copies indicating the remaining number of copies in the copying machine when executing the concurrent copy operation, and the function ID indicating the functions provided in the copying machine are set. Here, the number of the function IDs is not particularly limited. If the copying machine is provided with i function IDs, i function IDs are set. The data byte count is the summation of the byte count to be set.

FIG. 45(c) is the set request data, and for the data ID, the ID indicating the set request data is set. According to the information response data of the respective copying machines resulting from the information request data, based on the set request data, various items are set in the copying machine with respect to the respective copying machines.

The items to be set in each copying machine is the number of copies and the function ID of the information response data, and values for respective items are set. The data byte count is the summation of these byte count of the above-mentioned setting.

FIG. 45(d) shows the set response data, and since the data ID is the set response data, a value requested by the set request data is set next to the respective set items as the case of the set request data. The data byte count is the summation of the byte counts to be set. This byte count is the same as the previously described case of FIG. 45(c).

FIG. 45(e) shows the image request data, and as the data ID, the ID indicating the image request data is set. This is the request data for storing the image data for recording (copying) in each copy machine, and the content to be stored is the image data of one page. Normally, for the value for the data byte count, a value for the image data is set. However, when the data byte count is set to "0", this suggests that the image data for the concurrent copy operation is completed.

FIG. 45(f) is the image response data, and for the data ID, the ID indicating the image response data is set. This image response data is the response data in response to the image request data to be transmitted, and indicates that the image data is stored by receiving the image request data. In practice, data such as image, etc., is not particularly specified, the data byte count is "0".

FIG. 46(a) through FIG. 46(c) show examples of an image to be displayed when setting the concurrent copy operation by the panel unit 106 of the copying machine of the transmitting end in the copying machine C1 as the copying machine of the transmitting end. FIG. 46(a) shows one display example showing the functions provided in respective copying machines. In the figure, "a-1" is the display of the function of the copying machine C1 of the transmitting end, "a-2" is the display of the function of the copying machine C2 of the receiving end, and "a-3" is the display of the function of the copying machine C3 of the receiving end. In the display, the numbers of copies to be distributed to the respective copying machines and the functions provided in the respective copying machines can be set, and the ON or OFF of each function is displayed. As a result, the different function and different number of copies can be set in each copying machine. Namely, the function which is not provided in the copying machine C1 of the transmitting end or the function of the copying machine C1 of the transmitting end can be set in other copying machines as desired so as to produce copies in the same manner.

Similarly, FIG. 46(b) is an example of the function to be set for each copying machine as in the case of FIG. 46(a). The respective functions of the copying machines are displayed for each copying machine. In the display, the function provided only in the copying machine in which a display is being made is designated by "○", and the function provided in the copying machine and not in the copying machine in which a display is being made of the transmitting end is designated by "☆". As described, by displaying the respective functions of the copying machines by each copying machine, the functions of each copying machine can be easily recognized, and each function can be set without mistakes.

FIG. 46(c) shows the example where the function of each copying machine and the function that can be performed in the transmitting end are displayed for each copying machine, and each function can be set for the copying machine. Since the function to be performed at the transmitting end is displayed on the set screen of each copying machine, the function that can be processed in the transmitting end can be set and executed other than the functions provided in the copying machine.

The copying machine C1 of the transmitting end is provided with the 2in1 function which is not provided in the copying machines C2 and C3. However, the image data on the document read in the copying machine of the transmitting end is processed using the 2in1 function, and the image data converted into 2in1 is transmitted to the copying machines C2 and C3. Therefore, the image data read by the copying machine C1 of the transmitting end is not directly transmitted to the copying machines C2 and C3, and the image data processed according to the described 2in1 function is transmitted. Therefore, a display is made as if the copying machines C2 and C3 were provided with the 2in1 function which is, in fact, not provided. As described, when the copying machine functions as if the function is provided, in order to distinguish it from the functions which are actually provided, the corresponding function (2in1 function in this example) is surrounded.

FIG. 46(d) shows the example where the copying machine of the transmitting end is set (d-1), and the entire functions of the copying machine being connected are displayed (d-2), and one copy operation is set. Without setting the copy operation in each copying machine, one copy operation is set with respect to the selected entire copy operation for this reason, without recognizing the functions of each copying machine, the copy operation can be executed using the function of the entire copying machine being connected. Among the function of the entire copying machine being connected, if the function that cannot be combined exists, if one function is selected like d-3, the functions which can be used with the selected function are displayed so as to be distinguished from the functions which cannot be used with the selected function. Alternatively, it may be also arranged such that the functions which cannot be executed with the function cannot be selected. In the described manner, copies according to the set function can be produced.

Especially for the d-3, in the 2in1 function, using the function provided in the transmitting end, since the data having gone through the image process is transmitted to other copying machines C2 and C3, the copy function according to the function is permitted. On the other hand, as to the both-sided copy function and the staple function, since these functions cannot be transmitted, the processing of these functions are not permitted. Namely, as to the described functions, if not provided in the copying machine, the objective copies according to these functions cannot be produced. In the display, in order to inform the user that these functions cannot be executed in each of the copying machines C1, C2 and C3, the functions are surrounded like the 2in1 function so as to be distinguished from the function which can be executed.

The copying machines C1, C2 and C3 may perform copy operations according to the same function. However, the copying machines C1, C2 and C3 may also perform concurrent copy operations according to the functions set in respective copying machines. For example, as the copying machines C2 and C3 are provided with the staple function, the staple process can be performed in the copying machines C2 and C3 when executing the concurrent copy operation. However, as the copying machine C1 is not provided with the staple function, the staple function cannot be set in the copying machine C1. Namely, by confirming the display content of a-1~3 and b-1~3 by the user, the function provided in each copying machine can be set.

The 4in1 function cannot be set in the copying machine C1 of the transmitting end. Therefore, when the user wishes to use this function in the copying machine C1 of the transmitting end, the image data obtained by reading the document in the copying machine C1 is transmitted directly to the copying machine C3 provided with the 4in1 function. Then, in the copying machine C3, the 4in1 function is applied to the received image data. Thereafter, the processed image data is transmitted to the copying machine C1 of the transmitting end. Then, the copying machine C1 transmits the image data having gone through the 4in1 function to the copying machine C2. As a result, the concurrent copy operation can be performed in all of the copying machine according to the same function.

Figure 40:
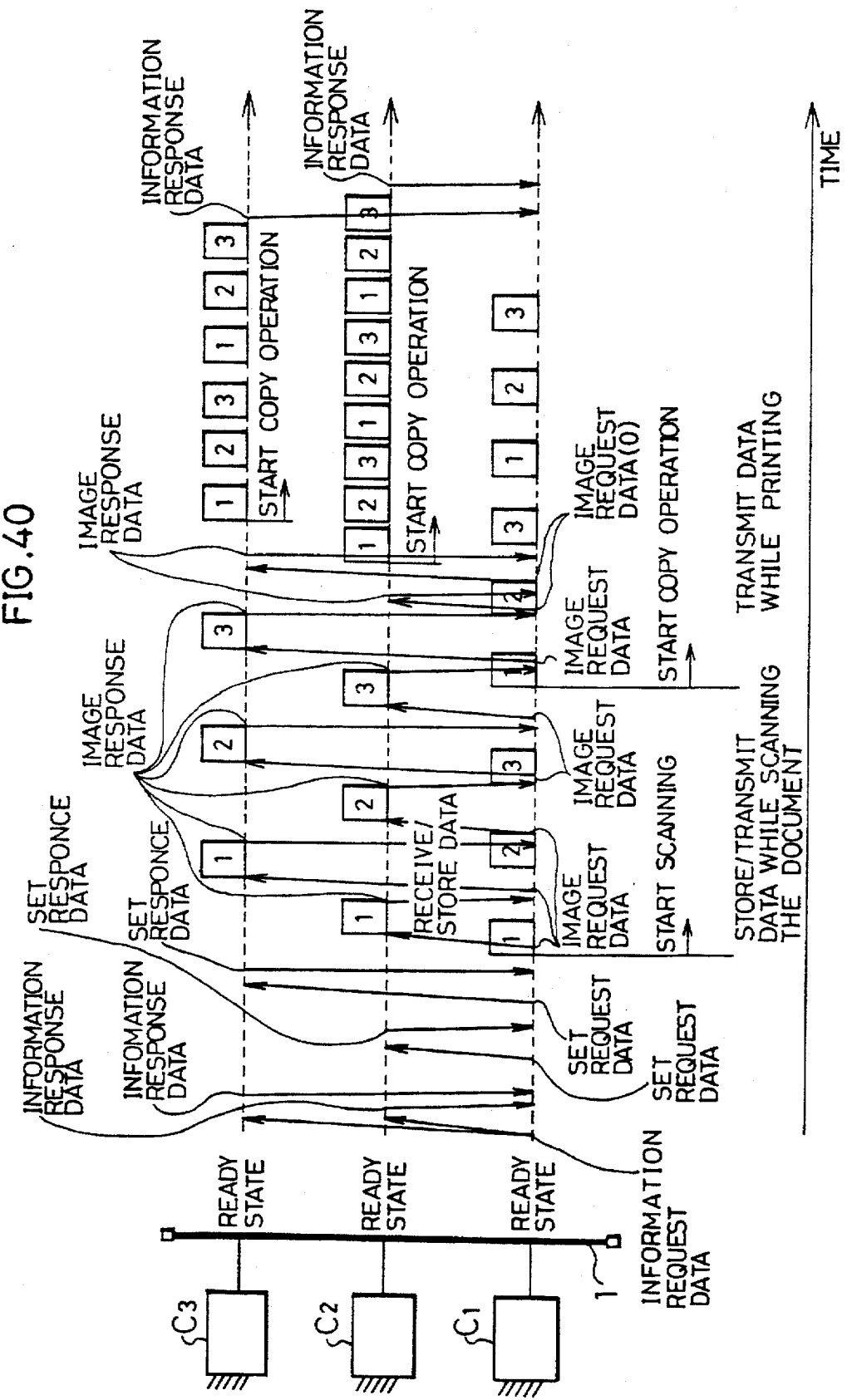
FIG. 40 is a time chart showing a flow of each data and an execution state of a copy operation in three digital copying machines been connected in accordance with still another embodiment of the present invention.
Figure 41:
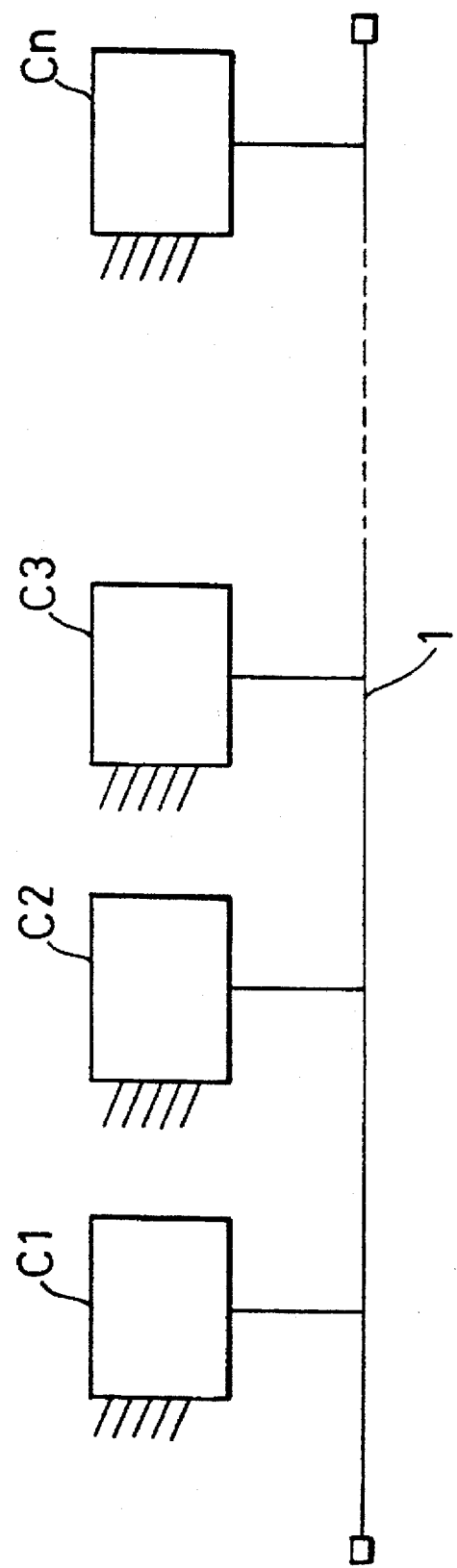
FIG. 41 is an explanatory view showing the state where plural digital copying machines are connected.

FIG. 40 shows a flow of the concurrent copy operation as time passes in the case where the three copying machines C1, C2 and C3 are connected as shown in FIG. 43, and copy job of the document of 3 pages which is initiated by the copying machine C1 as the transmitting end is produced in 7 sets in total. First, it is assumed here that all of the copying machines C1, C2 and C3 are in the idle state.

In order to perform the concurrent copy operation, first, the concurrent copy mode is set on the panel unit 106 of the copying machine C1 by the user. When the concurrent copy mode is set, the copying machine C1 transmits the information request data to each copying machine being connected. The copying machines C2 and C3 which received the information request data transmit the information response data in response to the information request data to the copying machine C1 of the transmitting end.

In response to the received information response data, the copying machine C1 obtains the information of the functions provided in each copying machine being connected, etc., so as to be displayed on the panel unit 106. According to the display, the number of copies and the function are inputted on the side of the copying machine C1 of the transmitting end. In this example, the respective numbers of copies set in the copying machine C1, the copying machine C2 and the copying machine C3 are "2", "3" and "2". The numbers of copies and the function are set according to the instruction on the side of the copying machine C1. As explained in reference to FIG. 46(a) through FIG. 46(d), the number of copies and the function are set by operating the respective input operation keys on the panel unit 106 according to the displayed content. For example, in the case of the display shown in FIG. 46(a), by setting the number of input and the 2in1 function in the display of the transmitting end, it is displayed that the function and the number of copies are set.

Here, it may be also arranged such that the number of copies "7" is inputted on the side of the copying machine C1 of the transmitting end, and the numbers of copies to be distributed to the respective other copying machines are set automatically on the side of the copying machine C1 in reference to the information transmitted from each copying machine (especially the copying capacity). For example, the number of copies is set to "7" in the panel unit 106 of the copying machine C1 by the user, and the concurrent copy operation is performed based on the information of the copying capacity transmitted to both of other copying machines C2 and C3 being connected through the communication line 1, and the appropriate numbers of copies are automatically set in the copying machines C2 and C3 considering the copy completion time of the copying machine C1 of the transmitting end.

The numbers of copies to be distributed to the copying machines C2 and C3 may be set by the copying machine C1 through the methods (1) through (3) introduced in the first embodiment.

When the method (1) is adopted, as 7/3=2 ... 1, the each copying machine produces 2 copies, and the remaining one copy is produced in the copying machine of the transmitting end (3 copies in total). When the method (2) is adopted, the respective numbers of copies are set through the following equations as the respective copy processing capacities of the copying machines C1, C2 and C3 are 30 cpm, 50 cpm and 40 cpm:

$$a+b+c=7$$

$$b=(50/30)\times a$$

$$c=(40/30)\times a$$

wherein, a, b and c respectively indicate the numbers of copies to be distributed to the copying machines C1, C2 and C3.

Namely, as a=7/4, b=35/12 and c=28/12, a=2, b=3 and c=2.

When the method (3) is adopted, as in the case of the method (2), when remaining number of copies exists, the remaining number of copies is distributed to the copying machine having the highest copying capacity (C2 in this example). In this example, although the remaining number of copies exists, the respective numbers of copies to be distributed to the copying machines C1, C2 and C3 set by the method (3) are "2", "3" and "2" which are the same as those set by the method (2).

In the copying machine C1 of the transmitting end, not only the respective numbers of copies to be distributed to the copying machines C2 and C3, but also the function for using the functions of the respective copying machines is set. By completing the setting of the function, the copy start key of the copying machine C1 of the transmitting end is operated.

By operating the copy start key, the data set at the transmitting end is transmitted to the copying machines C2 and C3 being connected. These data is transmitted to each of the copying machines C2 and C3 as the set request data in order. When transmitting the set request data to the copying machine C2, not only the number of copies "3", but also the function provided in the copying machine if selected are transmitted. In response to this transmitted data, upon receiving the set response data from the copying machine C2, the copying machine C1 transmits the number of copies "2" and the data of the set function to the copying machine C3. Then, the copying machine C1 waits for the set response data from the copying machine C3.

According to the set request data, the copying machines C2 and C3 set the numbers of copies and the functions. Upon completing the setting, the copying machines C2 and C3 transmit the set response data indicating that the setting is completed to the copying machine C1.

Upon receiving the set response data from the copying machine C3, the copying machine C1 of the transmitting end initiates the optical scanning of the document placed on the document platen for reading an image on the document (hereinafter referred to as a scanning). Then, the copying machine C1 scans the document of 3 pages in order so that the scanned image data is stored in the HDD 7, and in the meantime, transmits the image data to the copying machines C2 and C3 (see FIG. 45(a)).

Upon receiving the image data from the copying machine C1, the copying machines C2 and C3 store the image data in order in the HDD 7. When the image data obtained by each scanning is received by and stored in the copying machines C2 and C3, the response data is transmitted to the copying machine C1. In the copying machines C2 and C3, the operation is repeated until the transmission of the image data is stopped.

Upon completing the scanning operation of the document of three pages, the copying machine C1 transmits the image request date with the "0" size (no image data) to the copying machines C2 and C3 so as to inform them that the process of the image data is completed. Upon receiving the image request data, the respective copying machines C2 and C3 initiate the respective copy operations. In this case, the copying operation in the copying machine C1 of the transmitting end is started upon completing the scanning operation of the document. In the copy operation, in order to show the respective copy states, the information response data is transmitted to the copying machine C1 of the transmitting end from the copying machines C2 and C3 upon producing each copy. In FIG. 40, in order to clarify the figure, only the last copy, i.e., when completing the set number of copies, the transmission of the response data is shown.

Therefore, in the copying machine C1, by receiving the response data, the processing state of the concurrent copy operation by the copying machines C2 and C3 especially how the copy operation has been processed can be recognized. As explained earlier, the copying machines C1, C2 and C3 can complete the copy operations almost at the same time by setting respective numbers of copies according to the copying capacity (copying speed), thereby improving a productivity of the copy operation.

As the function provided in the copying machine may be used as well if necessary, the staple function, the both-sided copying, the 2in1 copying and 4in1 copying may be performed. As to the 4in1 copy mode, in the case of the document of three pages, as the document of one page is in short, the portion corresponding to the fourth page becomes empty. Especially, in the case where the 2in1 function is set in the copying machine C1 and the copy operations are executed according to the same function not only in the copying machine C1 of the transmitting end but also in the copying machines C2 and C3, in the copying machine C1 of the transmitting end, without transmitting the image of the document to other copying machines upon each scanning, the 2in1 function is applied only after all of the documents to be processed have been scanned, and the processed data is transmitted to the copying machines C2 and C3. In order to perform the described process, under the control of the master CPU 9, an image data advanced processing section 4 of the copying machine C1 of the transmitting end fetches the image of two pages, and reduces the size of the image to be printed on the sheet of the specified size. On the other hand, this data is transmitted to the printing section 103 to initiate the printing operation. In the meantime, the data are temporarily stored in the HDD 7, etc., to be transmitted to other copying machines C2 and C3.

When the 4in1 function is set, as the copying machine C1 of the transmitting end is not provided with this function, all of the scanned image data are transmitted to the copying machine C3 provided with the 4in1 function. Then, the image process according to the 4in1 function is applied to this image data in the copying machine C3, and the image data thus processed is transmitted back to the copying machine C1. In this case, the printing operation according to this function is executed in the copying machine C3.

Next, the copy operation in the copying machine having the described arrangement will be explained.

FIG. 47 through FIG. 56 show the flowcharts explaining the concurrent copy operation. Hereinafter, in reference to these flowcharts, the control operation of the concurrent copy operation will be explained.

Figure 47:
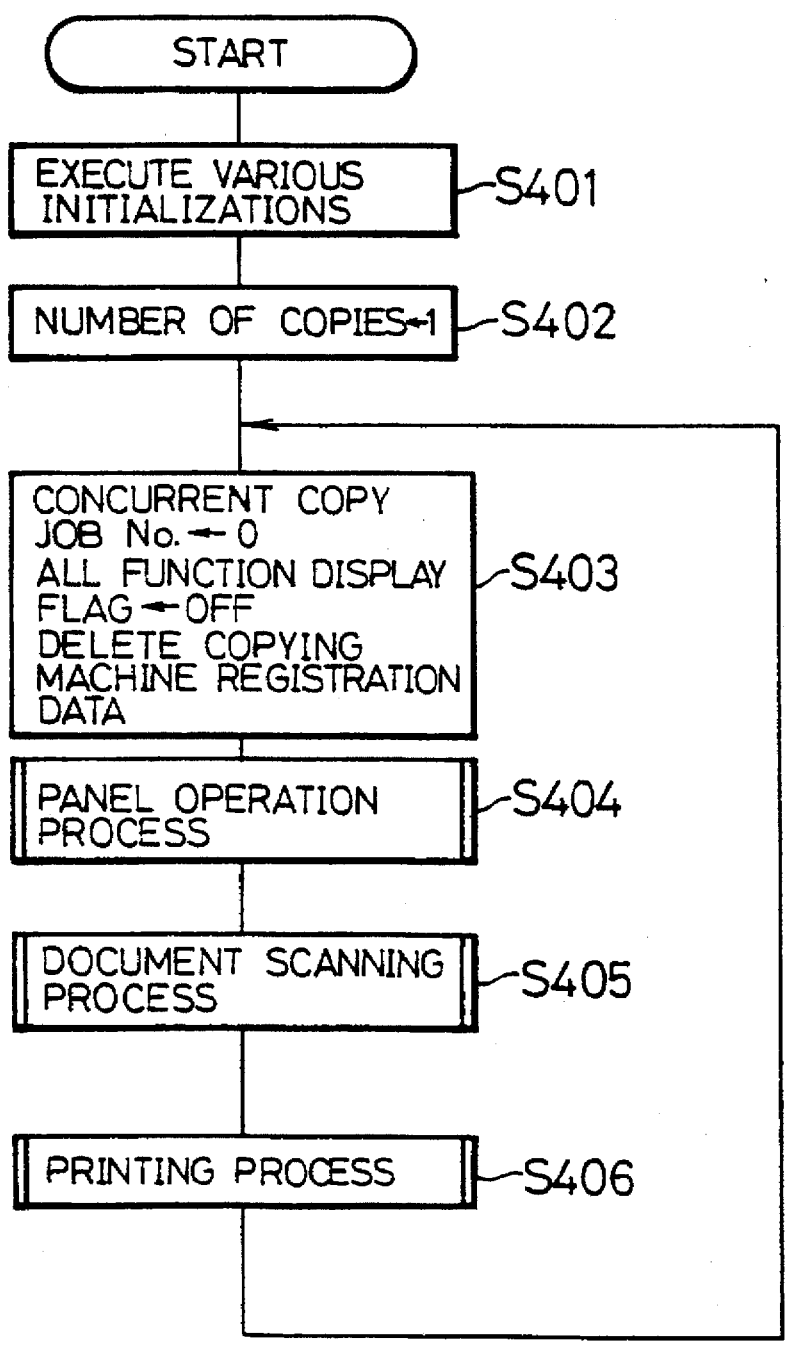
FIG. 47 is a flowchart showing a flow of entire control of the copy operation in the digital copying machine.

FIG. 47 shows the basic flow of the copy operation. The copy operation is activated upon switching ON the power switch, and first, the initialization of each peripheral equipment is performed (S401). Then, the number of copies is initialized to "1" (S402). In the next stage, the concurrent copy job No. is set to "0", the entire function display flag is set OFF, copying machine registration data is deleted, and the concurrent copy operation is initialized (S403). Like the job ID in the communication data, the concurrent copy job No. is a variable showing the job ID of the concurrent copy operation in execution. When the concurrent copy job No. is "0", this indicates that the concurrent copy job is not performed. The entire function display flag displays all the functions provided in the copying machines being connected on the panel unit 106 of the transmitting end copying machine in the concurrent copy mode, while when the concurrent copy mode is set OFF, the functions provided in each copying machine are displayed. The display of all the functions is as shown in FIG. 46(d), and the display content in each copying machine is as shown in FIG. 46(a) and FIG. 46(b), and by operating the display conversion key, the display content is switched sequentially.

Upon completing the initialization operation, the copying machine is set in the stand-by state until the panel operation using the panel unit 106 is performed (S404). Namely, the copying machine executes the process such as setting number of copies, various functions, etc., using the panel unit 106 and waits for the start key to be operated.

Figure 48:
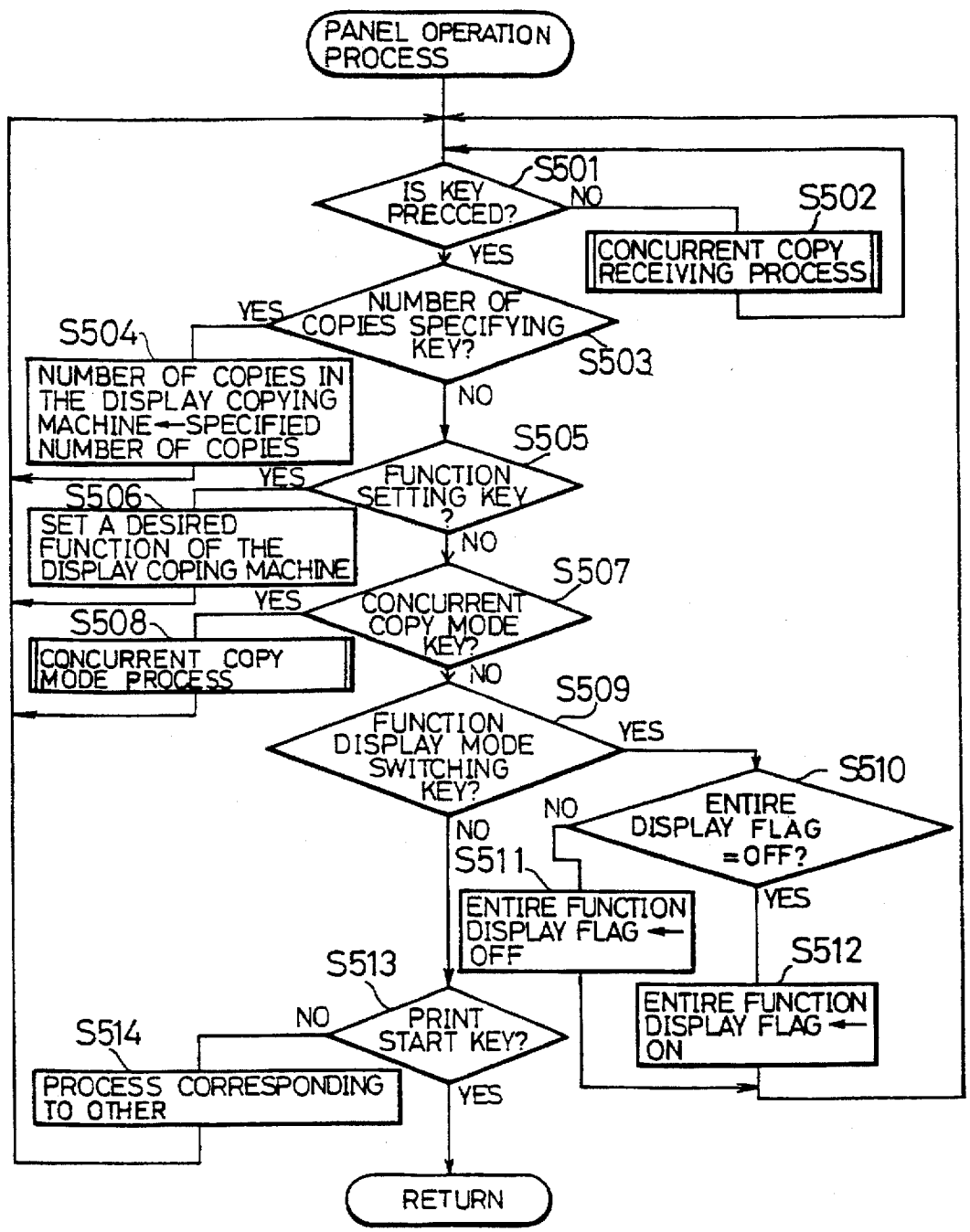
FIG. 48 is a flowchart showing the panel operation process in the flowchart of FIG. 47.

The operation in S404 is shown in detail in FIG. 48.

Upon operating the start key on the panel unit 106, reading of the document is started by the scanner section 2, and the scanned image data is stored in the memory section if the copying machine is provided with the HDD 7 (S405). Then, the stored image data is sent to the printing section 103 when necessary to be printed (copied). Here, in the case of the concurrent copy operation, as described earlier, data is transmitted and received between the transmitting end and the receiving end, and the image data is copied according to the setting by the transmitting end (S406). Upon completing this copy operation, the sequence goes back to S403, and the above-mentioned operation is repeated.

FIG. 48 is a flowchart showing the operation condition of the panel unit 106 in detail in S404 of FIG. 47.

First, it is checked whether or not any key is pressed (S501). If any key is pressed, it is checked whether or not the key is a number of copies set key (S503). If it is determined that the key is the number of copies set key, the number of copies in the copying machine being displayed is set to the specified number (S504). For example, in FIG. 46(a), when the copying machine C1 of the transmitting end is being displayed, the number of copies "2" is set in the display section according to the operation of the key.

On the other hand, if the pressed input key is not the number of copies set key, it is checked whether or not the key is the function setting key in S505. If so, the desired function provided in the copying machine being displayed is set (S506). As shown in FIG. 46(a), in the operation, while the content of the copying machine of the transmitting end is displayed, if the 2in1 function is selected, the content of the No. indicating that the function is set is displayed.

As a result of the check in S505, if the pressed key is not the function setting key, it is checked whether or not the key operation is the concurrent copy mode key (S507). If it is confirmed that the concurrent copy mode key is operated, the process in the concurrent copy mode is executed (S508). The process in the concurrent copy mode is shown in detail in FIG. 53. When the concurrent copy process is executed, the copying machine which operates the concurrent copy mode key becomes the transmitting end, and the concurrent copy operation is performed by the copying machines being connected. In order to execute this concurrent copy operation, the copying machine of the transmitting end receives respective information from other copying machines in order to check whether or not other copying machines are available, and divides the copy job. By recognizing the functions of other copying machines, the desired function can be set as in the described manner.

On the other hand, if the concurrent copy mode key is not operated, it is checked whether or not the pressed key is the function display mode switch key (S509). If it is confirmed that the function display mode switch key is operated, it is checked if the entire display flag is set OFF in S510. If the flag is set OFF, the flag is turned ON (S512). On the other hand, if the flag is set ON, the flag is set OFF (S511). Namely, the flag is switched every time the mode is operated by a single key. Upon completing this process, the sequence goes back to the described S501. As explained earlier, the content of the display is switched between the display shown in FIG. 46(d) and the display shown in FIG. 46(a).

Figure 49:
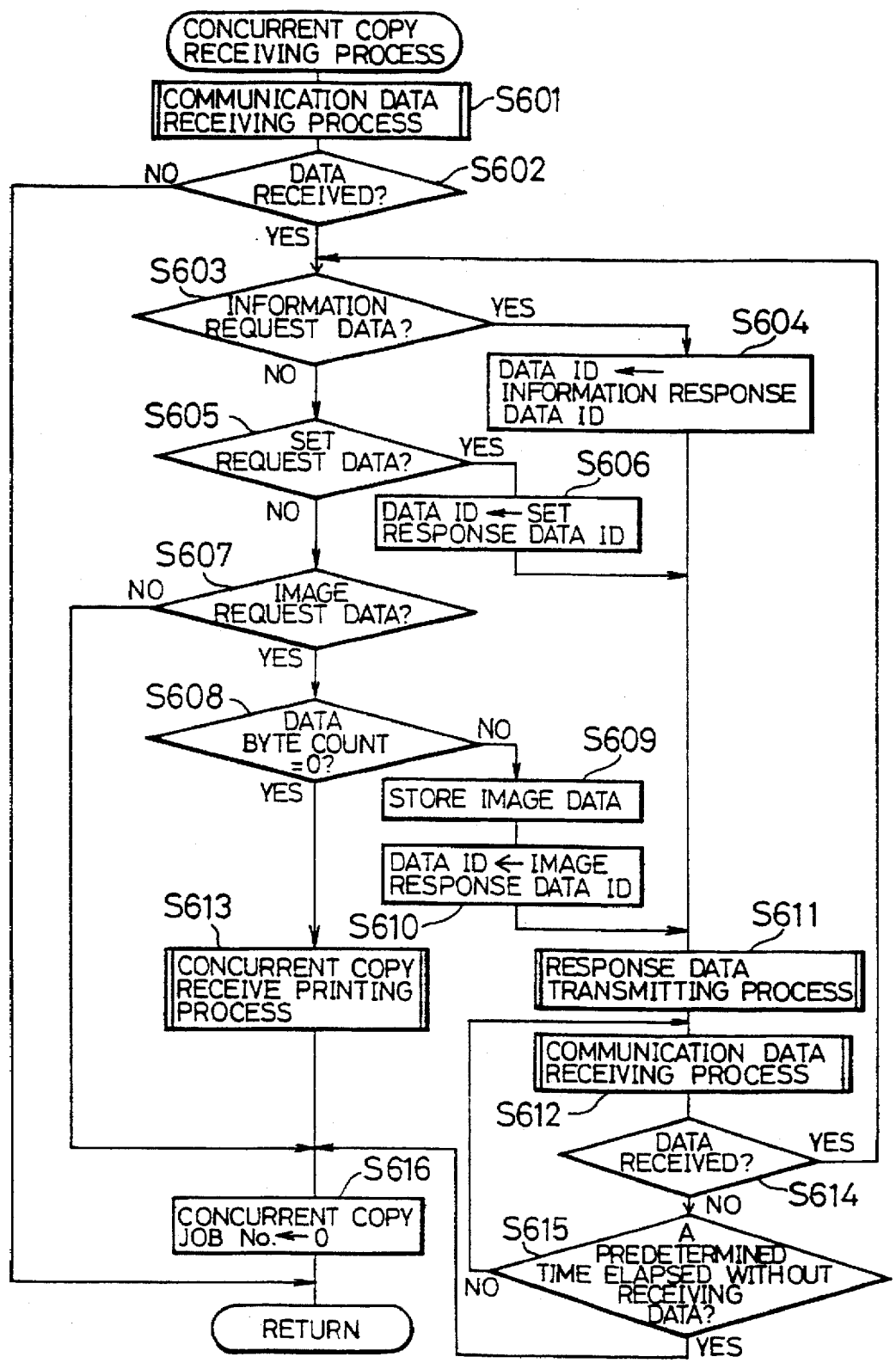
FIG. 49 is a flowchart showing the concurrent copy receiving process in the flowchart of FIG. 48.

If it is confirmed in S501 that any key is not operated, various data are transmitted and received, and the concurrent copy receiving process is executed for processing the concurrent copy operation (S502). This process is shown in FIG. 49 in detail.

If it is confirmed that the parallel copy mode key is not operated in S509, the operation condition of the print start key is confirmed (S513). Then, if the operation of the print start key is confirmed, the panel operation process is completed, and the sequence goes onto the next process. Namely, in order to execute the process in S405 in FIG. 47, the sequence goes back to S405 of FIG. 47.

If it is determined that the pressed key is not the print start key in S513, the sequence goes back to S501 where the state of key operation is confirmed. Similarly, when the number of copies, the function and the concurrent copy process mode are set respectively in S504, S506 and S508, the sequence goes back to S501 and the copying machine waits for the next key operation. As described, if the key operation on the panel unit 106 is not made, the copying machine is always available for the concurrent copy receiving process (S502), and receives information of the parallel copy process from other copying machines. Namely, the copying machine is in the stand-by state without executing the copy operation.

In S504 and S506, the functions of the copying machine is displayed, etc. in such a manner that upon operating the concurrent copy mode key, based on the function transmitted from other copying machines, the conditions recognized in the copying machine of the transmitting end are displayed. Additionally, the switching of the display content is performed by sequentially changing the content shown in FIG. 46(a) by operating the display switch key on the panel display 106.

The operation of the concurrent copy receiving process to be performed by the copying machine of the transmitting end in the stand-by state will be explained in detail in reference to FIG. 49.

First, the content of the communication data on the communication line 1 is checked, and the data receiving process is executed upon receiving the communication data (S601). Then, it is checked whether or not data is received (S602). If not, the processing routine is terminated, and the sequence goes back to S401 of FIG. 48.

If data is received, it is checked whether or not the received data is the information request data (S603). If so, the information response data ID is set in the data ID (S604), and the response data transmitting process is executed (S611), and the information response data is transmitted to the copying machine of the transmitting end. In this process, the copying capacity and functions provided in the copying machine and the data indicating the process of copy operation are transmitted to the copying machine of the transmitting end. The structure of the data is as shown in FIG. 45(b) or FIG. 45(f), and the data is transmitted back to the copying machine of the transmitting end.

In S603, if the received data is not the information request data, it is checked whether or not the received data is the set request data in S605. If so, the information response data ID is set in the data ID (S606), and the response data transmission process is executed (S611), and the set response data is transmitted to the copying machine of the transmitting end. In this case, the received content shown in FIG. 45(c) is confirmed in S605 by the copying machine of the transmitted end, and according to the set content, the number of copies and the function are set in the copying machine of the receiving end in S606. For example, the number of copies is set to the desired number by the copying machine of the transmitting end, and the function provided in the copying machine is set based on the request data. Upon completing the setting, the response data indicating the completion of the setting from the copying machine of the receiving end to the copying machine of the transmitting end. The configuration of the data is as shown in FIG. 45(d).

If the received data is not the set request data in S605, it is checked whether or not the received data is the image request data (S607). As a result of this check, if it is confirmed that the received data is the image request data, and the data byte count is not "0", as this indicates of the image data, the image data is stored in the HDD 7 (S609), and the image response data ID is set for the data ID (S620). Namely, the data indicating that the image data transmitted from the transmitting end is stored is transmitted to the copying machine of the transmitting end (S611). The configuration of the data in response to this transmission is as shown in FIG. 45(f). However, if the function of the receiving end is used without using the function of the transmitting end, the image response data processed has the processed image data, for example, by the 4in1 function, next to the data byte count shown in FIG. 45(f), and the data byte count is set to a value other than "0", which corresponds to the processed data, and is transmitted to the transmitting end as the response data.

As described, when the process of the receiving end is completed, and the response data indicating the completion of the process is transmitted to the copying machine of the transmitting end, as in the process shown in S601, the communication data receiving process is executed for receiving the communication data (S612). Then, it is checked whether or not data is received (S614). If data is received, the sequence goes back to S603, and the content of the data is confirmed in S603, S605 and S607.

On the other hand, if the data is not received, it is checked whether or not a predetermined time has passed after the receiving of the data is stopped (S615). This is made in order to release the restriction of the copying machine of the receiving end due to a disconnection of the communication line, a trouble occurred in the copying machine of the transmitting end, etc., which may have occurred, if the next data is not received for a predetermined elapse of time. Therefore, until a predetermined elapse of time has passed, the processes in S612 and S614 are repeated. If the data is not received for a predetermined elapse of time, the concurrent copy job No. is reset to "0" (S616), and the processing routine is terminated. As explained earlier, the sequence goes back to S501 of FIG. 48, and the copying machine is set in the stand-by state for the key input operation using the panel unit 106.

Figure 50:
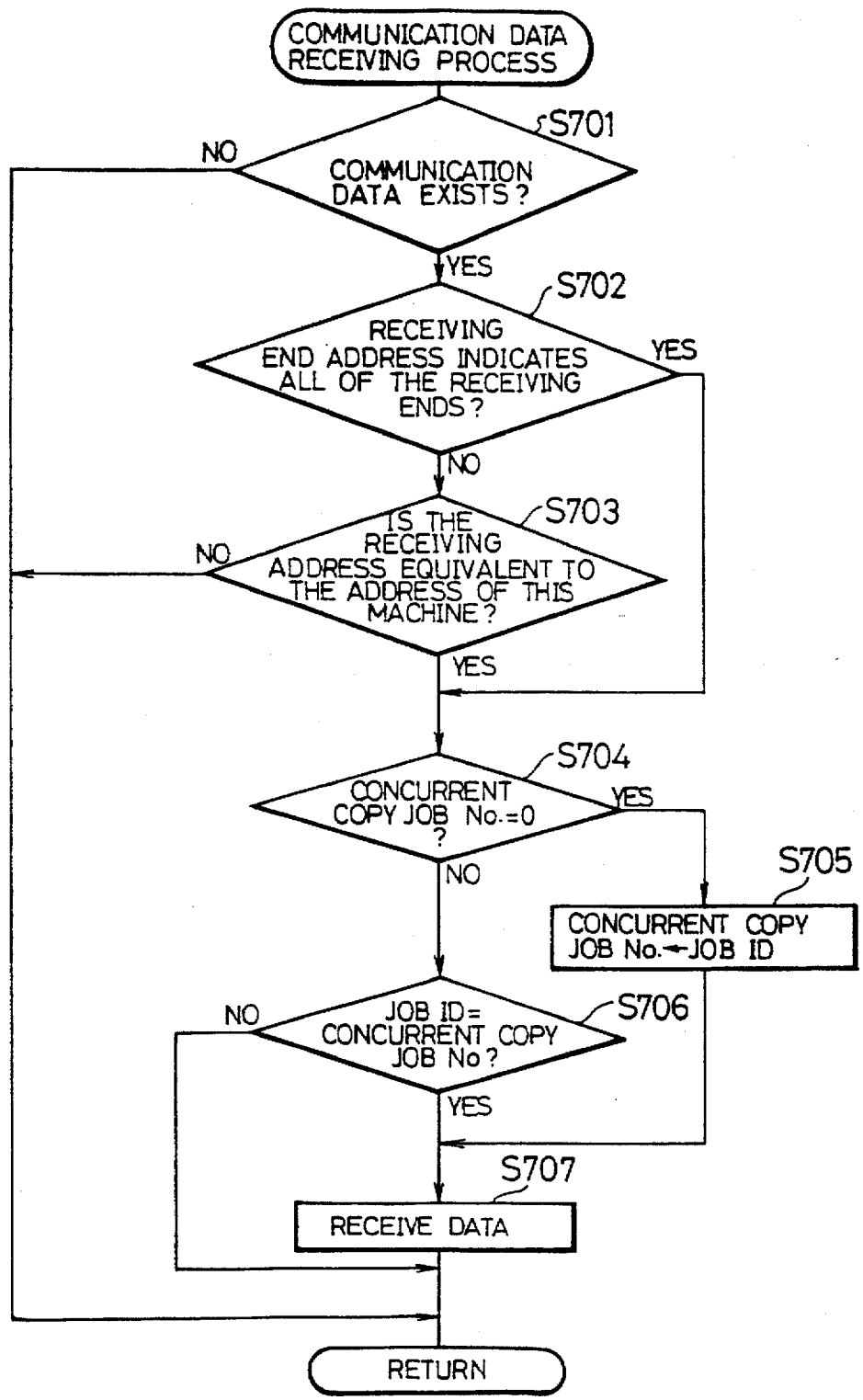
FIG. 50 is a flowchart showing the communication data receiving process.

Next, the communication data receiving process in S601, S612, etc., will be explained in reference to the flowchart of FIG. 50.

First, it is checked whether or not the communication data exists on the communication line 1 (S701). If not, this routine is terminated, and through S602 or S614 in FIG. 49, as data is not received, the sequence consequently goes back to S501 of FIG. 48. Then, the key input operation of the panel unit 106 is executed in the copying machine.

On the other hand, if it is confirmed that the communication data exists on the communication line 1, it is checked whether or not the address of the receiving end suggests all of the copying machines except the copying machine of the transmitting end (S702). If not, it is checked whether or not the address of the receiving end is equivalent to the unique address of the copying machine (S703). As described, if the transmitted address in S702 or S703 is the address of the copying machine of the receiving end, it is checked whether or not the concurrent copy job No. is "0" (S704). If the concurrent copy job No. is not "0", as this suggests that the concurrent copy job is being executed, it is checked whether or not the concurrent copy job No. is equivalent to the job ID set in the communication data (S706). If not equivalent, as the received communication data is not for the concurrent copy operation being executed, this processing routine is terminated without receiving the data. Namely, the copying machine is in execution of another concurrent copying process, and the data indicating that the concurrent copy cannot be performed in the copying machine is transmitted to the copying machine of the transmitting end.

If the concurrent copy job No. is "0", this suggests that the copying machine is not in execution of the concurrent copy job at this moment, and in order to indicate that the received data is the first received data, the job ID of the communication data is set as the concurrent copy job No. (S705), and in the step S706, data is received as in the case where the concurrent copy job No. is equivalent to the job ID set in the communication data (S707), and the processing routine is terminated. Here, the content of the received data is checked sequentially in S603 of FIG. 49.

Figure 51:
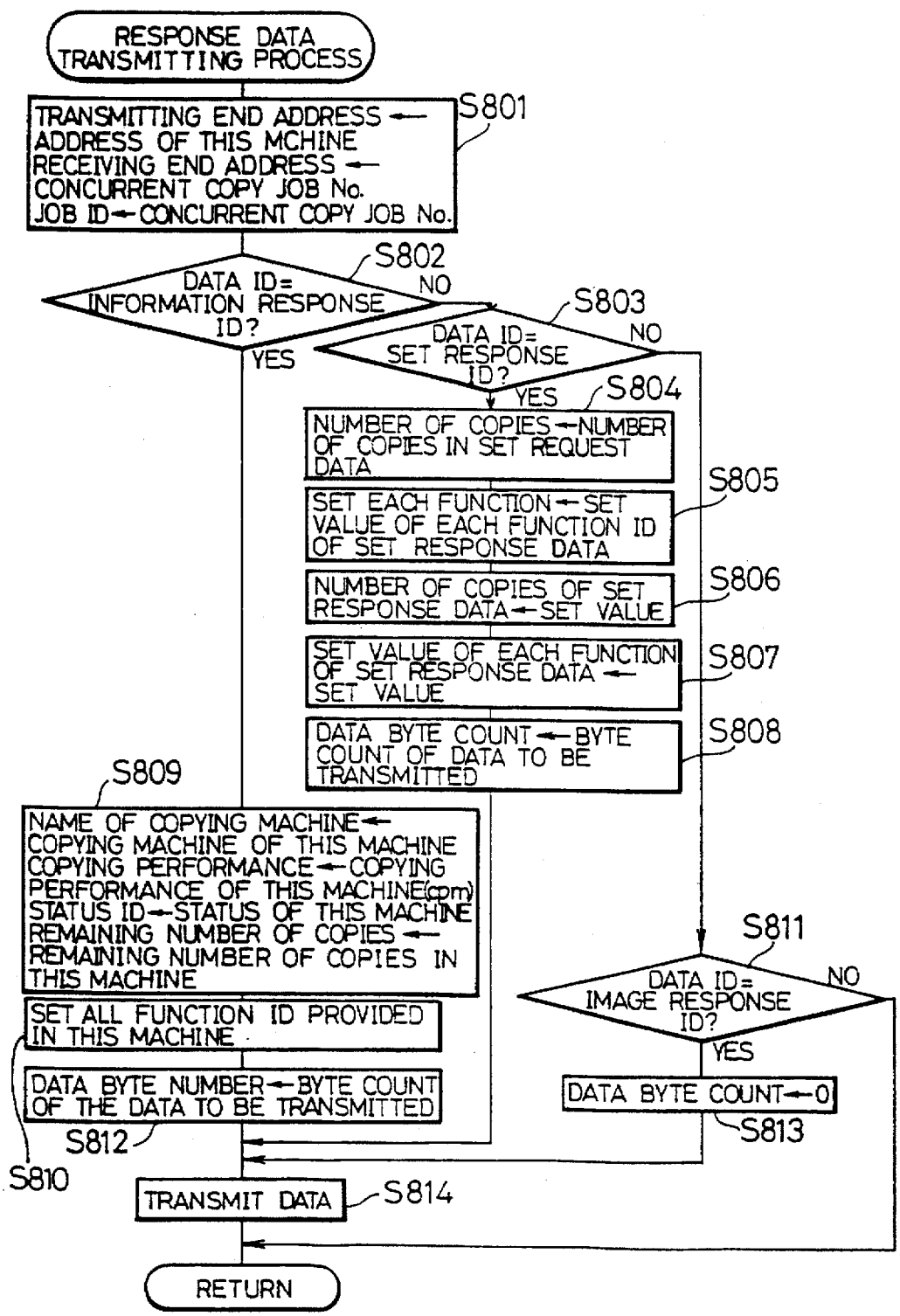
FIG. 51 is a flowchart showing the response data transmitting process in the flowchart of FIG. 49.

FIG. 51 is a flowchart showing the operation in the response data transmitting process. This is a routine showing the process, for example, in S611 of FIG. 49 in detail.

First, in order to transmit the response data to the copying machine of the transmitting end, it is required to inform the copying machine of the transmitting end of the address of the copying machine. Therefore, the address of the copying machine is set to the address of the transmitting end, and the concurrent copy job No. is set to the address of the receiving end so as to set the concurrent copy job No. to the job ID (S801). Here, for the concurrent copy job No., the address of the copying machine of the transmitting end which initiates the concurrent copy operation is already set.

Then, it is checked whether or not the data ID of the communication data to be transmitted is the information response data in response to the information request data (S802). If so, as the response data is the information response data, each item in the information response data is set (S809, S810 and S812). Items in the information response data are: "machine name" suggesting the name of the copying machine, "copying capacity" suggesting the copying capacity of the copying machine (number of copies to be produced in one minute), "status ID" suggesting the status of the copying machine, and "remaining number of copies" suggesting the remaining number of copies in the copying machine. In S810, in order to inform the copying machine of the transmitting end of the functions provided in the copying machine, all of the function IDs are the information response data. Then, the sum of the byte counts of all the data is set as the data byte count (S812), and is transmitted as the data shown in FIG. 45(b) (S814).

In S802, if the data Id of the communication data to be transmitted is not the information response data ID in response to the information request data, it is checked whether or not the data ID is the set response data ID (S803). If so, the number of copies of the received set request data is set as the number of copies in the copying machine (S804), and the value (ON or OFF) set after each function ID of the set request data is set as the function (S805).

Thereafter, the number of copies set in the copying machine is set as the number of copies of the set response data (806), and the set value of each function set in the copying machine is set for each function (S807), and the sum of the byte count of all the data to be transmitted is set as the data byte count (S808). In the described manner, in the copying machine of the transmitting end, the number of copies and the function are set based on the set request data transmitted form the transmitting end, and the data indicating of the completion of the setting as shown in FIG. 45(d) is transmitted to the copying machine of the transmitting end (S814).

In S803, if the data ID of the communication data to be transmitted is not the set response data ID, it is checked whether or not the data ID is the image response data ID (S811). IF so, the data byte count is set to "0" (S813), and the image response data shown in FIG. 45(f) is transmitted (S814). Here, if the function provided in the copying machine of the receiving end but not with the copying machine of the transmitting end is set, for example, the 4in1 function, the process according to the function is executed, the data having gone through the image process is set after setting the data byte count, and the image response data as shown in FIG. 45(e) is transmitted (S814).

After each response data is transmitted, the processing routine is terminated. If the data ID of the communication data to be transmitted in S711 is not the image response data ID, as an error has occurred in the data, the processing routine is terminated without transmitting any data, and the sequence goes back to step S612 shown in FIG. 49.

Figure 52:
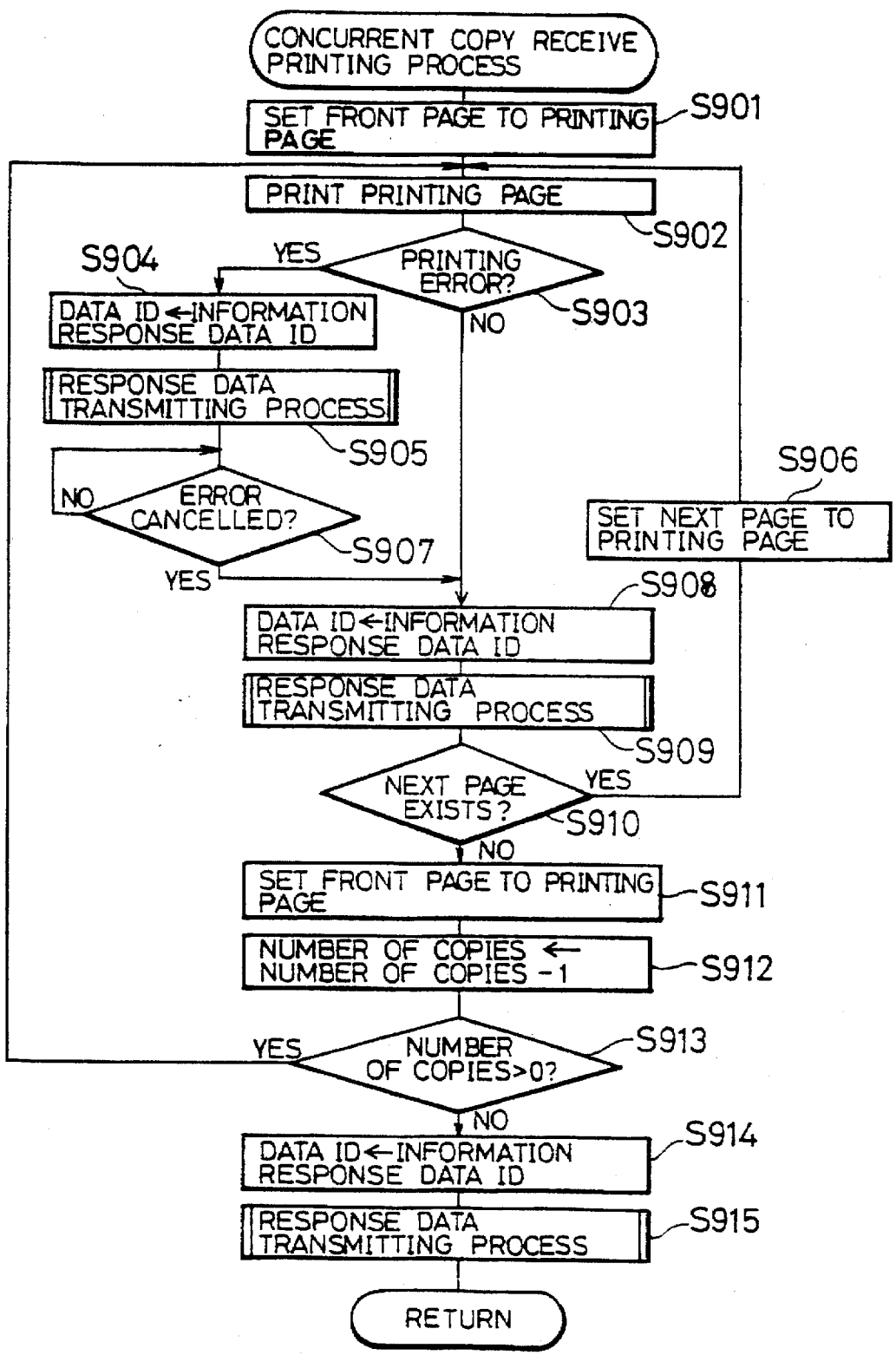
FIG. 52 is a flowchart showing the concurrent copy receiving printing process in the digital copying machine of the transmitting end in the flowchart of FIG. 49.

FIG. 52 shows the processing routine for copying the image data transmitted from the transmitting end according to the set number of copies in the concurrent copy process. Namely, the processing routine is related to the control operation of the printing process in S613 of FIG. 49.

When the image data is received from the copying machine of the transmitting end, and the byte count of the data for the image request is confirmed, the sequence moves from S608 of FIG. 49 to the processing routine of FIG. 52. Prior to the transition, the image data to be transmitted from the transmitting end is stored in S609, and in order to copy the stored data, the following presented processes are executed.

Namely, in order to initiate the copy operation of the stored image data from the front page, the front page of the image data is set to the print page (S901). The image data on this print page is sent to the printing section 103. When the data of one page is sent to the printing section 103, the printing section 103 starts the printing operation.

This printing operation is performed based on the function set in the copying machine. For example, when the both-sided copy mode is set, the image of the front page of the first sheet is formed, and the sheet is discharged on the both-sided mode use copy tray in the copying machine. Then, when printing the image of the next page, the sheet on the both-sided copy mode use copy tray is transported to the printing section 103, and the image on the second page is formed on the back surface of the sheet, and is discharged outside the copying machine. When the 2in1 function is set, in the printing section 103, the size of the image data is reduced to the half size (½) of the sheet to be used, the image on the first page is formed using one half of the sheet. Thereafter, the image data on the next page is processed in the same manner so as to form the image on the other one half of the same sheet as the image on the first sheet. The copy operation in the 2in1 function differs from the described copy operation, and the image data on two pages are processed at one time so as to be printed on the same page with a reduced size, thereby printing the data on the sheet at one time.

After the image processing such as compressing the image data is applied in the image data advanced processing section 4 shown in FIG. 42 so that all of the image data of 2 pages can be printed on the sheet of the specified size, and the processed image data is sent to the printing section 103, and the printing is performed using the 2in1 function. Therefore, the 2in1 function is set in the copying machine of the transmitting end, and if the function is provided in the copying machine of the transmitting end, the image data processed based on the function is received in other copying machines of the receiving end, and the printing based on this function is executed.

As to the image processing based on the 4in1 function which is not provided in the copying machine of the transmitting end, after carrying out the processes in S608 and S613 shown in FIG. 49, the printing process is performed in S902. In this case, the image data of 4 pages is fetched based on 4in1 function, and are compressed so that all of the data can be printed on the specified sheet. Then, when printing the compressed image data, the data is temporarily stored, for example, in the HDD 7, etc. In order to sent the content of the data back to the copying machine of the transmitting end, the image is processed through the processes in S811 through S813 shown in FIG. 51, and the data processed based on 4in1 is sent back. In the case of the document of 3 pages, the fourth page is processed as a blank image.

In the described printing process, it is checked whether or not a printing error has occurred (S903). The printing error especially suggests printing use sheet being jammed, etc. Here, if a printing error has occurred, in order to inform the transmitting end of the content of the error as the status ID, the information response data is prepared (S904) and is sent to the copying machine of the transmitting end (S905). The response data is transmitted through the processes in S801, S802, S803, etc., as explained in reference to FIG. 51, with data showing the state of error to the copying machine of the transmitting end.

When the error has occurred, the copying machine is set in the stand-by state for waiting the error to be cancelled (S907). If this printing error is cancelled or the printing error has not occurred, in order to inform the state of this copying machine to the transmitting end, information response data ID is set for the data ID (S908), and the information response data ID is transmitted through the response data transmitting process (S909) as in the manner explained in reference to FIG. 51.

In the next stage, it is checked whether or not the image data exists on the next page (S910). Here, if the printing operation has not been completed due to an error, the sequence goes back to S902 without confirming the existence of the image data on the next page, and the printing operation is started. Here, possible errors includes running out of sheets, toner, etc., which do not create any problem in printing, unlike a sheet being jammed, etc. In the case of the described error, in the check of an error cancellation (907), the copying machine can be set ready for printing by refilling sheets or toner, and the printing operation is continued, and the error cancellation confirming step of S907 is over. Therefore, after confirming that the printing process of the image data is completed, if printed image is lost due to the sheet being jammed, etc., it is important to set such that the printing operation in S902 is restarted without moving onto S908 upon the cancellation of this error.

Upon completing the printing of the image on the first page through the described printing process, if the image data exists on the next page, the image data on the next page is set (S906), and the sequence goes back to S902, and the described printing operation is repeated. This process is repeated until no image data remains.

Upon completing the printing of the stored image data of all pages in S910, the stored image data of the front page is set again (S911). Then, the number of copies is subtracted from the set number of copies, and the subtracted number is stored as the number of copies. Then, if the subtracted number of copies is "0", as this indicates that the requested number of copies by the transmitting end is completed, the information response data indicating that the printing has been completed is transmitted to the copying machine of the transmitting end in S913, S914 and S915.

If the reduced number of copies is greater than 0, i.e., not less than 1, as this indicates that the set number of copies has not been completed, the sequence goes back to S902 so the sequence goes back to the printing of the image data set in S911 from the front of the image.

In subtracting the number of copies, upon completing a set of copy of a plural documents, if the copying machine is provided with the staple function and the staple function is set, the stapling process is performed in the copying machine, and the stapled copy sheet is discharged on a predetermined discharge tray, and the printing operation of the next set is re-started based on the set number.

In the described manner, upon completing the set plural number of copies, the information response data ID is set for the data ID in S914, and the information response data is transmitted (S915) by the response data transmitting process, thereby terminating this processing routine. Upon completing this routine, the copying machine is set in the stand-by state for the next coping after performing the process in S613 of FIG. 51.

Figure 53:
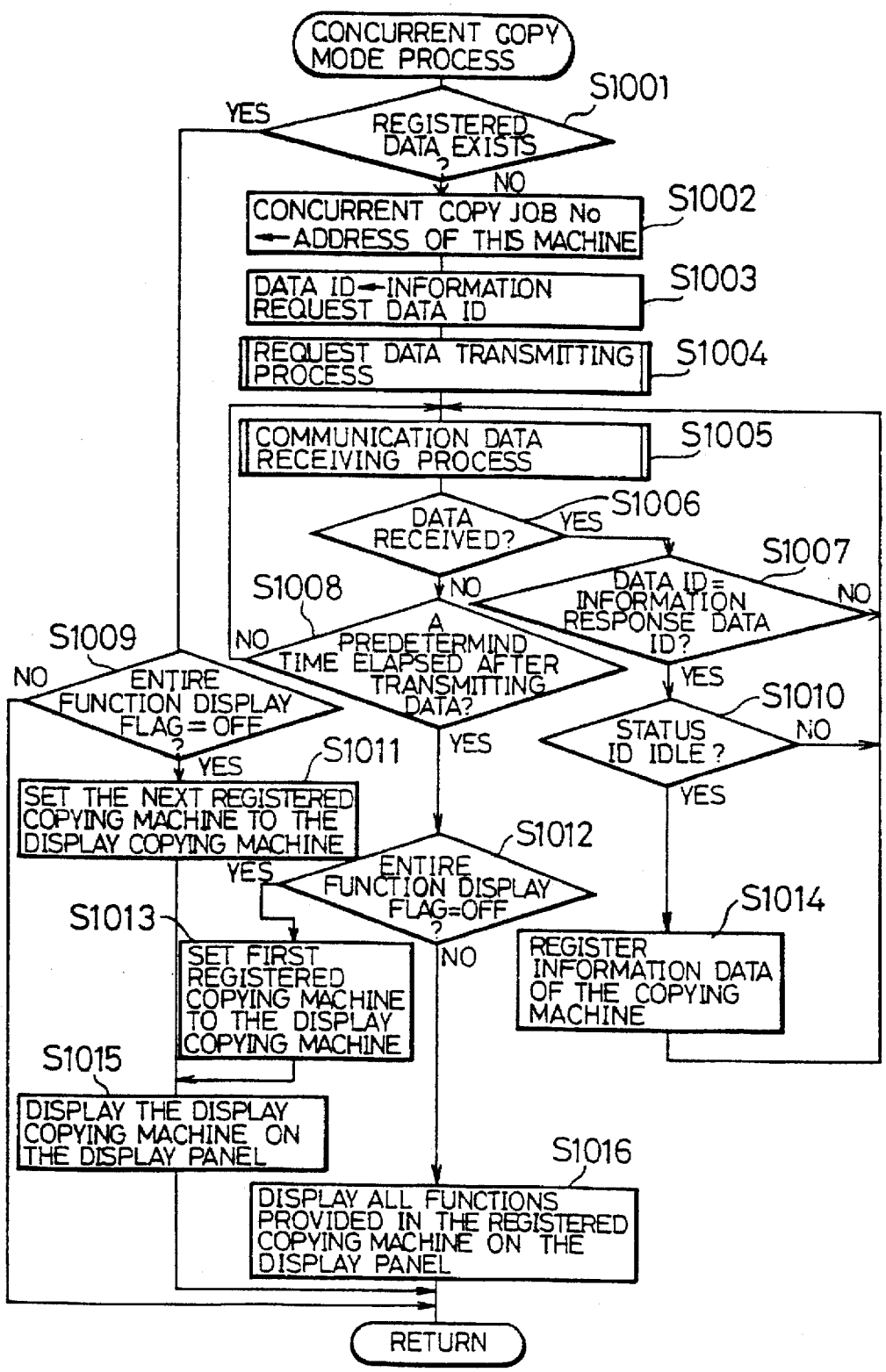
FIG. 53 is a flowchart showing the process in the concurrent copy mode in the flowchart of FIG. 48.

FIG. 53 is a flowchart showing the operation control of the copying machine of the transmitting end in executing the concurrent copy process in the concurrent copy mode. Namely, when the copy operation in the concurrent copy mode is to be performed in a copying machine of the transmitting end, by operating the concurrent copy mode key, the sequence moves onto the processing routine. For example, when processing an input operation by the panel unit 106 of FIG. 48, the sequence moves from S507 to S508, and the processing routine is executed.

Then, it is checked in this copying machine whether or not the registered data of other copying machines exists (S1001). If the registered data does not exists, in order to indicate that the concurrent copy operation is set for the first time, the unique address of the copying machine of the transmitting end which initiates the concurrent copy operation for the concurrent copy job No. (S1002). In order to transmit the information request data to all of the copying machines being connected, the information request data ID is set for the data ID of the communication data to be transmitted (S1003), and the information request data ID having the content, for example, shown in FIG. 45(a), is transmitted to other copying machines (S1004). The routine of the transmitting process in S1004 will be explained later according to the flowchart of FIG. 54 which shows the process in detail.

By transmitting the described information request data ID, the communication data receiving process of the transmission data from each copying machine to which the information request data ID is transmitted is executed in S1005. This process is executed by the routine explained in FIG. 50, and the copying machine waits for the receiving data from other copying machines for performing the concurrent copy process.

In response to the transmitted information request data, when the copying machine of the transmitting end receives the information response data showing the state of each copying machine being connected (S1006), it is checked whether or not the data is the information response data (S1007). If the data is the information response data, it is checked if the status ID of the information response data indicates the idle state (S1010). If so, the information response data of the copying machine is registered in the copying machine registration data (S1014). After the registration, the sequence goes back to S1005, and the receiving process of the information response data is repeated. Through the described process, the copying machine of the transmitting end can recognize the functions provided in the copying machines of the receiving end. Consequently, the functions of other copying machines are displayed as shown in FIG. 46(a) or FIG. 46(d), and the function can be set based on the displayed content.

When repeating this receiving process, if the data has not been received, it is checked whether or not a predetermined time has passed after transmitting the information request data (S1008). If the data has not been received within a predetermined time period, the receiving process of the information response data is completed, and if the entire function display flag is not set OFF in S1012, all of the functions in the coping machine registration data are displayed on the display unit of the panel unit 106 (S1016). The display is based on the response data, and includes the function for another concurrent copy process provided in the copying machine. Namely, the all of the registered functions of the copying machine are displayed at one time, and this processing routine is completed. Then, the sequence goes back to S501 of FIG. 48.

When the entire function display flag is set OFF in S1012, the copying machine which is registered first is set as a display copying machine (S1013), and the display copying machine is displayed on the display of the panel unit 106 (S1015). The display condition is as shown in FIG. 46(a) through FIG. 46(d). By this display, the processing routine is terminated, and the sequence moves onto the previously described process in S501.

Furthermore, if the response data in response to the information request data from the previously explained copying machine is received in S1001, and the copying machine which transmits the response data is registered, i.e., the unique address of the copying machine is registered, it is checked whether or not the entire function display flag is set OFF (S1009). In this case, if the flag is set OFF in S1009, the registered next copying machine is set as the display copying machine (S1011), and the function of the copying machine is displayed on the display unit of the panel unit 106. On the other hand, if the flag is not OFF, the functions of the registered copying machine are sequentially displayed or displayed at one time.

Here, the function is displayed for each registered copying machine when the entire function display flag is set OFF by the key operation, and this function display is switched by executing the routine of FIG. 53 by operation the concurrent copy mode key.

As described, the copying machine of the transmitting end can recognize all the functions provided in the copying machines being connected, and the function can be set as desired among the functions. Namely, the function which is not provided in the copying machine of the transmitting end but provided in other copying machines can be used with the concurrent copy process. In addition, the function can be set in reference to the display content.

Figure 54:
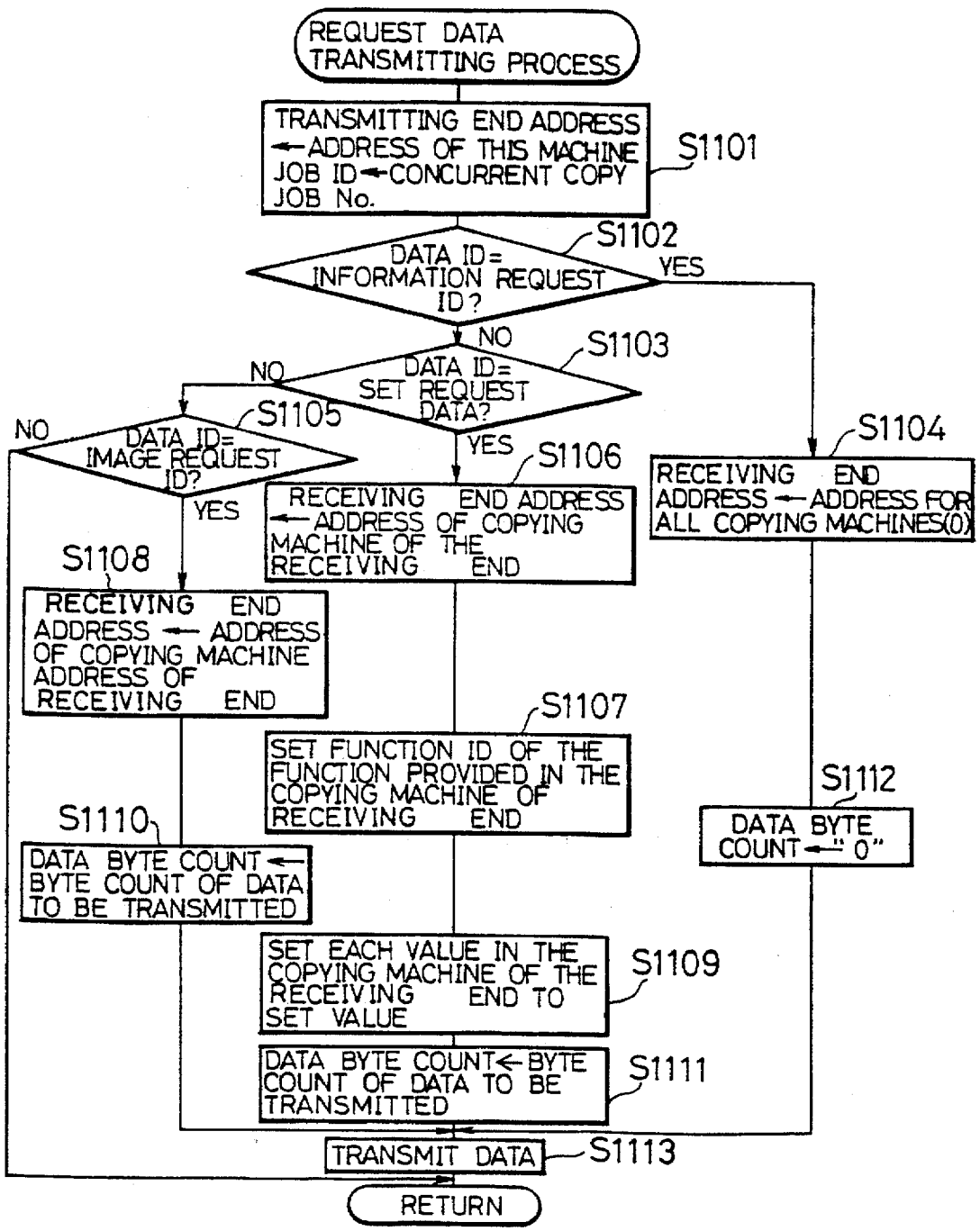
FIG. 54 is a flowchart showing the request data transmitting process in the flowchart of FIG. 53.

FIG. 54 is a flowchart showing the request data transmitting process in S1004 by the copying machine of the transmitting end in detail explained in reference to FIG. 53.

For the address of the transmitting end, the unique address of the coping machine of the transmitting end is set, and the concurrent copy job No. is set for the job ID (S1101). Then, it is checked whether or not the data ID of the communication data is the information request data ID (S1102). If so, the address "0" suggesting all of the copying machines being connected is set for the receiving end address (S1104), and as the data such as actual image, etc., is not required, the data byte count is set to "0" in S1112. The data having the content shown in FIG. 45(a) set in the described manner is transmitted to all of the copying machines other than the copying machine of the transmitting end through the communication line (S1123).

On the other hand, if the data ID of the communication data to be transmitted is not the information request data In S1102, it is checked whether or not the data ID is the set request data ID (S1103). If so, the address of receiving end copying machine is set for the address of the receiving end (S1106). Then, after setting the all function ID provided with the receiving end copying machines (S1107), the value indicating whether the function is being used or not being used is set for all of the functions. As described, the functions being displayed can be freely set, and the value can be set as desired.

The data for the described set request are summed, and after setting the byte count of the summed transmission data to the data byte count (S1111), the data of the content shown in FIG. 45(c) is transmitted (S1113).

If the data ID of the communication data to be transmitted is not the set request data ID in S1103, it is checked whether or not the data ID is the image request data ID (S1105). If so, the address of the receiving end copying machine is set to a receiving end address set in document scanning process (S1108), and the data byte count of the image data resulting from scanning the document is set, and the data having the content shown in FIG. 45(e) is transmitted with the image data (S1113).

As described, by completing the transmission of the data in S1113, the processing routine is terminated, and the process for recognizing the receiving state from the copying machine of the receiving end in S1005 of FIG. 53 is executed. If the data ID of the communication data to be transmitted is not the image request data ID, as this indicates that the data is not in the normal condition, the processing routine is terminated without executing any process.

The details of the image reading process in S405 of FIG. 47 will be explained in reference to FIG. 55 and FIG. 56. The described process is performed in the copying machine of the transmitting end, and the transmission control of the image data thus scanned is performed as well as reading the image.

Figure 55:
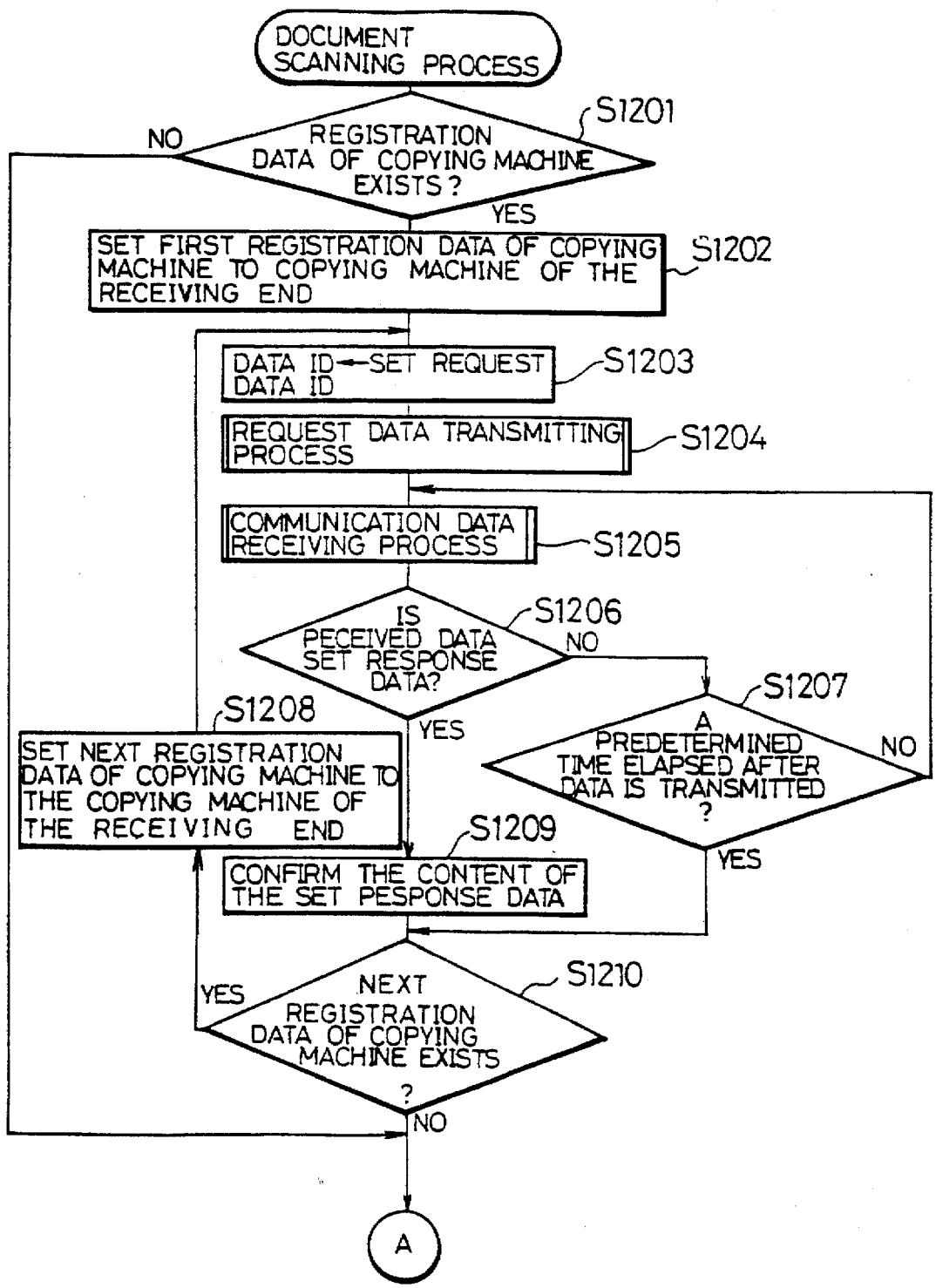
FIG. 55 is a flowchart showing the document scanning process in the flowchart of FIG. 47.
Figure 56:
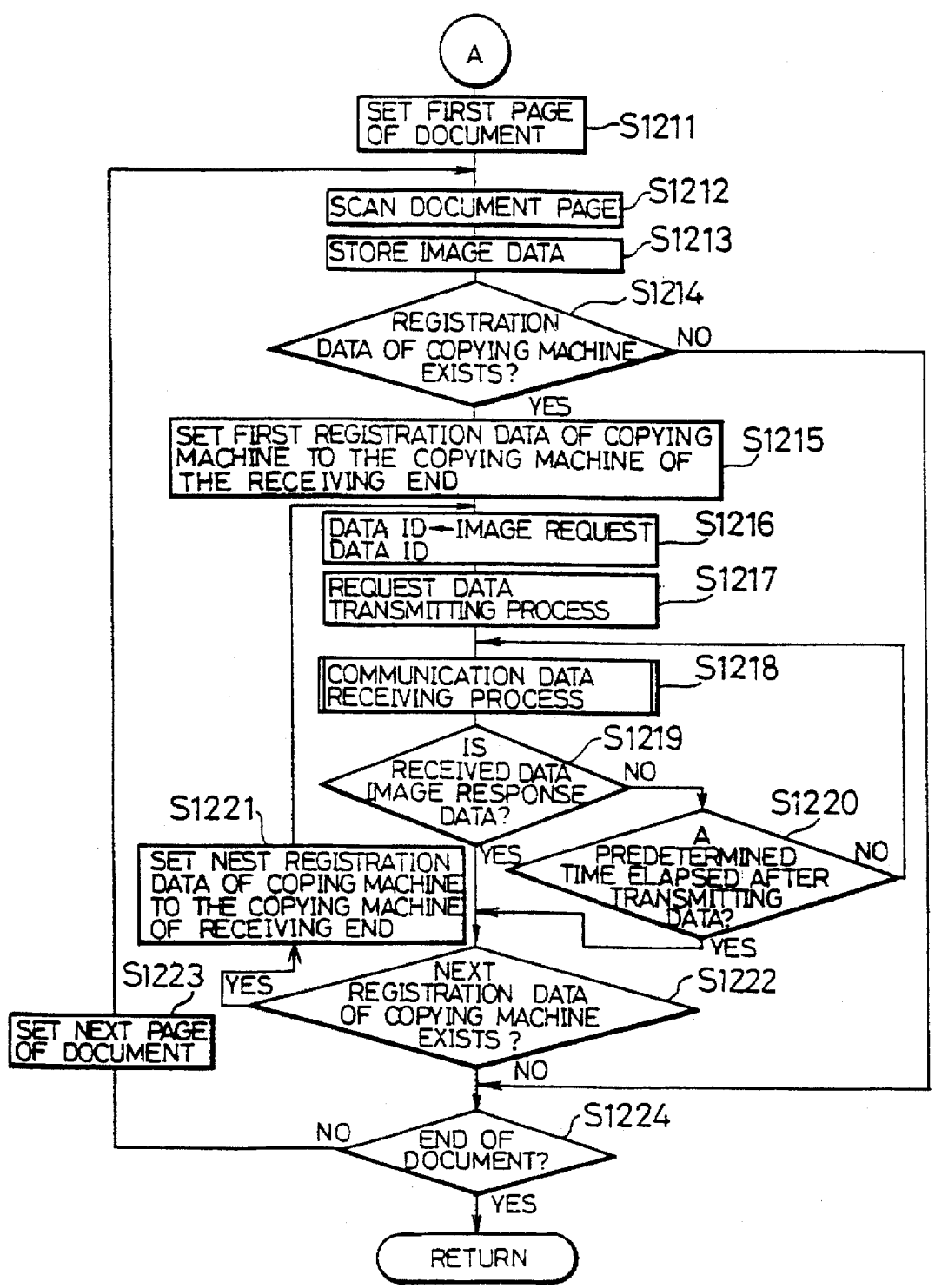
FIG. 56 is a flowchart showing a subsequent operation related to the document scanning process of FIG. 55.

First, it is checked whether or not the copying machine registration data exists in FIG. 55 (S1201). Namely, when the concurrent copy process is executed in the copying machines, as already explained, the copying machines set in the idle state are confirmed by the status IDs, and the copying machines available for the concurrent copy process are registered beforehand. If no registration is made, this copying machine executes the copy operation alone. Therefore, in S1211 of FIG. 56, the first page of the document is set, and the image of the document page set in S1212 is read, and the document image is stored. In the meantime, the image data is stored in the HDD 7 in S1213.

On the other hand, when the registration data of the copying machine exists, as this indicates that the copying machines available for the concurrent copy process exist, the following control is executed. Namely, the process for transmitting the required data to each copying machine which performs the concurrent copy operation is executed.

The copying machine of the transmitting end which executes the concurrent copy operation sets the first coping machine registration data in the copying machine of the receiving end in order to transmit the set request data to the copying machine which is registered in the copying machine registration data (S1202). Then, the set request data ID is set to the data ID of the transmitting data (S1203), and the request data transmitting process is executed (S1204). The process is as explained earlier.

In order to receive the set response data indicating whether or not each value for the copying machine is set based on the set request data, the communication data receiving process is executed (S1205). By executing this process, the received state of the data is confirmed (S1206). Namely, whether or not the received data is the set response data is checked until a predetermined time period has passed (S1207, S1205 and S1206).

If the data is the response data in response to the set request data, the content of the set response data is confirmed (S1209), and it is checked whether or not the registration data of the next copying machine exists (S1210). If there is no registered data of the next copying machine, the control after S1211 for driving the scanner section 2 for initiating the scanning of the document is executed. On the other hand, if the registered copying machines which divide the concurrent copy process exist, the address of the next copying machine is set to the transmission data (S1208), and the described transmission process of the set request data is repeated.

Upon completing the described operation, the control of the scanner section 2 for reading the image on the document is executed. Namely, the flowchart shown in FIG. 56 is executed, and the first page of the document is set, and the image on the document is read by the scanner section 2 (S1212). Then, the image data is stored in the HDD 7, etc., (S1213). Thereafter, it is checked whether or not the registered copying machines which divide the copy job exist (S1214). If the registration data of the copying machine does not exist, i.e., in the case where the copying machine of the transmitting end performs the copy operation alone, it is checked whether or not all of the documents have been scanned (S1224). If the document to be read remains, the page of the document is set to the next page. The document is read and stored in S1212 and S1213, and this process is repeated until all of the documents have been read.

On the other hand, if the registered data of the copying machine exist, the sequence moves from S1214 to S1215, and first copying machine registration data is set in the copying machine of the receiving end in order to transmit the image request data to the copying machine registered in the copying machine registration data (S1215). Then, the image request data ID is set for the data ID of the transmission data (S1216), and the request data transmitting process is executed (S1217). Then, the receiving of the data in response to the transmission data is executed by the next communication data receiving process (S1218), and the data is received. Then, it is checked whether or not the received data is the image response data (S1219).

As a result of the check in S1219, if it is determined that the received data is the image response data, it is checked whether or not the registered data in the next copying machine exists (S1222). If the image response data has not been received within a predetermined elapse of time, through the processes in S1220 and S1222, it is confirmed if the data of the next registered copying machine exists. In this case, as the transmitted image request data is not stored regularly in the copying machine of the receiving end, it is determined that the response data is not received, and the next process is performed.

Next, in S1222, if the registered data of the next copying machine exists, processes from S1221 and after S1216 are repeated for transmitting the image request data to all of the registered copying machine is executed, and the image data read by the scanner section 2 is transmitted to all the copying machines which execute the divided copy operation. As in the described manner, the image data is stored in the copying machine of the receiving end.

If no registered data of the next copying machine remains in S1222, i.e., when the image data is transmitted to all of the copying machines, it is checked whether or not the image reading operation of the next document is perforated (S1224). Then, the reading of the document is performed by the described manner, and the image data is transmitted to each copying machine for performing the divided copy operation. Upon completing the distributive copy operation, the processing routine is terminated, and the next copy start control is executed by S406 of FIG. 47.

In reading the image on the document, when transmitting the read image data to the copying machine of the receiving end, the image data of the document of one page is transmitted. However, in the present invention, for example, if the 2in1 function is set as in the present embodiment, the image data is transmitted to other copying machines when completing the image process by the function. Therefore, prior to the sequential operation in S1211 through S1214, i.e., the sequential operation for reading and storing the image on the first document, and checking the registration data of the copying machine of the receiving end, it is checked whether or not the function is set in the copying machine of the transmitting end. If the function is set, it is checked whether or not the set function is the corresponding 2in1 function. Here, it is also checked if the 2in1 function is not provided in the copying machine of the transmitting end but is provided in other copying machines. Based on the result of this check, the sequential operations in S1211 through S1214 are performed.

If the 2in1 function is selected by the user, and the function is provided in the copying machine of the transmitting end but not provided in other copying machines, the image process (2in1) is executed in the copying machine of the transmitting end. Therefore, the sequence goes back to S1212, and the process for reading the image on the document of the second page is executed. Then, based on the image data of two pages, the image process by the 2in1 function is executed, and the processed image is stored in S1213. Then, the data of the processed image is transmitted to the registered copying machine which performs the divided copying operation in S1214.

On the other hand, if the set function is not provided in the copying machine of the transmitting end but is the unique function of other copying machines such as the 4in1 function, the processes after S1214 are executed directly. Namely, the image data resulting from reading the document is transmitted to the copying machine provided with the 4in1 function.

When transmitting the image data of all the document to be copied to the copying machine provided with the 4in1 function, the image process according to the 4in1 function of the image data of four pages is performed in the copying machine of the receiving end. Here, if the document is of three pages, the document of the fourth page is processed as a blank page. As described, by applying the image process based on the 4in1 function, the image data is transmitted back to the copying machine to the transmitting end. The copying machine of the transmitting end receives this data in S1218, and it is checked whether or not the 4in1 image process is completed. Upon confirming the completion, the processed image data is transmitted to all of the registered copying machines except the copying machine provided with the 4in1 function, i.e., the copying machine which has executed the 4in1 function. Upon completing this transmission with respect to all of the copying machines, after S1224, the sequence moves onto S406 of FIG. 47.

Figure 57:
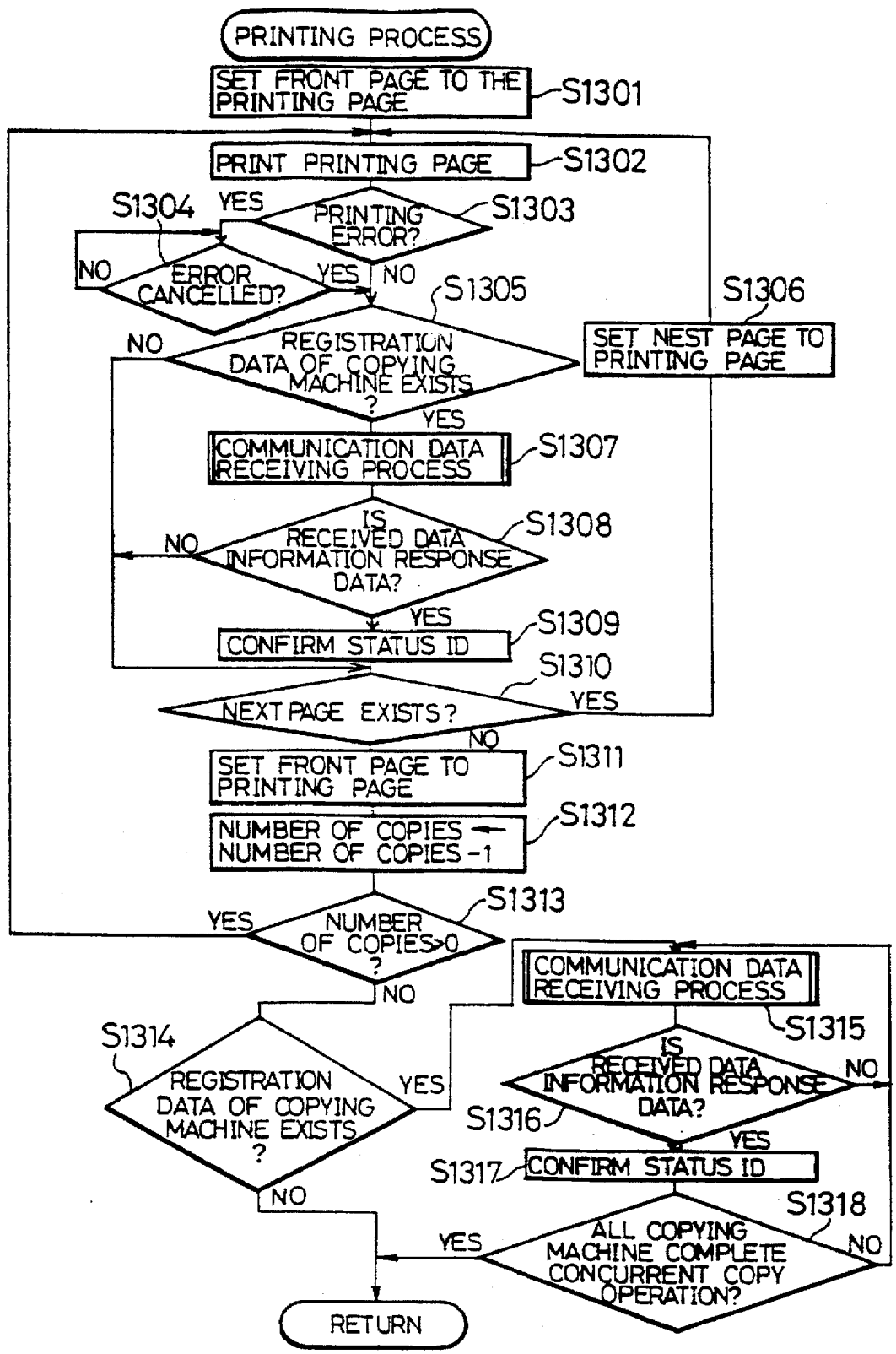
FIG. 57 is a flowchart showing the printing process by the digital copying machine of the transmitting end in the flowchart of FIG. 47.

Lastly, the control operation in the printing process will be explained in reference to FIG. 57. FIG. 57 is a flowchart for explaining the printing control especially by the copying machine of the transmitting end and the copying condition, etc., by each copying machine which divides the copy job. Especially, in the flowchart, by recognizing the copy condition, etc., from the copying machine by the concurrent copy receiving and printing processes shown in FIG. 52, the printing operation by the copying machine of the transmitting end is explained.

As explained earlier, in order to print the image data processed by the scanner section 2 from the front page, the image data stored in the HDD 7 is set to the front page (S1201). The image data to be printed is processed based on the 2in1 function in the copying machine of the transmitting end, and if the data is processed based on the 4in1 function, the data is processed and transmitted from the copying machine provided with the 4in1 function. The image data of the front page is transmitted to the printing section 103, and the printing of the first page is executed (S1302). Then, it is checked whether or not an error has occurred in the printing operation (S1303). If the occurrence of an error is detected, the copying machine is set in the stand-by state until the error is cancelled (S1304). Here, possible errors includes a sheet being jammed, running out of sheets or toner, etc. Especially, when an error due to running out of sheets or toner occurs, the printing operation is not started, and the first printing process is not executed. Upon cancelling the error, the printing process is restarted, and the described printing process of the image data is executed.

If the error has not occurred, or the printing process can be completed by cancelling the error, the registered copying machine for dividing the copy job is confirmed (S1305). As a result of this confirmation, if the copying machine performs the printing operation alone, the sequence moves onto S1310, and it is checked whether or not the image data on the next page exists. If so, the image data of the next image is set as the data to be printed (S1306), and the printing process in S1302 is repeated. This process is repeated until the printing of the image data of all pages is executed, and upon completing the printing process, the image data on the front page is set to the page to be printed (S1311). Then, the number of copies is subtracted by 1 (S1312), and this subtracted number of copies is registered to renew the number of copies. Then, it is checked whether or not the registered subtracted number of copies is "0" (S1313) so as to determine whether or not the number of copies reach the set number.

In the described manner, only one set of copies of the plural documents is completed. Then, in order to start the printing of the next set, the sequence goes back to S1301.

If the registered data of the copying machine exists in S1305, i.e., if there exists copying machines which divide the copy job other than the copying machine of the transmitting end, in order to recognize the printing state of each copying machine in the copying machine of the transmitting end, the communication data receiving process is executed, and the receiving state of the data transmitted from other copying machine is recognized (S1307). Then, with respect to the received data, it is checked whether or not the information response data transmitted from other copying machines is received upon completing the printing of one page (S1308). If the received data is not the information response data, the process after S1310 is executed for printing the next page.

If it is confirmed that the information response data is received in S1308, the status ID of the information response data is confirmed (S1309), and the process in S1310 is performed.

Upon completing all the printing operation in S1310, i.e., when the set number of copies have been produced, it is checked whether or not the registered data of the coping machine exits so as to determined whether or not the copying machine performs the copy operation alone (S1314). If so, the routine for this printing process is terminated, and the copying machine is set in the stand-by state for the next printing process. However, if the registered data of the copying machine exists, the status of other copying machines for the concurrent copy process is confirmed. Namely, the communication data receiving process of the communication line 1 is executed (S1315). If the received data is the information response data, the status ID is confirmed (S1317), and it is checked whether or not all the copying machines have completed the respective print operations which execute the concurrent copy process simultaneously (S1318). By this check, if it is confirmed that the printing process by each copying machine is completed, the routine for this printing process is terminated, and the copying machine is set for the stand-by state for the next copy operation.

As described in the system composed of plural copying machines being connected, when one copying machine executes the copy operation of the document, the concurrent copy process of the data is executed using other plural copying machines being connected. In order to perform this, the image data for copying is transmitted to each copying machine being connected. Before starting the concurrent copy process, as the copying machine of the transmitting end can recognize the information regarding the functions provided in each copying machine, a function which is not provided in the copying machine of the transmitting end can be selected to be set in the copying machine of the transmitting end. Therefore, all the functions in the copying machines can be used as desired and easily. As a result, efficiency in utilizing the copying machine set in the stand-by state can be improved. Moreover, in producing copies, the productivity of above the copying capacity of each copying machine can be achieved.

In the present embodiment, for the high speed communication line which connects plural copying machines, the communication line 1 of bus type is used. However, the communication line 1 is not particularly limited as long as plural copying machines can be connected. Although the communication line physically exists, the logical communication line, for example, by the radio wave, etc., the copying machines can be connected.

In the present embodiment, each copying machine is provided with the HDD 7 which can store the image data of plural pages, and the explanations are given through the case where all the image data of plural pages are temporarily stored, and the plural sets of copies are produced. However, it may be also arranged such that the printing of the document is performed according to the page number of the document, and upon completing the printing of first set, the copy operation is repeated until the set number of copies have been produced again. Therefore, the copied sheets discharged onto the discharge tray are aligned according to the page number.

However, if the copying machine is provided with a sorter, the printing of the first page of the document is printed at one time for the set number of copies, and are sorted by a sorter. Therefore, in the arrangement where the image data of one page is transmitted, and the image data is printed, a copy operation can be performed after the image data of the next page is transmitted. Therefore, without the memory section of large scale such as HDD 7, etc., if the copying machine is provided with the memory section for storing the document of one page, the concurrent copy operation of the present invention can be performed.

In the present embodiment, by transmitting the copying capacity of each copying machine being connected, i.e., the copying speed and the functions provided in each copying machine to the copying machine of the transmitting end, the setting of inputting the number of copies and of the function can be performed in the copying machine of the transmitting end. The setting of the number of copies can be performed in the copying machine of the transmitting end as desired. Alternatively, the number of copies to be distributed each copying machine may be set according to the copying capacity. The function can be set using the operation key of the panel unit 106 of the copying machine of the transmitting end in reference to the displayed functions of each copying machine.

Another example of setting an input will be explained. In this example, the master CPU 109 shown in FIG. 42 functions also as operator sheet determining means, and the printing section 103 functions also as operator sheet output means.

Figure 59:
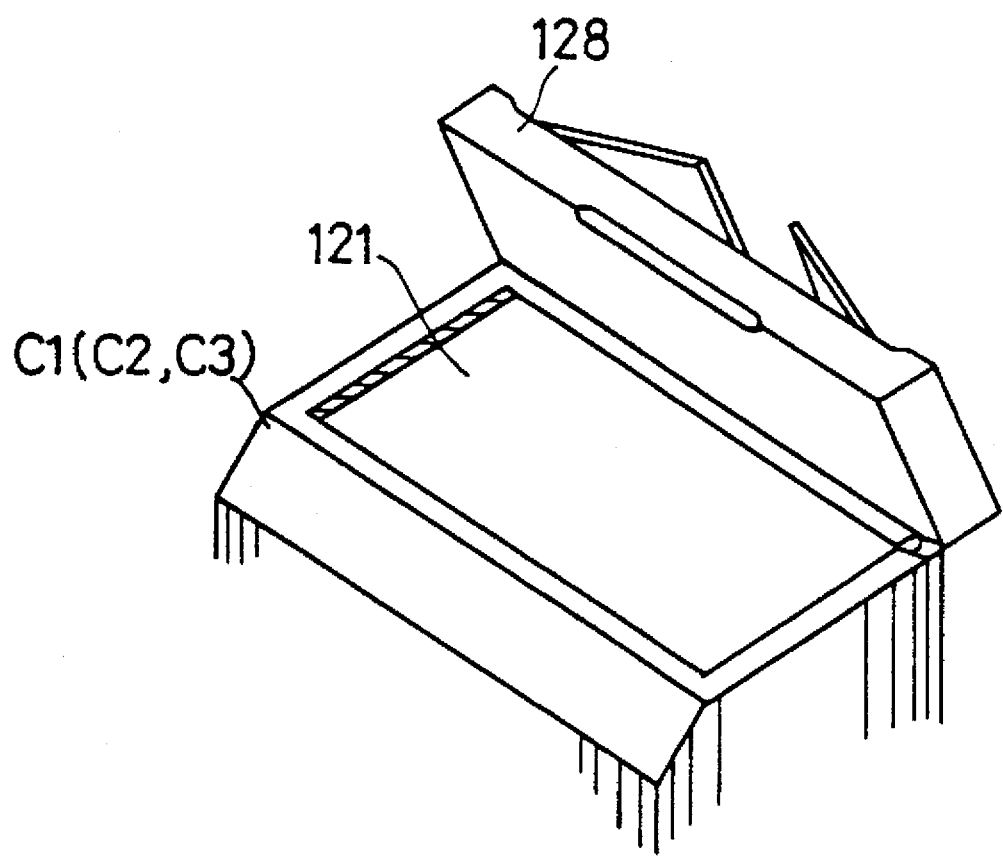
FIG. 59 is a perspective view showing a document image reading section in the digital copying machine.

FIG. 58 shows an operator sheet (hereinafter referred to as an OP sheet) 120 for enabling the setting of other operations including the function to be outputted from the copying machine main body as an example. The copying machines (C1, C2, C3, etc.,) shown in FIG. 59 are arranged such that the OP sheet 120 is placed like the document is placed on the corresponding position on the document platen 121. Then, if an image according to the predetermined format is formed on the placed sheet like the OP sheet 120, the placed sheet is recognized as an operation setting sheet (OP sheet). Then, the image information written on this OP sheet is analyzed so as to extract the mode setting information. Based on the result, the setting of the operation mode is performed automatically.

On the OP sheet 120, recognition marks 122 indicating that the sheet is the OP sheet 120 are made at eight points on the front and back surface of the OP sheets (the right upper points, the left upper points, the right lower points and the left lower points on the front and back surfaces). Each recognition mark 122 includes not only the ID indicating of the OP sheet but also the symbol indicating the front or back and the position (right upper point, left upper point, etc.). On the OP sheet 120, for each set item corresponding to each operation key on the panel unit 106 of FIG. 42, sections are formed such as a numeral writing section 123 for the item of number of copies, a selecting item 124 for selecting among automatic sheet selection, manual tray, selecting the size of the sheet among A3, A4, B5, etc.

On the OP sheet 120, a function display area 126 in accordance with the present invention is formed. On this function display area 126, the functions provided in the copying machine are displayed. For specifying the copying machine, at the bottom portion of the OP sheet 120, a unique address 127 for the copying machine is displayed.

In each selection item 124, a check area 125 of □ shape is formed. When the user makes a selection mark like "✓" in one of the check areas 125, the selected item is read. This read data is temporarily stored in the RAM 11 shown in FIG. 42.

When the user wishes the concurrent copy process to be performed, by operating the corresponding key, as explained earlier, the copying machine in which the key operation is made is designated as a transmitting end, transmits information request data to available copying machines. Upon receiving the transmission data, the copying machines set in the stand-by state transmit the information response data to the copying machine of the transmitting end. By receiving the response data, the copying machine of the transmitting end can recognize the functions provided in each copying machine.

When the information from each copying machine is received, the copying machine of the transmitting end can recognize the functions of each copying machine being connected. Based on the received data, the copying machine of the transmitting end prints, outputs and discharge the OP sheet 120 shown in FIG. 58 for each copying machine. As to the output differs for each copying machine, a reference template which is different in each copying machine is stored beforehand for all of the copying machines. Namely, among the items to be printed on the template, as to the function display area 126, it is determined whether or not a printing is made in accordance with the unique functions of each copying machine. For example, in the case where the copying machine C1 is the transmitting end, as the unique functions of the copying machine C1 are the 2in1 function and the both-sided copy function, the OP sheet whereon the 2in1 function and the selected item of the both-sided copy function are printed in the function display area 126 is outputted and discharged for the copying machine C1.

For the copying machine C2, as the unique function thereof is the staple function, the OP sheet 120 whereon the selected item of the staple function is printed in the function display area 126 and the both-sided printing function is not printed is outputted and discharged for the OP sheet 120 of the copying machine C2. Similarly, for the copying machine C3, as the 4in1, both-sided and staple functions are unique functions of the copying machine C3, the OP sheet 120 whereon the functions in the selection item are printed in the function display area 126 is outputted and discharged.

At the bottom portion of the OP sheet 120, as explained earlier, the copying machine No. as the address of the copying machine is printed and outputted as shown in the reference numeral 127. Therefore, by confirming the No., the user can easily sets the function and number of copies by making the mark ✓, etc., with a pen as described above. As a result, the function can be set among the functions provided in the copying machines, and the problem that the user selects a function which is not provided in the copying machine can be prevented.

After marking the necessary items, the OP sheet 120 having the described arrangement is placed on the document platen 121 shown in FIG. 59. By using the document automatic feeder 128 for this placement, the copying machine (C1 in this example) can successively reads the content of the OP sheet 120. As the address No. of the copying machine is recognized and confirmed by the copying machine which reads the OP sheet 120, the function and the number of copies can be set automatically in each copying machine. Upon completing this reading operation, the set function and the number of copies are transmitted to each copying machine as the set request data.

By placing the OP sheet 120 on the document which is required to be copies, the copying machine determines whether the sheet to be transported is the copy document or the OP sheet 120. If the sheet is the OP sheet 120 as a result of this determination, the copying machine confirms the No. of the copying machine, and the set number of copies is recognized, and the state of the set function is confirmed, and the recognized number of copies and the confirmed set function are stored. This process is completed by confirming the OP sheet 120 with respect to each copying machine, and as the recognition marks 122 described above do not exist on the copy document to be transmitted next, it is determined that the copy document to be transmitted next is not the OP sheet, and the image data is stored in the HDD 7 in the read order. While reading the document, the copying machine of the transmitting end transmits the set request data to each copying machine being connected which divides the copy job. As explained earlier, the set request data is particular to each copying machine, and is transmitted so that the address of the receiving end is identical with the No. of the copying machine displayed on the OP sheet 120.

The copying machines (C2 and C3 in this example) receive the set request data, and if the number of copies and the necessary function are selected and set in the copying machines, the copying machines transmit the request response data to the copying machine of the transmitting end. As a result, the copying machine of the transmitting end transmits the image data of the previously read document to each copying machine. The processes to be followed are the previously described control processes for the printing operation.

The above explanations have been given through the case where the concurrent copy operation is performed in each copying machine using the same function. However, by setting the unique function in each copying machine, copies may be produced in different mode. For example, it may be arranged such that only the copying machine of the transmitting end performs the copy operation in the 2in1 function, and other copying machines perform the copy operation in the staple mode. As described, the function can be set as desired.

In the present embodiment, explanations have been given through the case of the digital copying machine. However, the present invention is also applicable to the case where facsimile machines which serve as copying machines are connected by the communication line 1. Moreover, the same printing operation can be achieved also in the case where the concurrent copy process is required in the printers provided in the personal computers by connecting the personal computers by the communication line 1.

The same function can be achieved also for the printer for the word processors in replace of the personal computers. When one of the word processors instructs the printing operation to the printer, the printer of this word processor becomes the transmitting end, and the concurrent copy operation can be performed using the printers of other word processors.

While this invention has been disclosed in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. An image forming system comprising:

plural image forming apparatuses provided with image reading means for reading an image from a document to be converted into image data and image forming means for forming an image based on the image data; and a communication line for connecting said plural image forming apparatuses, each of said plural image forming apparatuses comprising:

data transmission means for transmitting image data to another image forming apparatus using said communication line;

data receiving means for receiving the image data transmitted by said data transmission means;

distribution number set means for setting a distribution number of sets to be produced in each image forming apparatus when performing image forming operation of plural sets;

distribution number transmission means for transmitting the distribution number of sets to each image forming apparatus set by said distribution number set means to another image forming apparatus using said communication line;

distribution number receiving means for receiving the distribution number of sets transmitted by said distribution number transmission means wherein each of said plural image forming apparatuses further comprises processing capacity detecting means for detecting a processing capacity for an image forming operation of each image forming apparatus, said distribution number set means sets the distribution number of sets to each image forming apparatus according to the processing capacity of each image forming apparatus detected by said processing capacity detecting means and said distribution number set means sets the distribution number in proportion to a process speed of image forming operation of each image forming apparatus so that all the image forming apparatuses complete respective image forming operations substantially at the same time.

2. The image forming system as set forth in claim 1, wherein each of said plural image forming apparatuses further comprises processing capacity transmission instructing means for instructing the processing capacity of each image forming apparatus to be transmitted; and processing capacity transmission means for transmitting its processing capacity to an image forming apparatus which transmits an instruction to transmit the processing capacity by said processing capacity transmission instructing means upon receiving the instruction, and said processing capacity detecting means detects the processing capacity of an image forming operation of each image forming apparatus by receiving the processing capacity of each image forming apparatus transmitted from said processing capacity transmission means.

3. The image forming system as set forth in claim 1, wherein:

each image forming apparatus includes informing means for informing a user of information related to a distributive image forming operation as distribution information when forming plural sets of image based on image data read by said image reading means.

4. An image forming system comprising:

plural image forming apparatuses provided with image reading means for reading an image from a document to be converted into image data and image forming means for forming an image based on the image data; and a communication line for connecting said plural image forming apparatuses, each of said plural image forming apparatuses comprising:

data transmission means for transmitting image data to another image forming apparatus using said communication line;

data receiving means for receiving the image data transmitted by said data transmission means;

distribution number set means for setting a distribution number of sets to be produced in each image forming apparatus when performing image forming operation of plural sets;

distribution number transmission means for transmitting the distribution number of sets to each image forming apparatus set by said distribution number set means to another image forming apparatus using said communication line;

distribution number receiving means for receiving the distribution number of sets transmitted by said distribution number transmission means wherein:

each image forming apparatus includes error detection means for detecting an occurrence of error during a distributive image forming operation divided by said plural image forming apparatus being connected through said communication line, and upon detecting the occurrence of error by said error detection means, said distribution number set means re-allocates number of sets unprocessed due to the error to another image forming apparatus, and said distribution number transmission means transmits a re-allocated number to each image forming apparatus.

5. An image forming system comprising:

plural image forming apparatuses provided with image reading means for reading an image from a document to be converted into image data and image forming means for forming an image based on the image data; and a communication line for connecting said plural image forming apparatuses, each of said plural image forming apparatuses comprising:

data transmission means for transmitting image data to another image forming apparatus using said communication line;

data receiving means for receiving the image data transmitted by said data transmission means;

distribution number set means for setting a distribution number of sets to be produced in each image forming apparatus when performing image forming operation of plural sets;

distribution number transmission means for transmitting the distribution number of sets to each image forming apparatus set by said distribution number set means to another image forming apparatus using said communication line;

distribution number receiving means for receiving the distribution number of sets transmitted by said distribution number transmission means wherein:

each image forming apparatus further comprises first memory means for storing a converted image data and second memory means for storing image data received from another image forming apparatus by said data receiving means.

6. The image forming system as set forth in claim 5, wherein:

said first memory means stores image data of one page resulting from converting an image of a document of one page; and said second memory means stores image data of one page resulting from converting an image of a document of one page.

7. The image forming system as set forth in claim 6, wherein:

each of said image forming apparatus further comprises idle state confirming means for confirming a completion of respective image forming operations in all image forming apparatuses each time image data of one page is transmitted to each image forming apparatus.

8. The image forming system as set forth in claim 5, wherein:

said first memory means stores all image data of plural pages resulting from converting images of a document of plural pages, and said second memory means stores all image data of plural pages resulting from converting images of a document of plural pages.

9. The image forming system as set forth in claim 8, wherein:

said first memory means is a hard disk, and said second memory means is a hard disk.

10. An image forming system comprising:

plural image forming apparatuses provided with image reading means for reading an image from a document to be converted into image data and image forming means for forming an image based on the image data; and a communication line for connecting said plural image forming apparatuses, each of said plural image forming apparatuses comprising:

data transmission means for transmitting image data to another image forming apparatus using said communication line;

data receiving means for receiving the image data transmitted by said data transmission means;

image processing function transmission instructing means for instructing to transmit an image processing function provided in each of said plural image forming apparatuses to a specific image forming apparatus among said plural image forming apparatuses, using said communication line, when an image forming operation is performed by said plural image forming apparatuses including an image forming apparatus other than the specific image forming apparatus, based on image data read by the specific image forming apparatus, image processing function transmission means for transmitting its image processing functions to an image forming apparatus which transmits an instruction to transmit the image processing functions by said image processing function transmission instructing means, upon receiving the instruction;

image processing function detecting means for detecting the image processing functions of each image forming apparatus by receiving the image processing functions of another image forming apparatuses transmitted by said image processing function transmission means; and image processing function setting means for transmitting an image processing function to be performed in each image forming apparatus through said communication line so as to set the image processing function to be performed in each image forming apparatus wherein:

upon receiving an image processing function provided in said another image forming apparatus therefrom, said image forming apparatus executes the image processing function if the image processing function is provided therein and not provided in said another image forming apparatus, and sends thereto processed image data, said image forming apparatus executes the image processing function if the image processing function is provided therein and not provided in other image forming apparatus, and an image forming operation is performed in said image forming apparatus and/or other image forming apparatus.

11. The image forming system as set forth in claim 10, wherein:

each of said image forming apparatus further comprises image processing function display means for displaying image processing functions provided in each image forming apparatus transmitted from said image processing function transmission means when said image processing function transmission instructing means instructs to transmit the image processing functions of each image forming apparatus.

12. An image forming system comprising:

plural image forming apparatuses provided with image reading means for reading an image from a document to be converted into image data and image forming means for forming an image based on the image data; and a communication line for connecting said plural image forming apparatuses, each of said plural image forming apparatuses comprising:

data transmission means for transmitting image data to another image forming apparatus using said communication line;

data receiving means for receiving the image data transmitted by said data transmission means;

image processing function transmission instructing means for instructing to transmit an image processing function provided in each of said plural image forming apparatuses to a specific image forming apparatus among said plural image forming apparatuses, using said communication line, when an image forming operation is performed by said plural image forming apparatuses including an image forming apparatus other than the specific image forming apparatus, based on image data read by the specific image forming apparatus, image processing function transmission means for transmitting its image processing functions to an image forming apparatus which transmits an instruction to transmit the image processing functions by said image processing function transmission instructing means, upon receiving the instruction;

image processing function detecting means for detecting the image processing functions of each image forming apparatus by receiving the image processing functions of another image forming apparatuses transmitted by said image processing function transmission means; and image processing function setting means for transmitting an image processing function to be performed in each image forming apparatus through said communication line so as to set the image processing function to be performed in each image forming apparatus wherein:

upon receiving an instruction to transmit image processing functions, said image forming apparatus executes the image processing function of the image processing function is provided therein and not provided in an image forming apparatus which has transmitted the instruction to transmit the image processing functions, and sends processed image data to the image forming apparatus which has transmitted the instruction said image forming apparatus requests other image forming apparatus provided with an image processing function to be processed therein if the image processing function is not provided in said image forming apparatus and provided in other image forming apparatus, and an image forming operation is performed in said image forming apparatus and/or other image forming apparatus.

13. The image forming system as set forth in claim 12, wherein:
    each of said plural image forming apparatuses further comprises operator sheet determining means for determining whether or not an image read by said image reading means is an operator sheet for setting a content of forming images for each image forming apparatus based on a diagram pattern on a sheet; and
    said image processing function setting means sets an image processing function provided in another image forming apparatus based on a read content of the operation sheet.

14. The image forming system as set forth in claim 12, wherein:
    each of said image forming apparatus further comprises image processing function display means for displaying image processing functions provided in each image forming apparatus transmitted from said image processing function transmission means when said image processing function transmission instructing means instructs to transmit the image processing functions of each image forming apparatus.

15. An image forming system wherein plural image forming apparatuses are provided with image reading means for reading an image from a document to be converted into image data and image forming means for forming an image based on the image data; and
    a communication line for connecting said plural image forming apparatuses,
    each of said plural image forming apparatuses comprising:
        data transmission means for transmitting image data to another image forming apparatus using said communication line;
        data receiving means for receiving the image data transmitted by said data transmission means;
        image processing function transmission instructing means for instructing to transmit an image processing function provided in each of said plural image forming apparatuses to a specific image forming apparatus among said plural image forming apparatuses, using said communication line, when an image forming operation is performed by said plural image forming apparatuses including an image forming apparatus other than the specific image forming apparatus, based on image data read by the specific image forming apparatus,
        image processing function transmission means for transmitting its image processing functions to an image forming apparatus which transmits an instruction to transmit the image processing functions by said image processing function transmission instructing means, upon receiving the instruction;
        image processing function detecting means for detecting the image processing functions of each image forming apparatus by receiving the image processing functions of another image forming apparatuses transmitted by said image processing function transmission means; and
        image processing function setting means for transmitting an image processing function to be performed in each image forming apparatus through said communication line so as to set the image processing function to be performed in each image forming apparatus and wherein
    each of said plural image forming apparatuses further comprises operator sheet determining means for determining whether or not an image read by said image reading means is an operator sheet for setting a content of forming images for each image forming apparatus based on a diagram pattern on a sheet; and
    said image processing function setting means sets an image processing function provided in another image forming apparatus based on a read content of the operation sheet, and wherein
    each of plural said image forming apparatuses further comprises operator sheet output means for outputting the operator sheet whereon an image forming function provided in said plural image forming apparatuses being connected is displayed, and an image processing function which is not provided in said plural image forming apparatuses is not displayed.

\* \* \* \* \*

UNITED STATES PATENT AND TRADEMARK OFFICE
CERTIFICATE OF CORRECTION

PATENT NO.  : 5,689,755
DATED       : November 18, 1997
INVENTOR(S) : Hiroyuki Ataka It is certified that error appears in the above-identified patent and that said Letters Patent is hereby corrected as shown below:

On the title page, item [22] Filed: should read  -- April 19, 1997 --.

Signed and Sealed this

Twenty-eighth Day of April, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,689,755
DATED      : November 18, 1977
INVENTOR(S) : Hiroyuki Ataka It is certified that error appears in the above-identified patent and that said Letters Patent is hereby corrected as shown below:

On title page, item 22 Filing Date
 replace "April 19, 1997"
 with --April 19, 1995--.

Signed and Sealed this

Twenty-fourth Day of November, 1998

Attest:

BRUCE LEHMAN

Attesting Officer

Commissioner of Patents and Trademarks